US012101838B2

(12) United States Patent
Zhu et al.

(10) Patent No.: US 12,101,838 B2
(45) Date of Patent: Sep. 24, 2024

(54) COMMUNICATIONS METHOD, APPARATUS, AND SYSTEM

(71) Applicant: Huawei Technologies Co., Ltd., Shenzhen (CN)

(72) Inventors: Haoren Zhu, Shanghai (CN); Weisheng Jin, Shanghai (CN); Huan Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 356 days.

(21) Appl. No.: 17/709,247

(22) Filed: Mar. 30, 2022

(65) Prior Publication Data

US 2022/0225463 A1 Jul. 14, 2022

Related U.S. Application Data

(63) Continuation of application No. PCT/CN2019/109732, filed on Sep. 30, 2019.

(51) Int. Cl.
*H04W 76/20* (2018.01)
*H04W 8/02* (2009.01)
*H04W 40/02* (2009.01)
*H04W 80/10* (2009.01)

(52) U.S. Cl.
CPC ............ *H04W 76/20* (2018.02); *H04W 8/02* (2013.01); *H04W 40/02* (2013.01); *H04W 80/10* (2013.01)

(58) Field of Classification Search
CPC ....... H04W 76/20; H04W 8/02; H04W 40/02; H04W 80/10; H04W 76/10; H04W 8/12
See application file for complete search history.

(56) References Cited

U.S. PATENT DOCUMENTS

| 2019/0222489 | A1 | 7/2019 | Shan | |
| 2022/0322202 | A1* | 10/2022 | Li | H04M 15/8033 |
| 2022/0360977 | A1* | 11/2022 | Kim | H04L 65/80 |

(Continued)

FOREIGN PATENT DOCUMENTS

| CN | 109698760 A | 4/2019 |
| CN | 110149665 A | 8/2019 |

(Continued)

OTHER PUBLICATIONS

"IAB Node Integration Option 2a," 3GPP TSG-RAN WG3 #101bis, Chengdu, China, R3-185696, XP051528969, Total 6 pages, 3rd Generation Partnership Project, Valbonne, France (Oct. 8-12, 2018).

(Continued)

*Primary Examiner* — Ashley Shivers
(74) *Attorney, Agent, or Firm* — Leydig, Voit & Mayer, Ltd.

(57) ABSTRACT

A user plane network element management method, apparatus, and system are provided so that a session management network element can correctly address a data plane instance. The session management network element determines information about a target data plane instance, where the information about the target data plane instance includes a routing indicator, the routing indicator is used to determine an address of the target data plane instance, and the target data plane instance is associated with a wireless integrated access and backhaul (IAB) node.

20 Claims, 28 Drawing Sheets

(56) References Cited

U.S. PATENT DOCUMENTS

2023/0262639 A1* 8/2023 Lee ...................... H04W 76/22
455/435.1

FOREIGN PATENT DOCUMENTS

| CN | 110248376 A | 9/2019 |
|---|---|---|
| WO | 2019169612 A1 | 9/2019 |

OTHER PUBLICATIONS

"Architecture and Protocols: Connectivity Service Solution for IAB," 3GPP TSG-RAN WG3 Meeting #100, Busan, Korea, R3-182842, XP051445342, Total 10 pages, 3rd Generation Partnership Project, Valbonne, France (May 21-25, 2018).

"3rd Generation Partnership Project; Technical Specification Group Services and System Aspects; System Architecture for the 5G System (5GS); Stage 2 (Release 16)," 3GPP TS 23.501 V16.2.0, pp. 1-391, 3rd Generation Partnership Project, Valbonne, France (Sep. 2019).

"3rd Generation Partnership Project; Technical Specification Group Services and System Aspects; Procedures for the 5G System (5GS); Stage 2 (Release 16)," 3GPP TS 23.502 V16.2.0, pp. 1-525, 3rd Generation Partnership Project, Valbonne, France (Sep. 2019).

"3rd Generation Partnership Project; Technical Specification Group Services and System Aspects; Security architecture and procedures for 5G system (Release 16)," 3GPP TS 33.501 V16.0.0, pp. 1-196, 3rd Generation Partnership Project, Valbonne, France (Sep. 2019).

* cited by examiner

COMMUNICATIONS METHOD, APPARATUS, AND SYSTEM

CROSS-REFERENCE TO RELATED APPLICATIONS

This application is a continuation of International Application No. PCT/CN2019/109732, filed on Sep. 30, 2019, the disclosure of which is hereby incorporated by reference in its entirety.

TECHNICAL FIELD

Embodiments of this application relate to the field of communications technologies, and in particular, to a communications method, apparatus, and system.

BACKGROUND

Currently, industrial manufacturers have a requirement for a 5th generation (5G) mobile communications technology mainly in three aspects: (1) Replacement for a wired cable. To be specific, a wired connection is replaced with a wireless connection to different extents based on different use scenarios, to improve deployment flexibility in factory equipment. As shown in FIG. 1-1A and FIG. 1-1B, some functional device combinations are all connected in a wireless manner, and only some functional device combinations are partially connected in a wireless manner. (2) Secure vertical/horizontal communication. Communication requirements include secure device communication between peer devices and between devices at different levels. As shown in FIG. 1-1A and FIG. 1-1B, for example, communication between sensors is communication between peer devices, and communication between a sensor and an upper-level controller is communication between devices at different levels. (3) Low-latency and high-reliability device communication. Based on a closed-loop control service requirement, wireless communication needs to meet a latency and reliability requirement. For 5G cellular communication, an ideal communication latency is at a level of 1 millisecond (ms).

Based on the foregoing basic requirement, a network deployment manner applicable to an industrial scenario may be designed based on an integrated access and backhaul (IAB) technology. As shown in FIG. 1-1A and FIG. 1-1B, an IAB node is deployed near a production line, and a data plane module is integrated into the IAB node or the IAB node and the data plane module are disposed together on a same device. The data plane module has routing and forwarding functions. In this way, when local devices (for example, a device 1 and a device 2) exchange data, the data of the device 1 may be forwarded to the device 2 only after being processed by the data plane module, and no longer needs to be forwarded to a core network, to greatly reduce a transmission latency.

However, according to the conventional technology, a control network element (for example, a session management function (SMF) network element) in a 5G core network still needs to manage a data plane module (for example, deliver a forwarding rule to the data plane module) through a first interface (for example, an N4 interface). In addition, the conventional N4 interface needs to perform addressing by using an IP address or a fully qualified domain name (FQDN), that is, connected to the 5G core network in a wired manner. However, if the data plane module is deployed on an IAB node, connectivity to the 5G core network cannot be maintained through a wired connection. To be specific, the control network element in the 5G core network cannot address the data plane module by using the conventional IP address or the FQDN, and cannot control and manage the data plane module.

As shown in FIG. 1-2, in the current 5G standard, a data plane module may register, directly through a service-based interface or indirectly (for example, by using a network management (Operation, Administration, and Maintenance, OAM) network element), a data plane instance corresponding to the data plane module with a network function repository (NRF) (in step 5 or step 6 in FIG. 1-2), so that an SMF network element selects a data plane module in step 1 and step 2, and can obtain a specifically required data plane instance from the NRF (for example, in step 7, a notification message carries a user plane network element list that meets a requirement of the SMF network element in step 1).

However, when the data plane module directly registers with the NRF through a service-based interface, IP connectivity needs to exist between the data plane module and the NRF. In this way, the data plane module can correctly address the NRF network element by using an IP address or an FQDN, to complete instance registration. However, if an instance is integrated/disposed on an IAB node, addressing cannot still be performed in the existing manner in a wireless backhaul network. For a manner in which the data plane module indirectly registers with the NRF by using the OAM, because an instance integrated/disposed on an IAB node does not have a direct IP channel with the OAM, work cannot be performed in this registration manner. If the data plane instance cannot be normally registered, the SMF network element cannot normally select a data plane, and subsequently, it is difficult for the SMF network element to manage and control the data plane instance.

SUMMARY

Embodiments of this application provide a user plane network element management method, apparatus, and system, so that a session management network element can correctly address a data plane instance.

To achieve the foregoing objective, the embodiments of this application provide the following technical solutions.

According to a first aspect, an embodiment of this application provides a communications method. The method includes: A session management network element determines information that is about a target data plane instance and that includes a routing indicator. The routing indicator is used to determine an address of the target data plane instance. The target data plane instance is associated with a wireless backhaul IAB node. The session management network element sends an N4 session management request message and a first indication to the IAB node by using a mobility management network element or a donor node that provides a service for the IAB node, where the first indication is used to indicate the IAB node to send the N4 session management request message to the target data plane instance.

An embodiment of this application provides a communications method. In the method, after a session management network element determines information about a target data plane instance, because the information about the target data plane instance includes a routing indicator, the session management network element may determine an address of the target data plane instance based on the routing indicator, so that the session management network element can correctly address the target data plane instance. Because the target data plane instance is associated with an IAB node, the session management network element may send an N4 session management request message to the IAB node, to manage the target data plane instance. In this solution, the target data plane instance can be registered and managed after an N4 interface is wireless.

In an embodiment, before the session management network element sends the N4 session management request message and the first indication to the IAB node by using the mobility management network element, the method provided in this embodiment of this application further includes: The session management network element determines that the session management network element locally has a context of the IAB node. That the session management network element sends an N4 session management request message and a first indication to the IAB node by using a mobility management network element includes: The session management network element generates a session management non-access stratum (NAS) message based on the context of the IAB node, where the session management NAS message includes the N4 session management request message and the first indication. The session management network element sends the session management NAS message to the IAB node by using the mobility management network element. If the session management network element locally has the context of the IAB node, it indicates that a terminal and the IAB node access a same mobility management network element. That the session management network element determines that the session management network element locally has the context of the IAB node may be replaced by that the session management network element obtains a local context of the IAB node.

In an embodiment, the session management network element does not locally have a context of the IAB node. The method provided in this embodiment of this application further includes: The session management network element sends the routing indicator to the mobility management network element, where after the mobility management network element is configured to determine, based on the routing indicator, that the mobility management network element locally has the context of the IAB node, the mobility management network element generates a mobility management NAS message based on the context of the IAB node, and sends the mobility management NAS message to the IAB node, where the mobility management NAS message includes the N4 session management request message and the first indication. In this way, when the session management network element does not locally have the context of the IAB node, the mobility management network element may address the IAB node, and send the N4 session management request message to the IAB node.

In an embodiment, the method provided in this embodiment of this application further includes: The session management network element receives indication information from the mobility management network element, where the indication information is used to indicate that the mobility management network element locally has the context of the IAB node.

In an embodiment, before the session management network element sends the routing indicator to the mobility management network element, the method provided in this embodiment of this application further includes: The session management network element obtains information about the mobility management network element of the IAB node from a subscriber data management network element. The method may be used in a scenario in which the session management network element determines that a mobility management network element that provides a service for the terminal does not have the context of the IAB node. In this way, the session management network element determines, from the subscriber data management network element, an address of the mobility management network element that provides the service for the IAB node.

In an embodiment, before the session management network element obtains the information about the mobility management network element of the IAB node from the subscriber data management network element, the method provided in this embodiment of this application may further include: The session management network element determines that the mobility management network element that provides the service for the terminal does not have the context of the IAB node.

In an embodiment, that the session management network element determines that the mobility management network element that provides the service for the terminal does not have the context of the IAB node includes: The session management network element sends a query request message to the mobility management network element that provides the service for the terminal, where the query request message is used to query whether the mobility management network element that provides the service for the terminal has the context of the IAB node. The session management network element receives a response message from the mobility management network element that provides the service for the terminal, where the response message is used to indicate that the mobility management network element that provides the service for the terminal does not have the context of the IAB node.

For example, the query request message carries the indication information, used to query whether the mobility management network element that provides the service for the terminal has the context of the IAB node. The response message carries acknowledgment information, used to indicate that the mobility management network element that provides the service for the terminal does not have the context of the IAB node.

In an embodiment, that the session management network element sends an N4 session management request message and a first indication to the IAB node by using a donor node further includes: The session management network element sends the routing indicator to the donor node, where the donor node is configured to send a first message to the IAB node based on the routing indicator, and the first message includes the N4 session management request message and the first indication. In this way, the donor node can address the IAB node.

In an embodiment, the method provided in this embodiment of this application further includes: The session management network element receives an N4 session management response message from the target data plane instance by using the IAB node. In this way, the session management network element determines whether the target data plane instance successfully manages an N4 session.

In an embodiment, the method provided in this embodiment of this application further includes: The session management network element obtains information about one or more data plane instances from a network storage network element, where the one or more data plane instances include the target data plane instance.

In an embodiment, the method provided in this embodiment of this application further includes: The session management network element receives information about one or more data plane instances of a data plane module by using a network management network element, the donor node, or the mobility management network element, where the one or more data plane instances include the target data plane instance. In this way, the information about the one or more data plane instances of the data plane module may be registered with the session management network element by receiving the information about the one or more data plane instances of the data plane module.

In an embodiment, the one or more data plane instances are transparently transmitted on the donor node or the mobility management network element, or the one or more data plane instances are processed by the donor node or the mobility management network element and then sent to the session management network element or the network storage network element.

In an embodiment, the IAB node and a data plane module corresponding to the target data plane instance are located in a same device. Alternatively, the IAB node has a data plane module corresponding to the target data plane instance.

According to a second aspect, an embodiment of this application provides a communications method. The method includes: A wireless backhaul IAB node receives an N4 session management request message and a first indication from a session management network element, where the first indication is used to indicate the IAB node to send the N4 session management request message to a target data plane instance. The IAB node sends the N4 session management request message to the target data plane instance according to the first indication, where the N4 session management request message is used to indicate to manage a session context of the target data plane instance.

In an embodiment, the method provided in this embodiment of this application further includes: The IAB node receives an N4 session management response message sent by the target data plane instance. The IAB node sends a second indication and the N4 session management response message to a donor node or a mobility management network element, where the second indication is used to indicate to send the N4 session management response message to the session management network element.

In an embodiment, the method provided in this embodiment of this application further includes: The IAB node sends, to a first device, a first message including information about one or more data plane instances corresponding to a data plane module. The information about the one or more data plane instances includes information about the target data plane instance, information about any data plane instance includes a routing indicator, and the first message is used to indicate the first device to register the information about the one or more data plane instances with the session management network element or a network storage network element. The routing indicator is used by the session management network element to determine an address of the any data plane instance. The any data plane instance is associated with the IAB node, and the first device includes any one of the following: a network management network element, the donor node, or the mobility management network element.

In an embodiment, the method provided in this embodiment of this application further includes: The first message includes a payload container (Payload Container), the payload container includes the information about the one or more data plane instances, and a type of the payload container is used to indicate the first device to register the information about the one or more data plane instances with the session management network element or the network storage network element.

In an embodiment, the method provided in this embodiment of this application further includes: The first message further includes a registration indication, and the registration indication is used to indicate the first device to register the information about the one or more data plane instances with the session management network element or the network storage network element.

In an embodiment, the method provided in this embodiment of this application further includes: There is a predefined operation interface between the IAB node and the first device, and the predefined operation interface is used to indicate the first device to register the information about the one or more data plane instances with the session management network element or the network storage network element. The method includes: The IAB node sends the first message to the first device through the predefined operation interface.

In an embodiment, the method provided in this embodiment of this application further includes: The information about the one or more data plane instances is transparently transmitted on the donor node or the mobility management network element, or the information about the one or more data plane instances is processed by the donor node or the mobility management network element and then sent to the session management network element or the network storage network element.

In an embodiment, the method provided in this embodiment of this application further includes: The IAB node and a data plane module corresponding to the data plane instance are located in a same device. Alternatively, the IAB node includes a data plane module corresponding to the data plane instance.

According to a third aspect, an embodiment of this application provides a communications method. The method includes: A mobility management network element that provides a service for an IAB node receives an N4 session management request message and a first indication from a session management network element, where the first indication is used to indicate the IAB node to send the N4 session management request message to a target data plane instance. The mobility management network element sends the N4 session management request message and the first indication to the IAB node.

In an embodiment, before the mobility management network element sends the N4 session management request message and the first indication to the IAB node, the method provided in this embodiment of this application further includes: The mobility management network element receives a routing indicator from the session management network element, where the routing indicator is used to determine an address of the target data plane instance, and the target data plane instance is associated with the AB node. After the mobility management network element determines, based on the routing indicator, that the mobility management network element locally has a context of the IAB node, the mobility management network element generates a mobility management NAS message based on the context of the IAB node. The mobility management network element sends the N4 session management request message and the first indication to the IAB node. The method includes: The mobility management network element sends the mobility management NAS message to the IAB node, where the mobility management NAS message includes the N4 session management request message and the first indication.

In an embodiment, before the mobility management network element that provides the service for the IAB node receives the N4 session management request message and the first indication from the session management network element, the method provided in this embodiment of this application further includes: The mobility management network element receives a query request message from the session management network element, where the query request message is used to query whether the mobility management network element has the context of the IAB node. If the mobility management network element has the context of the IAB node, the mobility management network element sends, to the session management network element, a response message used to indicate that the mobility management network element has the context of the IAB node. If the mobility management network element does not have the context of the IAB node, the mobility management network element sends, to the session management network element, a response message used to indicate that the mobility management network element does not have the context of the IAB node.

In an embodiment, the method provided in this embodiment of this application further includes: The mobility management network element receives a first message, where the first message includes information about one or more data plane instances of a data plane module, the first message is used to indicate the mobility management network element to register the information about the one or more data plane instances with the session management network element or an NRF network element, information about any data plane instance includes the routing indicator, and the information about the one or more data plane instances includes information about the target data plane instance. The mobility management network element registers the information about the one or more data plane instances with the session management network element or the network storage network element based on the first message.

In an embodiment, the information about the one or more data plane instances is transparently transmitted on the mobility management network element, or the information about the one or more data plane instances is processed by the mobility management network element and then sent to the session management network element or the network storage network element.

In an embodiment, the method provided in this embodiment of this application further includes: The mobility management network element receives an N4 session management response message and a second indication from the data plane instance by using the IAB node or a donor node, where the second indication is used to indicate to send the N4 session management response message to the session management network element. The mobility management network element sends the N4 session management response message to the session management network element.

According to a fourth aspect, an embodiment of this application provides a communications apparatus. The communications apparatus may implement the communications method according to any one of the first aspect or the possible implementations of the first aspect, and therefore may also achieve beneficial effects of any one of the first aspect or the possible implementations of the first aspect. The communications apparatus may be a session management network element, or may be an apparatus that can support a session management network element in implementing the communications method according to any one of the first aspect or the possible implementations of the first aspect, for example, a chip applied to the session management network element. The communications apparatus may implement the foregoing method by using software, hardware, or hardware executing corresponding software.

In an example, an embodiment of this application provides a communications apparatus, including: a processing unit, configured to determine information about a target data plane instance, where the information about the target data plane instance includes a routing indicator, the routing indicator is used to determine an address of the target data plane instance, and the target data plane instance is associated with a wireless backhaul IAB node; and a communications unit, configured to send an N4 session management request message and a first indication to the IAB node by using a mobility management network element or a donor node that provides a service for the IAB node, where the first indication is used to indicate the IAB node to send the N4 session management request message to the target data plane instance.

In an embodiment, before the communications unit is configured to send the N4 session management request message and the first indication to the IAB node by using the mobility management network element, the processing unit is further configured to determine that the apparatus locally has a context of the IAB node; and the processing unit is further configured to generate a session management non-access stratum NAS message based on the context of the IAB node, where the session management NAS message includes the N4 session management request message and the first indication. The communications unit is further configured to send the session management NAS message to the IAB node by using the mobility management network element.

In an embodiment, the processing unit is configured to determine that the apparatus does not locally have a context of the IAB node. The communications unit is further configured to send the routing indicator to the mobility management network element, where after the mobility management network element is configured to determine, based on the routing indicator, that the mobility management network element locally has the context of the IAB node, the mobility management network element generates a mobility management NAS message based on the context of the IAB node, and sends the mobility management NAS message to the IAB node, where the mobility management NAS message includes the N4 session management request message and the first indication.

In an embodiment, the communications unit provided in this embodiment of this application is further configured to receive indication information from the mobility management network element, where the indication information is used to indicate that the mobility management network element locally has the context of the IAB node.

In an embodiment, before the communications unit is configured to send the routing indicator to the mobility management network element, the communications unit is further configured to obtain information about the mobility management network element of the IAB node from a subscriber data management network element.

In an embodiment, before the communications unit obtains the information about the mobility management network element of the IAB node from the subscriber data management network element, the processing unit is further configured to determine that a mobility management network element that provides a service for a terminal does not have the context of the IAB node.

In an embodiment, when the processing unit determines that the mobility management network element that provides the service for the terminal does not have the context of the IAB node, the communications unit is further configured to send a query request message to the mobility management network element that provides the service for the terminal, where the query request message is used to query whether the mobility management network element that provides the service for the terminal has the context of the IAB node. The session management network element receives a response message from the mobility management network element that provides the service for the terminal, where the response message is used to indicate that the mobility management network element that provides the service for the terminal does not have the context of the IAB node.

For example, the query request message carries the indication information, used to query whether the mobility management network element that provides the service for the terminal has the context of the IAB node. The response message carries acknowledgment information, used to indicate that the mobility management network element that provides the service for the terminal does not have the context of the IAB node.

In an embodiment, that the communications unit is configured to send an N4 session management request message and a first indication to the IAB node by using a donor node further includes: sending the routing indicator to the donor node, where the donor node is configured to send a first message to the IAB node based on the routing indicator, and the first message includes the N4 session management request message and the first indication.

In an embodiment, the communications unit is further configured to receive an N4 session management response message from the target data plane instance by using the IAB node.

In an embodiment, the communications unit is further configured to obtain information about one or more data plane instances from a network storage network element, where the one or more data plane instances include the target data plane instance.

In an embodiment, the communications unit is further configured to receive information about one or more data plane instances of a data plane module by using a network management network element, the donor node, or the mobility management network element, where the one or more data plane instances include the target data plane instance.

In an embodiment, the one or more data plane instances are transparently transmitted on the donor node or the mobility management network element, or the one or more data plane instances are processed by the donor node or the mobility management network element and then sent to the apparatus or the network storage network element.

In an embodiment, the IAB node and a data plane module corresponding to the target data plane instance are located in a same device. Alternatively, the IAB node has a data plane module corresponding to the target data plane instance.

In another example, an embodiment of this application provides a communications apparatus. The communications apparatus may be a session management network element, or may be a chip in the session management network element. The communications apparatus may include a communications unit and a processing unit. When the communications apparatus is the session management network element, the communications unit may be a communications interface. The communications apparatus may further include a storage unit. The storage unit may be a memory. The storage unit is configured to store computer program code, where the computer program code includes instructions. The processing unit may be a processor. The processing unit executes the instructions stored in the storage unit, so that the session management network element implements the communications method according to any one of the first aspect or the possible implementations of the first aspect. When the communications apparatus is the chip in the session management network element, the processing unit may be a processor, and the communications unit may be collectively referred to as a communications interface. For example, the communications interface may be an input/output interface, a pin, or a circuit. The processing unit executes computer program code stored in a storage unit, so that the session management network element implements the communications method according to any one of the first aspect or the possible implementations of the first aspect. The storage unit may be a storage unit (for example, a register or a cache) in the chip, or may be a storage unit (for example, a read-only memory or a random access memory) that is in the session management network element and that is located outside the chip.

Optionally, the processor, the communications interface, and the memory are coupled to each other.

According to a fifth aspect, an embodiment of this application provides a communications apparatus. The communications apparatus may implement the communications apparatus according to any one of the second aspect or the possible implementations of the second aspect, and therefore may also achieve beneficial effects of any one of the second aspect or the possible implementations of the second aspect. The communications apparatus may be an IAB node, or may be an apparatus that can support an IAB node in implementing the communications method according to any one of the second aspect or the possible implementations of the second aspect, for example, a chip applied to the IAB node. The communications apparatus may implement the foregoing method by using software, hardware, or hardware executing corresponding software.

In an example, an embodiment of this application provides a communications apparatus, including: a processing unit, configured to process information; and a communications unit, configured to receive an N4 session management request message and a first indication from a session management network element, where the first indication is used to indicate the communications unit to send the N4 session management request message to a target data plane instance, where the communications unit is configured to send the N4 session management request message to the target data plane instance according to the first indication, where the N4 session management request message is used to indicate to manage a session context of the target data plane instance.

In an embodiment, the communications unit is further configured to receive an N4 session management response message sent by the target data plane instance; and the IAB node sends a second indication and an N4 session management response message to a donor node or a mobility management network element, where the second indication is used to indicate to send the N4 session management response message to the session management network element.

In an embodiment, the communications unit is further configured to send a first message to a first device, where the first message includes information about one or more data plane instances corresponding to a data plane module, the information about the one or more data plane instances includes information about the target data plane instance, information about any data plane instance includes a routing indicator, the first message is used to indicate the first device to register the information about the one or more data plane instances with the session management network element or a network storage network element, the routing indicator is used by the session management network element to determine an address of the any data plane instance, the any data plane instance is associated with the apparatus, and the first device includes any one of the following: a network management network element, the donor node, or the mobility management network element.

In an embodiment, the first message includes a payload container (Payload Container), the payload container includes the information about the one or more data plane instances, and a type of the payload container is used to indicate the first device to register the information about the one or more data plane instances with the session management network element or the network storage network element.

In an embodiment, the first message further includes a registration indication, and the registration indication is used to indicate the first device to register the information about the one or more data plane instances with the session management network element or the network storage network element.

In an embodiment, there is a predefined operation interface between the communications apparatus and the first device in this embodiment of this application, and the predefined operation interface is used to indicate the first device to register the information about the one or more data plane instances with the session management network element or the network storage network element. The communications unit is configured to send the first message to the first device through the predefined operation interface.

In an embodiment, the information about the one or more data plane instances is transparently transmitted on the donor node or the mobility management network element, or the information about the one or more data plane instances is processed by the donor node or the mobility management network element and then sent to the session management network element or the network storage network element.

In an embodiment, the IAB node and a data plane module corresponding to the data plane instance are located in a same device. Alternatively, the IAB node has a data plane module corresponding to the data plane instance.

In another example, an embodiment of this application provides a communications apparatus. The communications apparatus may be an IAB node, or may be a chip in the IAB node. The communications apparatus may include a communications unit and a processing unit. When the communications apparatus is the IAB node, the communications unit may be a communications interface. The communications apparatus may further include a storage unit. The storage unit may be a memory. The storage unit is configured to store computer program code, where the computer program code includes instructions. The processing unit may be a processor. The processing unit executes the instructions stored in the storage unit, so that the IAB node implements the communications method according to any one of the second aspect or the possible implementations of the second aspect. When the communications apparatus is the chip in the IAB node, the processing unit may be a processor, and the communications unit may be collectively referred to as a communications interface. For example, the communications interface may be an input/output interface, a pin, or a circuit. The processing unit executes computer program code stored in a storage unit, so that the IAB node implements the communications method according to any one of the second aspect or the possible implementations of the second aspect. The storage unit may be a storage unit (for example, a register or a cache) in the chip, or may be a storage unit (for example, a read-only memory or a random access memory) that is in the IAB node and that is located outside the chip.

Optionally, the processor, the communications interface, and the memory are coupled to each other.

According to a sixth aspect, an embodiment of this application provides a communications apparatus. The communications apparatus may implement the communications method according to any one of the third aspect or the possible implementations of the third aspect, and therefore may also achieve beneficial effects of any one of the third aspect or the possible implementations of the third aspect. The communications apparatus may be a mobility management network element, or may be an apparatus that can support a mobility management network element in implementing the communications method according to any one of the third aspect or the possible implementations of the third aspect, for example, a chip applied to the mobility management network element. The communications apparatus may implement the foregoing method by using software, hardware, or hardware executing corresponding software.

In an example, an embodiment of this application provides a communications apparatus, including: a processing unit, configured to process information; and a communications unit, configured to receive an N4 session management request message and a first indication from a session management network element, where the first indication is used to indicate an IAB node to send the N4 session management request message to a target data plane instance, where the communications unit is further configured to send the N4 session management request message and the first indication to the IAB node.

In an embodiment, before the communications unit is further configured to send the N4 session management request message and the first indication to the IAB node, the communications unit is further configured to receive a routing indicator from the session management network element, where the routing indicator is used to determine an address of the target data plane instance, and the target data plane instance is associated with the AB node. After determining, based on the routing indicator, that the apparatus locally has a context of the IAB node, the processing unit is configured to generate a mobility management NAS message based on the context of the IAB node. The communications unit is configured to send the mobility management NAS message to the IAB node, where the mobility management NAS message includes the N4 session management request message and the first indication.

In an embodiment, the communications unit is further configured to receive a first message, where the first message includes information about one or more data plane instances of a data plane module, the first message is used to indicate the apparatus to register the information about the one or more data plane instances with the session management network element or an NRF network element, information about any data plane instance includes the routing indicator, and the information about the one or more data plane instances includes information about the target data plane instance. The processing unit is configured to register the information about the one or more data plane instances with the session management network element or the network storage network element based on the first message by using the communications unit.

In an embodiment, the information about the one or more data plane instances is transparently transmitted on the mobility management network element, or the information about the one or more data plane instances is processed by the mobility management network element and then sent to the session management network element or the network storage network element.

In an embodiment, the communications unit is configured to receive an N4 session management response message and a second indication from the target data plane instance by using the IAB node or a donor node, where the second indication is used to indicate to send the N4 session management response message to the session management network element. The communications unit is configured to send the N4 session management response message to the session management network element.

In another example, an embodiment of this application provides a communications apparatus. The communications apparatus may be a mobility management network element, or may be a chip in the mobility management network element. The communications apparatus may include a communications unit and a processing unit. When the communications apparatus is the mobility management network element, the communications unit may be a communications interface. The communications apparatus may further include a storage unit. The storage unit may be a memory. The storage unit is configured to store computer program code, where the computer program code includes instructions. The processing unit may be a processor. The processing unit executes the instructions stored in the storage unit, so that the mobility management network element implements the communications method according to any one of the third aspect or the possible implementations of the third aspect. When the communications apparatus is the chip in the mobility management network element, the processing unit may be a processor, and the communications unit may be collectively referred to as a communications interface. For example, the communications interface may be an input/output interface, a pin, or a circuit. The processing unit executes computer program code stored in a storage unit, so that the mobility management network element implements the communications method according to any one of the third aspect or the possible implementations of the third aspect. The storage unit may be a storage unit (for example, a register or a cache) in the chip, or may be a storage unit (for example, a read-only memory or a random access memory) that is in the mobility management network element and that is located outside the chip.

Optionally, the processor, the communications interface, and the memory are coupled to each other.

According to a seventh aspect, an embodiment of this application provides a computer-readable storage medium. The computer-readable storage medium stores a computer program or instructions. When the computer program or the instructions are run on a computer, the computer is enabled to perform the communications method according to any one of the first aspect or the possible implementations of the first aspect.

According to an eighth aspect, an embodiment of this application provides a computer-readable storage medium. The computer-readable storage medium stores a computer program or instructions. When the computer program or the instructions are run on a computer, the computer is enabled to perform the communications method according to any one of the second aspect or the possible implementations of the second aspect.

According to a ninth aspect, an embodiment of this application provides a computer-readable storage medium. The computer-readable storage medium stores a computer program or instructions. When the computer program or the instructions are run on a computer, the computer is enabled to perform the communications method according to any one of the third aspect or the possible implementations of the third aspect.

According to a tenth aspect, an embodiment of this application provides a computer program product including instructions. When the instructions are run on a computer, the computer is enabled to perform the communications method according to any one of the first aspect or the possible implementations of the first aspect.

According to an eleventh aspect, an embodiment of this application provides a computer program product including instructions. When the instructions are run on a computer, the computer is enabled to perform the communications method according to any one of the second aspect or the possible implementations of the second aspect.

According to a twelfth aspect, an embodiment of this application provides a computer program product including instructions. When the instructions are run on a computer, the computer is enabled to perform the communications method according to any one of the third aspect or the possible implementations of the third aspect.

According to a thirteenth aspect, an embodiment of this application provides a communications apparatus. The communications apparatus includes a processor and a storage medium. The storage medium stores instructions, and the instructions are run by the processor, to implement the communications method according to any one of the first aspect or the possible implementations of the first aspect.

According to a fourteenth aspect, an embodiment of this application provides a communications apparatus. The communications apparatus includes a processor and a storage medium. The storage medium stores instructions, and the instructions are run by the processor, to implement the communications method according to any one of the second aspect or the possible implementations of the second aspect.

According to a fifteenth aspect, an embodiment of this application provides a communications apparatus. The communications apparatus includes a processor and a storage medium. The storage medium stores instructions, and the instructions are run by the processor, to implement the communications method according to any one of the third aspect or the possible implementations of the third aspect.

According to a sixteenth aspect, an embodiment of this application provides a communications apparatus, including at least one processor and a communications interface. The at least one processor and the communications interface are interconnected through a line, the at least one processor is coupled to a memory, the memory is configured to store a computer program or instructions, and the at least one processor is configured to execute the computer program or the instructions in the memory, so that the communications apparatus performs the communications method according to any one of the first aspect or the possible implementations of the first aspect.

According to a seventeenth aspect, an embodiment of this application provides a communications apparatus, including at least one processor and a communications interface. The at least one processor and the communications interface are interconnected through a line, the at least one processor is coupled to a memory, the memory is configured to store a computer program or instructions, and the at least one processor is configured to execute the computer program or the instructions in the memory, so that the communications apparatus performs the communications method according to any one of the second aspect or the possible implementations of the second aspect.

According to an eighteenth aspect, an embodiment of this application provides a communications apparatus, including at least one processor and a communications interface. The at least one processor and the communications interface are interconnected through a line, the at least one processor is coupled to a memory, the memory is configured to store a computer program or instructions, and the at least one processor is configured to execute the computer program or the instructions in the memory, so that the communications apparatus performs the communications method according to any one of the third aspect or the possible implementations of the third aspect.

In an embodiment, the apparatus according to any one of the sixteenth aspect, the seventeenth aspect, or the eighteenth aspect may further include the memory.

According to a nineteenth aspect, an embodiment of this application provides a chip. The chip includes at least one processor and a communications interface. The communications interface is coupled to the at least one processor, and the at least one processor is configured to run a computer program or instructions, to implement the communications method according to any one of the first aspect or the possible implementations of the first aspect. The communications interface is configured to communicate with another module outside the chip.

According to a twentieth aspect, an embodiment of this application provides a chip. The chip includes at least one processor and a communications interface. The communications interface is coupled to the at least one processor, and the at least one processor is configured to run a computer program or instructions, to implement the communications method according to any one of the second aspect or the possible implementations of the second aspect. The communications interface is configured to communicate with another module outside the chip.

According to a twenty-first aspect, an embodiment of this application provides a chip. The chip includes at least one processor and a communications interface. The communications interface is coupled to the at least one processor, and the at least one processor is configured to run a computer program or instructions, to implement the method according to any one of the third aspect or the possible implementations of the third aspect. The communications interface is configured to communicate with another module outside the chip.

The chip provided in this embodiment of this application may further include a memory, and the memory is configured to store the computer program or the instructions.

According to a twenty-second aspect, an embodiment of this application provides a communications apparatus. The communications apparatus includes one or more modules, configured to implement the methods according to the first aspect, the second aspect, and the third aspect, and the one or more modules may correspond to the steps in the methods according to the first aspect, the second aspect, and the third aspect.

According to a twenty-third aspect, an embodiment of this application provides a communications apparatus, including at least one processor. The at least one processor is coupled to a memory, the memory is configured to store a computer program or instructions, and the at least one processor is configured to execute the computer program or the instructions in the memory, so that the communications apparatus performs the communications method according to any one of the first aspect or the possible implementations of the first aspect.

According to a twenty-fourth aspect, an embodiment of this application provides a communications apparatus, including at least one processor. The at least one processor is coupled to a memory, the memory is configured to store a computer program or instructions, and the at least one processor is configured to execute the computer program or the instructions in the memory, so that the communications apparatus performs the communications method according to any one of the second aspect or the possible implementations of the second aspect.

According to a twenty-fifth aspect, an embodiment of this application provides a communications apparatus, including at least one processor. The at least one processor is coupled to a memory, the memory is configured to store a computer program or instructions, and the at least one processor is configured to execute the computer program or the instructions in the memory, so that the communications apparatus performs the communications method according to any one of the third aspect or the possible implementations of the third aspect.

According to a twenty-sixth aspect, an embodiment of this application provides a communications system. The communications system includes the communications apparatus according to any one of the fourth aspect or the possible implementations of the fourth aspect, and the communications apparatus according to any one of the fifth aspect or the possible implementations of the fifth aspect.

In an embodiment, the communications system may further include the communications apparatus according to any one of the sixth aspect or the possible implementations of the sixth aspect.

Specifically, for specific steps performed by each communications apparatus in the communications system, refer to corresponding descriptions. Details are not described herein again.

For beneficial effects of the second aspect to the twenty-sixth aspect and the implementations thereof in this application, refer to analysis of beneficial effects of the first aspect and the implementations thereof. Details are not described herein again.

BRIEF DESCRIPTION OF DRAWINGS

FIG. 1-2 shows a UPF instance registration process according to an embodiment of this application;

FIG. 2 is a schematic diagram 2 of a scenario according to an embodiment of this application;

FIG. 6 to FIG. 15A and FIG. 15B each are a schematic flowchart of a communications method according to an embodiment of this application;

DESCRIPTION OF EMBODIMENTS

Figures 1, 1A:
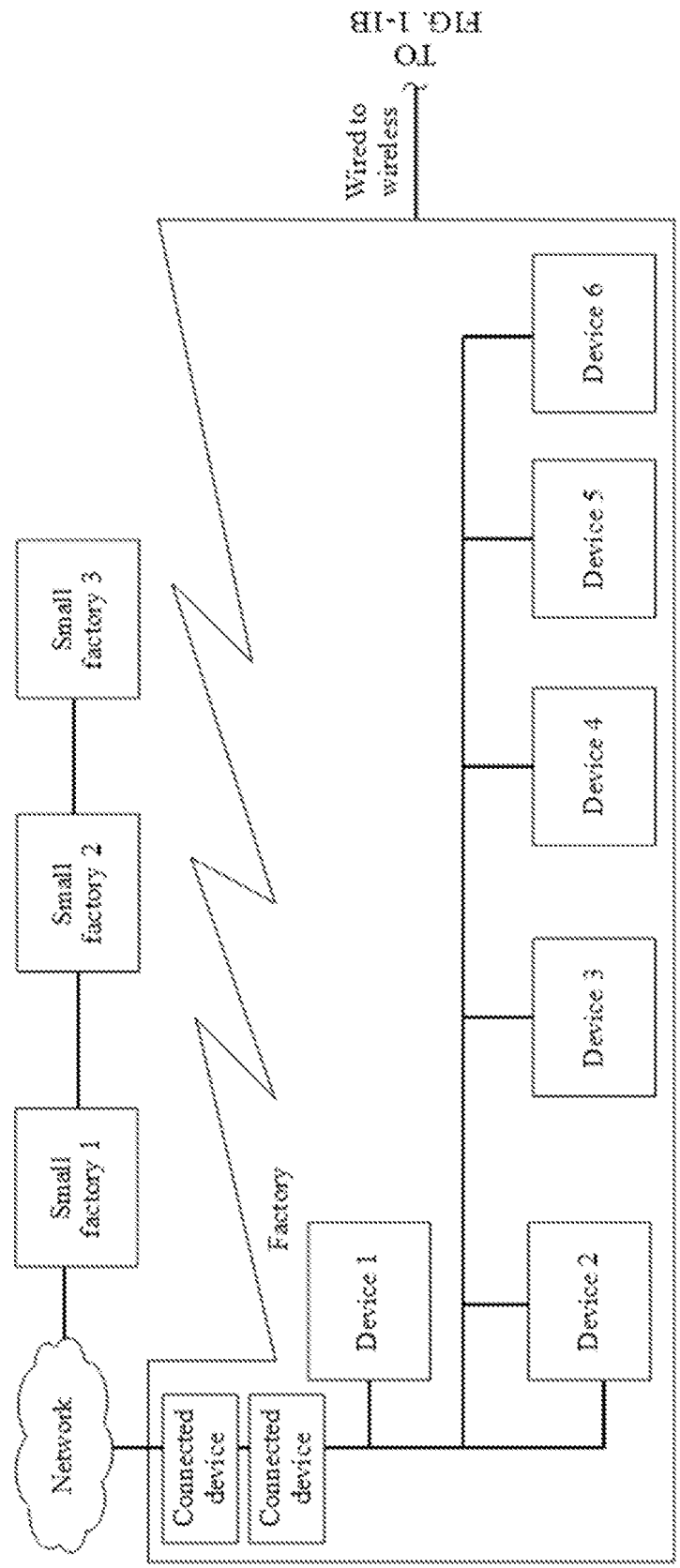
FIG. 1-1A and FIG. 1-1B are a schematic diagram 1 of a scenario according to an embodiment of this application.
Figures 1, 1B:
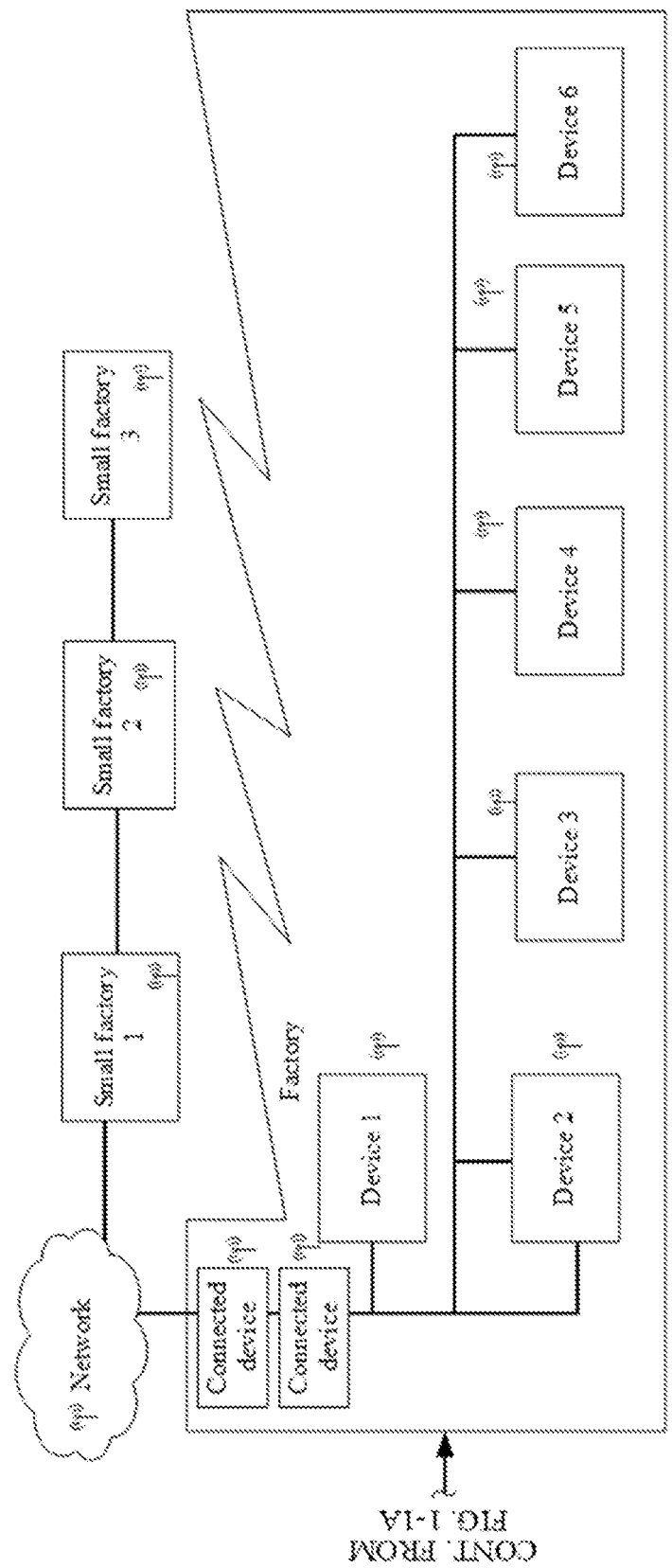

To clearly describe the technical solutions in the embodiments of this application, terms such as "first" and "second" are used in the embodiments of this application to distinguish between same items or similar items that have basically same functions and purposes. For example, a first message and a second message are merely used to distinguish between different messages, and do not limit a sequence of the first message and the second message. A person skilled in the art may understand that the terms such as "first" and "second" do not limit a quantity and an execution sequence, and the terms such as "first" and "second" do not indicate a definite difference.

It should be noted that, in this application, a term such as "example" or "for example" is used to represent giving an example, an illustration, or descriptions. Any embodiment or design solution described as an "example" or "for example" in this application should not be explained as being more preferable or having more advantages than another embodiment or design solution. Exactly, use of the word such as "example" or "for example" is intended to present a related concept in a specific manner.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof means any combination of the following, including any combination of one or more of the following. For example, at least one of a, b, or c may indicate: a, b, c, a and b, a and c, b and c, or a, b, and c, where a, b, and c may be singular or plural.

A system architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of a network architecture and emergence of a new service scenario, the technical solutions provided in the embodiments of this application are also applicable to similar technical problems. In the embodiments of this application, descriptions are provided by using an example in which a provided method is applied to an NR system or a 5G network.

Figures 1, 2:
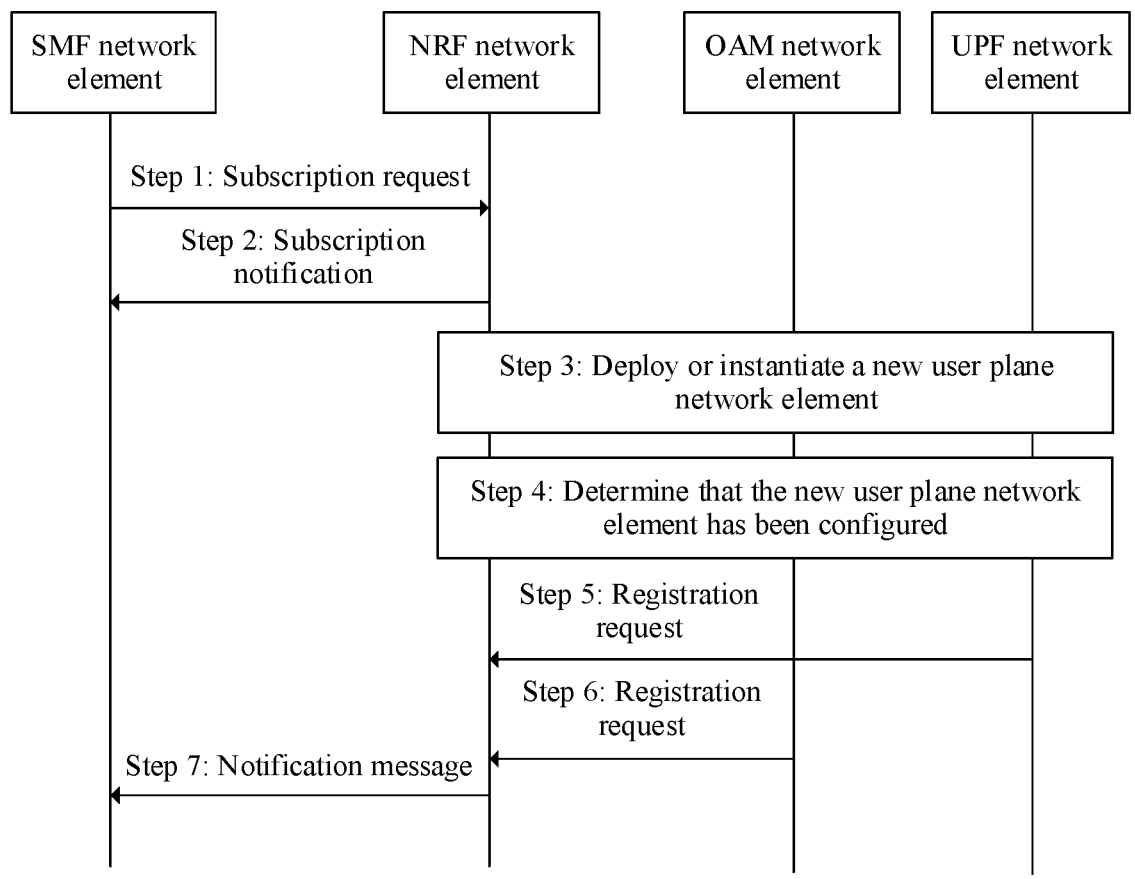
Figure 2:
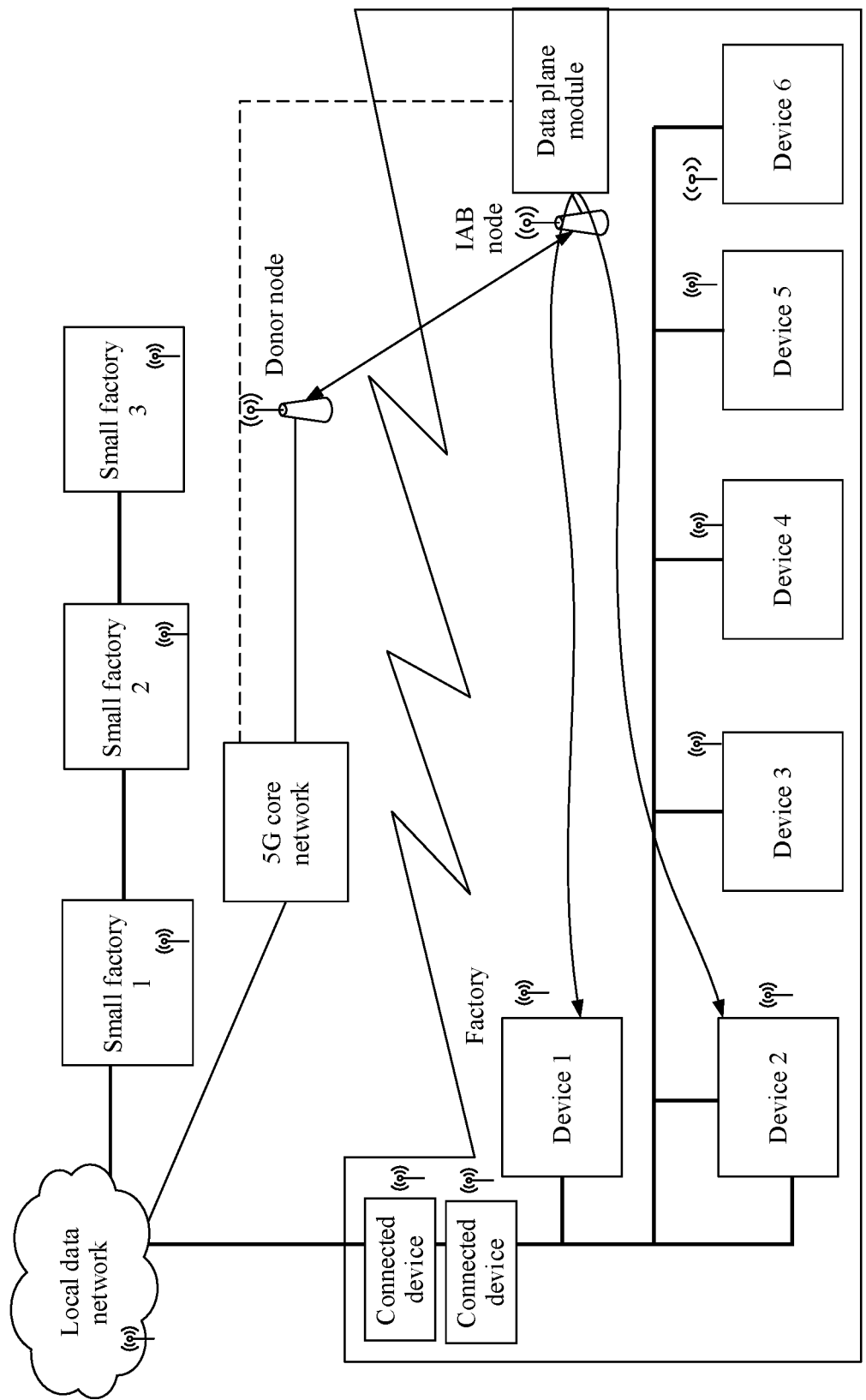

FIG. 2 shows a network deployment manner in which a method is applicable to an industrial scenario according to an embodiment of this application. As shown in FIG. 2, a local data network, a 5G core network, a donor node communicating with the 5G core network, and an IAB node accessing the donor node are included. The IAB node is deployed near a production line, and a data plane module is integrated behind the IAB node or the IAB node and the data plane module are disposed on a same device. In this way, when local devices (for example, a device 1 and a device 2) exchange data, the data of the device 1 may be forwarded to the device 2 after being processed by the data plane module, and no longer needs to be forwarded to the core network, to greatly reduce a transmission latency.

Figure 3A:
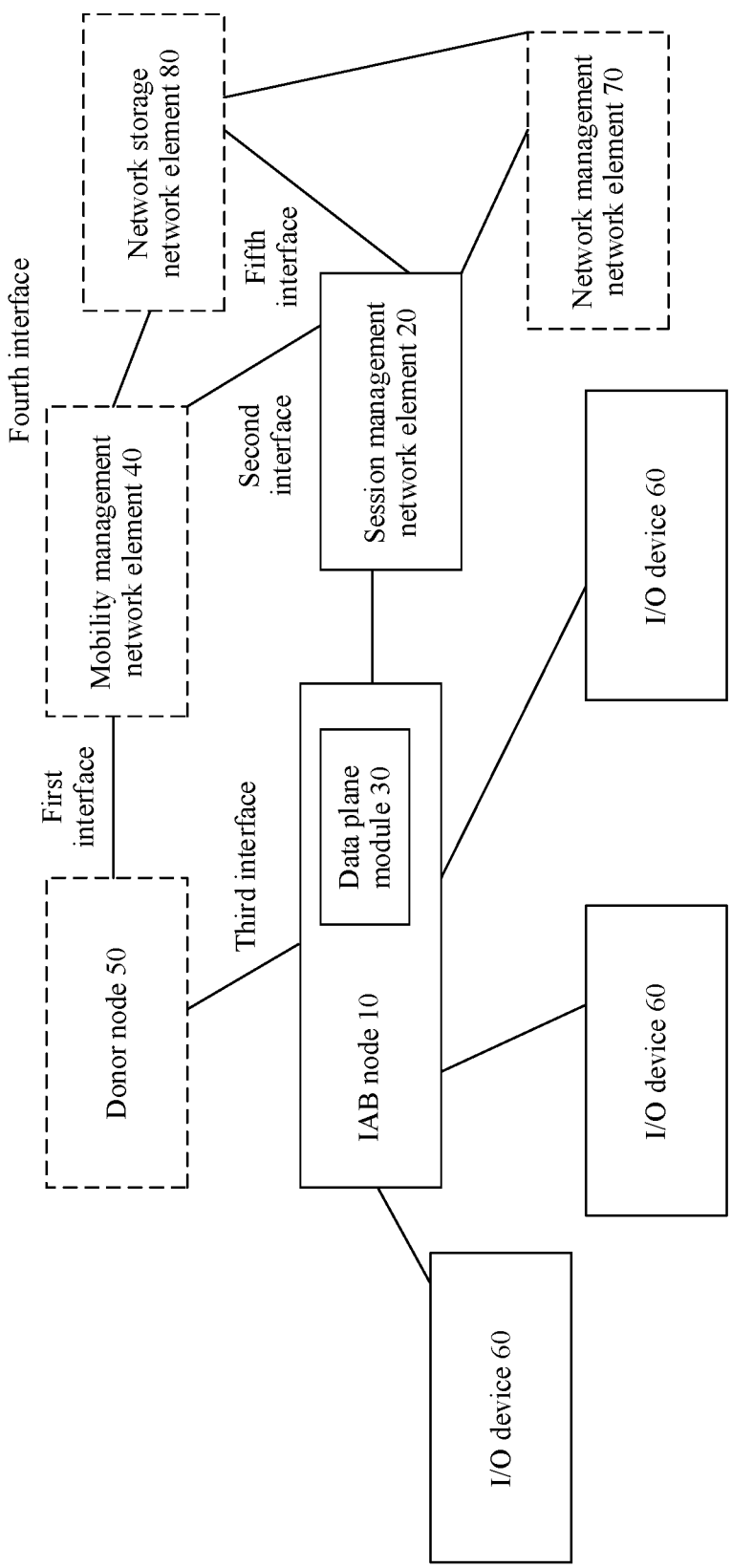
FIG. 3a is a diagram 1 of an architecture of a communications system according to an embodiment of this application.

As shown in FIG. 3a, an embodiment of this application provides a communications system. The communications system includes an IAB node 10, a session management network element 20, and a data plane module 30 located inside the IAB node 10. One data plane module 30 may correspond to one or more data plane instances.

In an optional implementation, as shown in FIG. 3a, the communications system may further include a network storage network element 80. The NRF network element 80 may store information about the one or more data plane instances. Specifically, for the information about the data plane instance, refer to descriptions in the following embodiments. Details are not described herein. When the information about the one or more data plane instances is registered by the IAB node 10 with the session management network element 20, the network storage network element 80 may be omitted.

In an embodiment, as shown in FIG. 3a, the communications system may further include a mobility management network element 40, a donor node 40, one or more input/output devices (I/O devices) 60, or a network management network element 70. For example, the I/O device may be a terminal.

The IAB node 10 may register the information about the one or more data plane instances with the network storage network element 80 or the session management network element 20 by using the mobility management network element 40, the donor node 40, or the network management network element 70.

The IAB node 10 may indirectly communicate with the session management network element 20. For example, the IAB node 10 communicates with the session management network element 20 by using the mobility management network element 40 or the donor node 50.

There is a first interface between the mobility management network element 40 and the donor node 50. For example, in a 5G network, the first interface may be an N2 interface. There is a second interface between the mobility management network element 40 and the session management network element 20. For example, in the 5G network, the second interface may be an N11 interface. In this embodiment of this application, names of the interfaces between the network elements are merely examples. There is a third interface between the donor node 50 and the IAB node 10. For example, the third interface may be a Uu interface.

There is a fourth interface between the network storage network element 80 and the mobility management network element 40. The fourth interface may be a service-based interface configured to provide a registration function of the information about the data plane instance. A service-based interface configured to provide a registration function of the information about the data plane instance also exists between the mobility management network element 40 and the session management network element 20. There is an interface between the NRF network element 80 and the network management network element 70.

It should be understood that, when the data plane module 30 is located inside the IAB node 10, an N4 interface may be indirectly implemented between the IAB node 10 and the session management network element 20 in FIG. 3a.

Figure 3B:
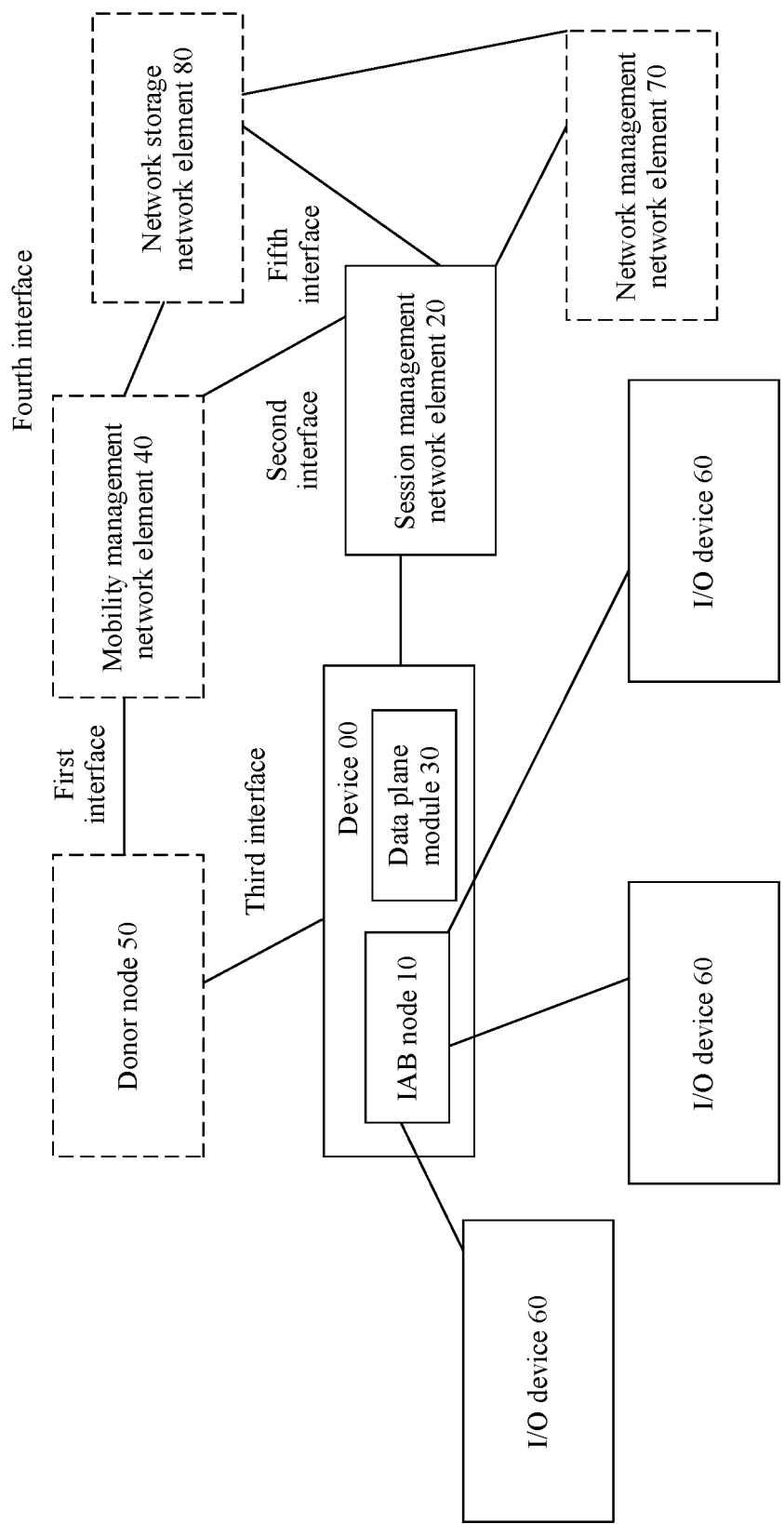
FIG. 3b is a diagram 2 of an architecture of a communications system according to an embodiment of this application.

As shown in FIG. 3b, an embodiment of this application provides another communications system. A difference between FIG. 3b and FIG. 3a lies in: In FIG. 3a, the data plane module 30 may be located inside the IAB node 10, that is, the IAB node 10 includes the data plane module 30, or the IAB node 10 is integrated with the data plane module 30. In FIG. 3b, the data plane module 30 and the IAB node 10 are located in a same device 00.

It should be understood that, when the IAB node 10 is located in the device 00 in FIG. 3b, an N4 interface may be indirectly implemented between the session management network element 20 and the IAB node 10.

In the communications system shown in FIG. 3a or FIG. 3b, the terminal and the IAB node may access a same mobility management network element 40, that is, a mobility management network element selected by the terminal is the same as a mobility management network element selected by the IAB node. Alternatively, the terminal and the IAB node may access different mobility management network elements 40, that is, a mobility management network element selected by the terminal is different from a mobility management network element selected by the IAB node. The terminal and the IAB node may access different session management network elements, that is, a session management network element selected by the terminal is different from a session management network element selected by the IAB node. Alternatively, the terminal and the IAB node may access a same session management network element, that is, a session management network element selected by the terminal is the same as a session management network element selected by the IAB node.

Figure 3C:
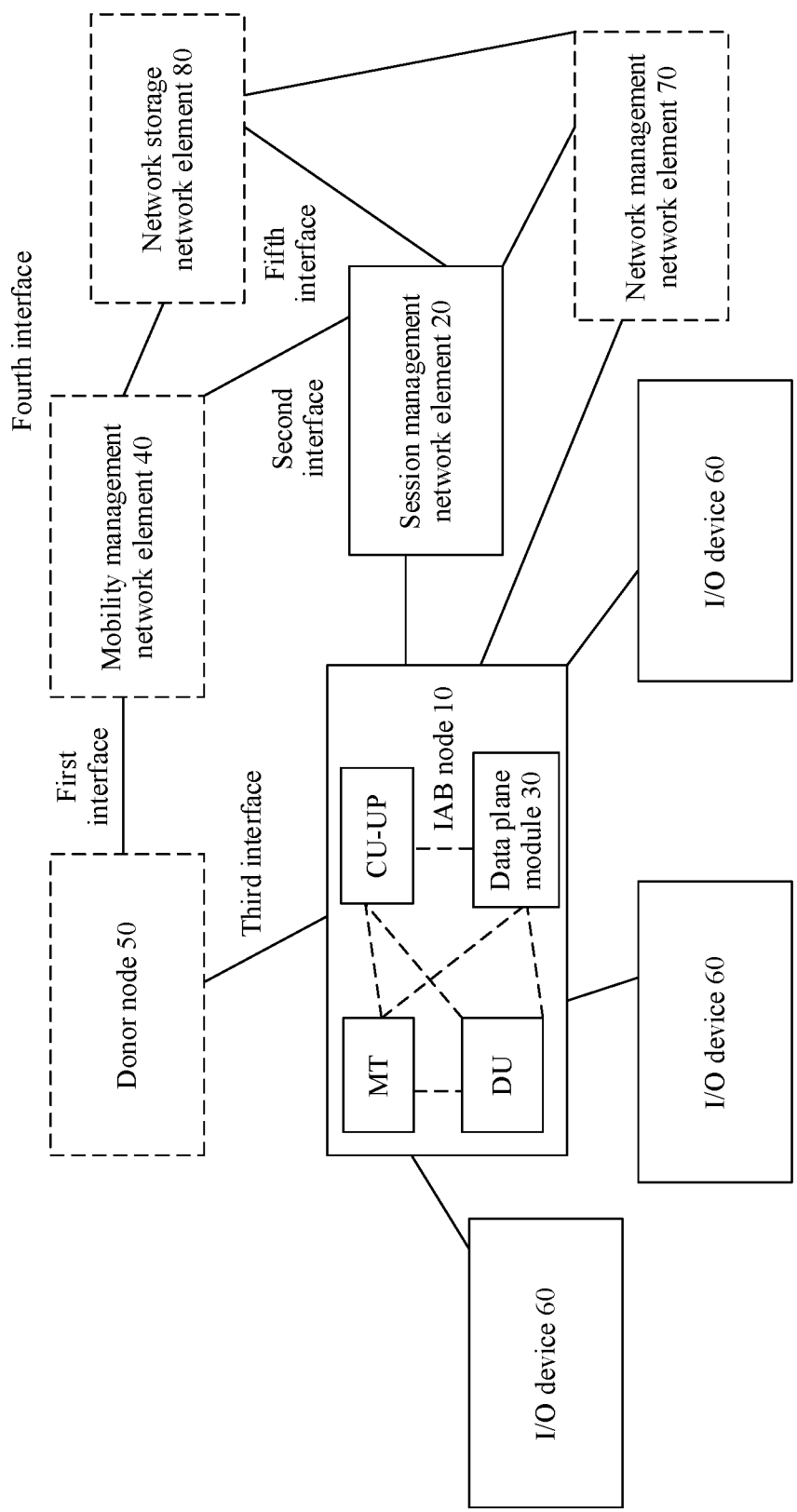
FIG. 3c is a diagram 3 of an architecture of a communications system according to an embodiment of this application.

When a split architecture is used for the IAB node, with reference to FIG. 3a, if the data plane module 50 is located inside the IAB node 10, as shown in FIG. 3c, the IAB node includes a mobile terminal (MT) of the IAB node, and a distributed unit (DU), the data plane module 30, and a distributed user plane (Centralized Unit-User Plane, CU-UP) that are of the IAB node. To be specific, each functional module is used as an internal module of the IAB node, to enhance functions of the existing IAB node. There is an internal interface between the MT, the DU, the data plane module 30, and the CU-UP, and any two modules may communicate with each other through the internal interface.

For the IAB node, the DU of the IAB node is similar to a DU of a gNB, and is configured to provide an access service for a child node (for example, a terminal or another IAB node) attached to the DU, that is, a function of a Uu interface. For example, the DU may provide a wireless connection function for the terminal or a lower-level IAB node. The MT has some functions of the terminal, so that the IAB node 10 and the donor node 40 can communicate with each other through the Uu interface. The CU-UP is a functional module that is in a centralized base station module and that processes user plane data.

The MT of the IAB node is similar to the terminal, and is configured to: provide data backhaul for a child node attached to the DU of the IAB node, and send, to the donor node in a backhaul manner, data of the child node attached to the DU of the IAB node. In a scenario in which the terminal accesses the IAB node, a physical layer (PHY)/medium access control (MAC) layer/radio link control (RLC) layer function corresponding to the terminal is located on the DU of the IAB node accessed by the terminal, and a packet data convergence protocol (PDCP) layer/service data adaptation protocol (SDAP) layer/radio resource control (RRC) layer function corresponding to the terminal is located on a CU of the IAB node accessed by the terminal. When the IAB node is oriented to a parent node of the IAB node, the IAB node may be considered as a terminal, that is, the MT. When the IAB node is oriented to a child node (the child node may be another IAB node, or a terminal that accesses the IAB node) of the IAB node, the IAB node may be considered as an access device, that is, the DU.

Figure 3D:
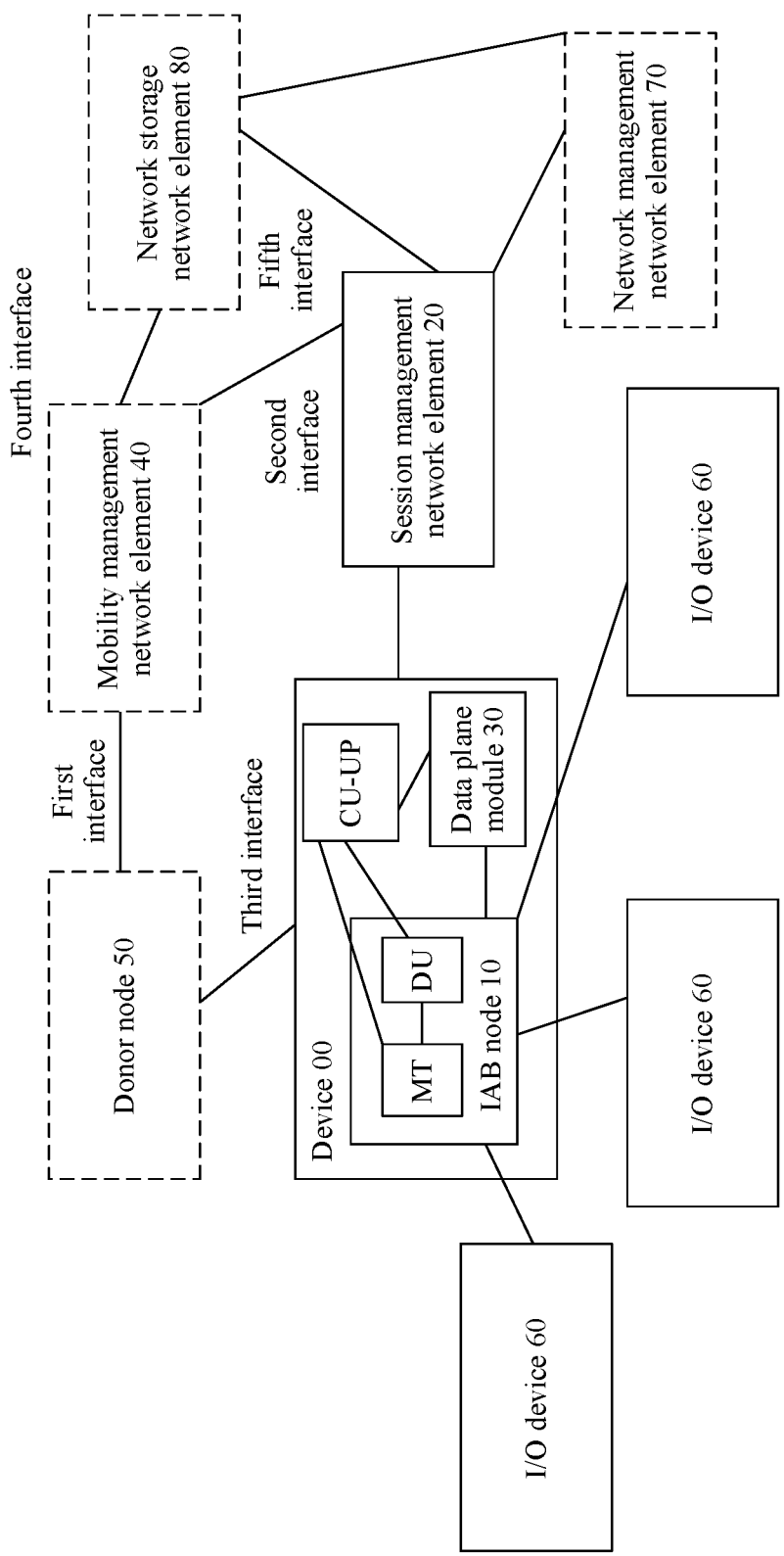
FIG. 3d is a diagram 4 of an architecture of a communications system according to an embodiment of this application.

In another example, when a split architecture is used for the IAB node, with reference to FIG. 3b, as shown in FIG. 3d, there is an internal interface between the MT and the DU, but a new interface y needs to be established between the data plane module 30 and the IAB node to carry content originally transmitted on an N4 interface. For example, as shown in FIG. 3d, there is an F1-U interface between the DU and the CU-UP. In this case, a new interface x needs to be established between the CU-UP and the IAB node 10 to carry content originally transmitted on an E1 interface.

In FIG. 3d, before the CU-UP exchanges user plane data with the data plane module 30, a user plane channel at a terminal granularity needs to be established. For an establishment manner, refer to an N3 tunnel establishment procedure. Details are not described herein. Different from FIG. 3d, in a scenario in which the data plane module 30 and the IAB node are disposed on a same device, the CU-UP is an internal module of the IAB node, and before the IAB node exchanges user plane data with the data plane module 30, a user plane channel at a terminal granularity needs to be established.

Optionally, the communications systems shown in FIG. 3a to FIG. 3d may be applied to a current 5G network architecture and another future network architecture. This is not specifically limited in the embodiments of this application.

Figure 4A:
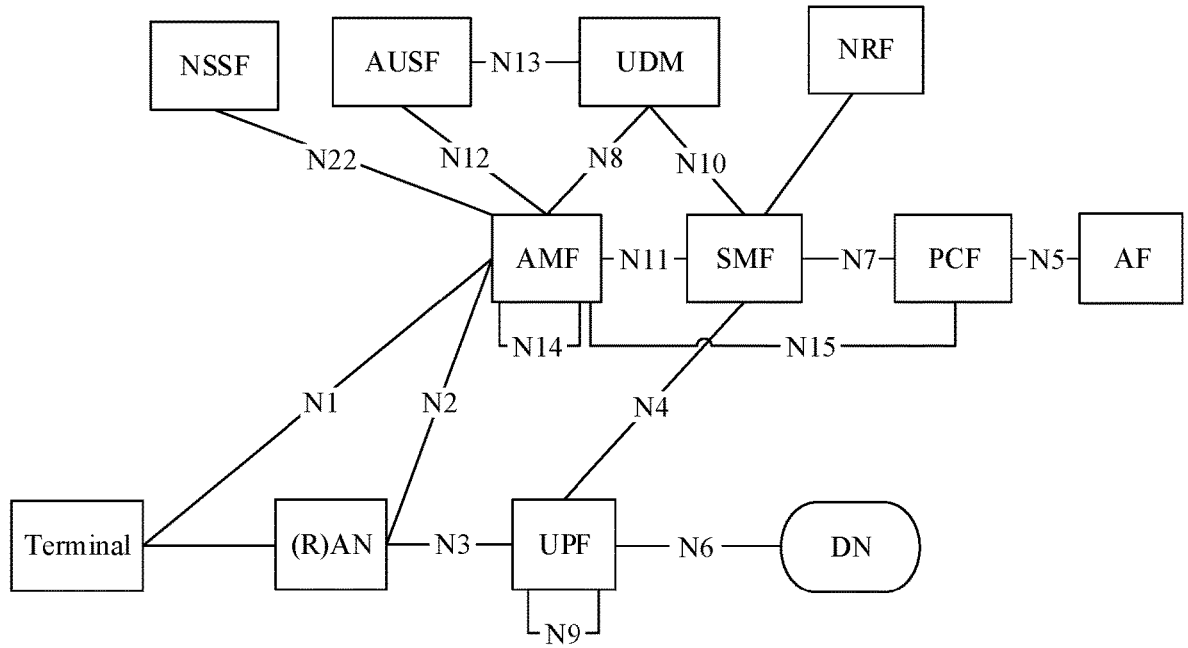
FIG. 4a is a schematic diagram of a 5G network architecture according to an embodiment of this application.
Figure 4B:
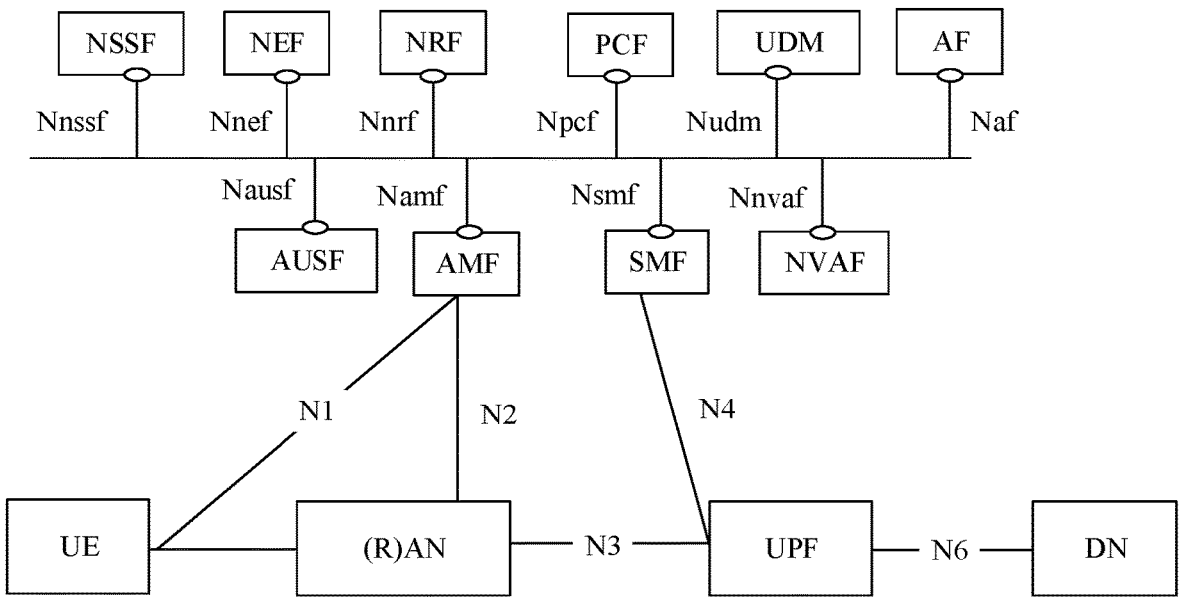
FIG. 4b is a schematic diagram of another 5G network architecture according to an embodiment of this application.

The following uses an example in which the communications systems shown in FIG. 3a to FIG. 3d are applicable to the 5G network architecture, for example, uses an example in which the communications systems shown in FIG. 3a to FIG. 3d are applicable to a 5G network architecture shown in FIG. 4a or FIG. 4b.

For example, the communications systems shown in FIG. 3a to FIG. 3d are applied to an interface-based architecture in a current non-roaming 5G network architecture. The mobility management network element 40 and the session management network element 30 may be network elements in a 5G core network (5GC), and the donor node 50 and the IAB node 10 may be network elements in a 5G access network.

For example, as shown in FIG. 4a or FIG. 4b, a network element or an entity corresponding to the network management network element 70 may be an operation, administration, and maintenance (OAM) network element (which may also be referred to as an operation, administration, and maintenance network element). For example, a network element or an entity corresponding to the session management network element 30 may be a session management function (SMF) network element in the 5G network architecture shown in FIG. 4a or FIG. 4b. The mobility management network element 40 may be an access and mobility management function (AMF) network element. The donor node 50 or the IAB node 10 may be an access network (AN) device or a radio access network (RAN) device. A network element or an entity corresponding to the data plane module 30 may be a user plane function (UPF) network element in the 5G network architecture shown in FIG. 4a or FIG. 4b. A network element or an entity corresponding to the network storage network element 80 may be a network repository function (NRF) network element in the 5G network architecture shown in FIG. 4a or FIG. 4b.

In addition, as shown in FIG. 4a or FIG. 4b, the 5G network architecture may further include a policy control function (PCF) network element, an application function (application function, AF) network element, a data network (DN), an authentication server function (AUSF) network element, a unified data repository (UDR) network element (which is not shown in FIG. 4a or FIG. 4b), a unified data management (UDM) network element, a network slice selection function (NSSF) network element, a network exposure function (NEF) network element, and the like. This is not specifically limited in this embodiment of this application.

As shown in FIG. 4a, a terminal communicates with the AMF network element through a next generation (N1) network interface (N1 for short). The access device communicates with the AMF network element through an N2 interface (N2 for short). The access device communicates with the UPF network element through an N3 interface (N3 for short). The UPF network element communicates with the DN through an N6 interface (N6 for short). Any two UPF network elements communicate with each other through an N9 interface (N9 for short). The UPF network element communicates with the SMF network element through an N4 interface (N4 for short). The AMF network element communicates with the SMF network element through an N11 interface (N11 for short). The AMF network element communicates with the UDM network element through an N8 interface (N8 for short). The SMF network element communicates with the PCF network element through an N7 interface (N7 for short). The SMF network element communicates with the UDM network element through an N10 interface (N10 for short). The AMF network element communicates with the AUSF network element through an N12 interface (N12 for short). The AMF network element communicates with the NSSF network element through an N22 interface (N22 for short). The AUSF network element communicates with the UDM network element through an N13 interface (N13 for short). The UDM network element communicates with the UDR network element. The PCF network element communicates with the UDR network element. A BSF network element communicates with the PCF network element and the SMF network element.

FIG. 4b shows an architecture based on a service-based interface in the 5G network architecture. A difference between the architecture and the architecture in FIG. 4a lies in that control plane network elements in a 5GC in FIG. 4b may also interact with each other through a service-based interface. For example, the AMF network element, the AUSF network element, the SMF network element, the UDR network element, the UDM network element, the NRF network element, the NEF network element, the NSSF network element, and the PCF network element interact with each other through a service-based interface. For example, a service-based interface exhibited by the AMF network element may be Namf. A service-based interface exhibited by the SMF network element may be Nsmf. A service-based interface exhibited by the UDM network element may be Nudm. A service-based interface exhibited by the UDR network element may be Nudr. A service-based interface exhibited by the PCF network element may be Npcf. A service-based interface exhibited by the NEF network element may be Nnef. A service-based interface exhibited by the NRF network element may be Nnrf. A service-based interface exhibited by the NSSF network element may be Nnssf. It should be understood that, for related descriptions of names of various service-based interfaces in FIG. 4b, refer to a 5G system architecture (5G system architecture) diagram in the 23501 standard. Details are not described herein.

It should be noted that, names of the interfaces between the network elements in FIG. 4a or FIG. 4b are merely examples, and the interfaces may have other names in a specific implementation. This is not specifically limited in this embodiment of this application.

It should be noted that the access device, the AF network element, the AMF network element, the SMF network element, the AUSF network element, the UDM network element, the UPF network element, the PCF network element, and the like in FIG. 4a or FIG. 4b are merely names, and the names do not constitute any limitation on the devices. In the 5G network and another future network, network elements corresponding to the access device, the AF network element, the AMF network element, the SMF network element, the AUSF network element, the UDM network element, the UPF network element, and the PCF network element may have other names. This is not specifically limited in this embodiment of this application. For example, the UDM network element may alternatively be replaced with a home subscriber server (HSS), a user subscription database (USD), a database entity, or the like. Unified descriptions are provided herein. Details are not described below.

The terminal, the (R)AN, the UPF, and the DN in FIG. 4a or FIG. 4b are usually referred to as network function entities at a user layer. Data traffic of the terminal may be transmitted through two network functions (entities) of the (R)AN and the UPF by using a packet data unit (PDU) session established between the terminal and the DN. The other parts are referred to as network functions and entities at a control layer, and are mainly responsible for functions such as authentication and authorization, registration management, session management, mobility management, and policy control. Therefore, the traffic at the user plane is transmitted reliably and stably. The PDU session in this embodiment of this application refers to an association between the terminal and a data network that provides a PDU connectivity service (association between the UE and a Data Network that provides a PDU connectivity service).

Figure 4C:
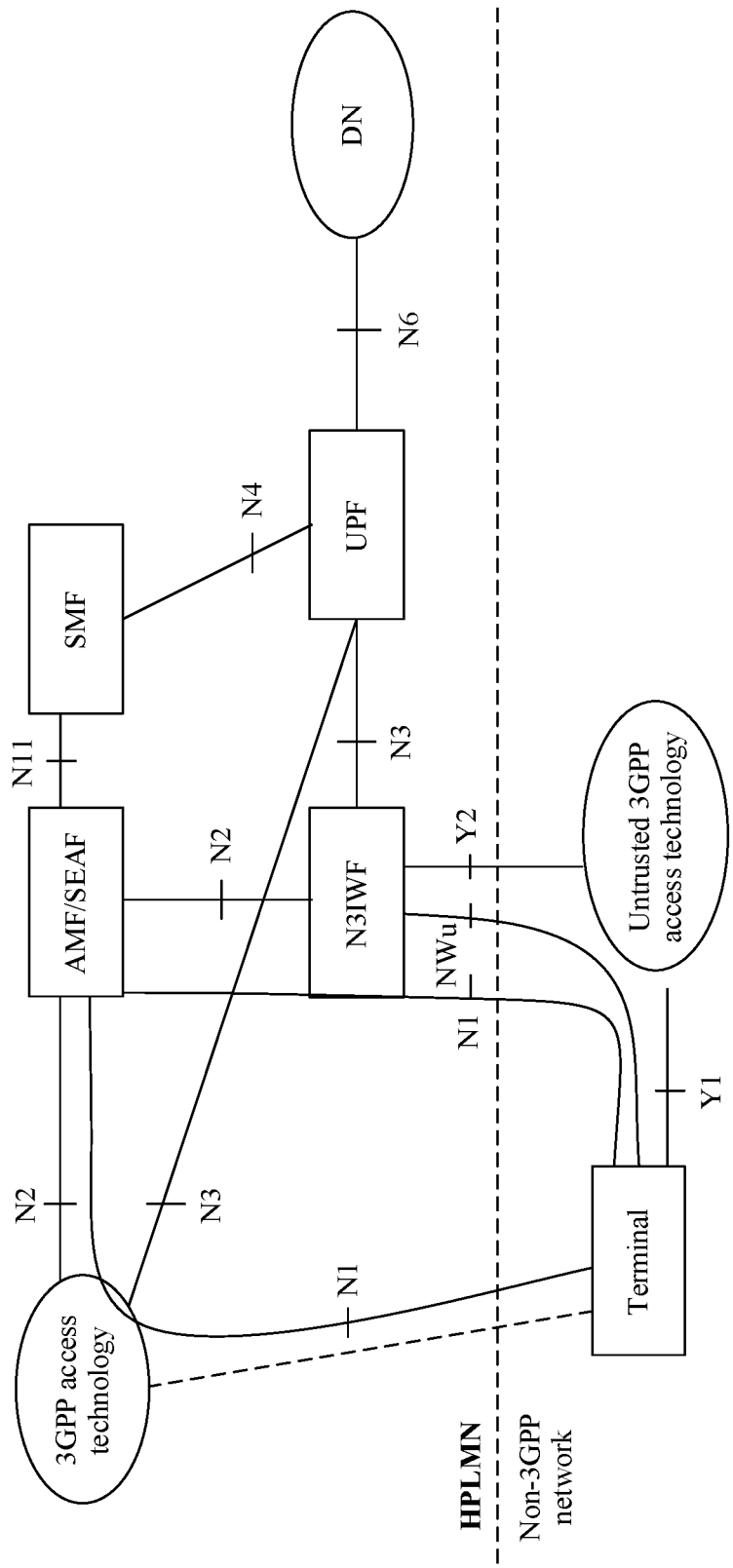
FIG. 4c is a schematic diagram of still another 5G network architecture according to an embodiment of this application.

FIG. 4a and FIG. 4b show system architectures in which a terminal accesses a 5G network by using a 3GPP access technology. FIG. 4c is a schematic diagram of an architecture in which a terminal accesses a network by using a plurality of access technologies (for example, a 3GPP access technology and a non-3GPP access technology) according to an embodiment of this application, for example, an architecture in which the terminal uses the 3GPP access technology and the non-3GPP access technology. As shown in FIG. 4c, the terminal may be connected to an access and mobility management function network element by using the 3GPP access technology and the non-3GPP access technology.

Specifically, as shown in FIG. 4c, when accessing an AMF network element by using the non-3GPP access technology, the terminal may access the AMF network element by using a non-3GPP interworking function (N3IWF) entity. When 3GPP and non-3GPP belong to a same PLMN, the terminal selects a same AMF network element. When 3GPP and non-3GPP belong to different PLMNs, the terminal may select different AMF network elements.

An SMF network element is selected by the AMF network element. Different SMF network elements may be selected for different sessions (for example, PDU sessions), but a same SMF network element needs to be selected for a same session. The SMF network element may select a UPF network element for a session, and one session may have a plurality of UPF network elements. Therefore, the SMF network element may select a plurality of UPF network elements to create a tunnel connection for a session.

An AUSF network element and an authentication repository function (ARF)/a UDM network element form a home public land mobile network (HPLMN). When accessing a network by using different access technologies, the terminal may have different visited public land mobile networks (VPLMNs), or may have a same visited public land mobile network. Specifically, for functions of the network elements shown in FIG. 4c, refer to the foregoing embodiments. Details are not described herein again in this application.

It should be understood that, in a wireless backhaul system, the access device (which may also be referred to as an access network device) may include a donor node and one or more IAB nodes.

In this embodiment of this application, the 3GPP access technology may be an access technology that complies with the 3GPP standard specification, for example, a 3rd generation partnership project (3GPP) access technology, or an access technology used in a 5G system. An access network using the 3GPP access technology is referred to as a radio access network (RAN). For example, the terminal may use the 3GPP access technology to access a wireless network by using an access network device in a 5G system. The access network device may be a base station. For example, the access network device in the 5G system is referred to as a next generation NodeB (gNB), or an evolved NodeB (eNB).

The non-3GPP technology may be a radio access technology that is not defined in the 3GPP standard specification, for example, referred to as a non-3rd generation partnership project (non-3GPP) access technology. The non-3GPP access technology may be an untrusted non-3GPP access technology, or may be a trusted non-3GPP access technology. The non-3GPP access technology may include wireless fidelity (Wi-Fi), worldwide interoperability for microwave access (WiMAX), code division multiple access (CDMA), a wireless local area network (WLAN), a fixed network technology, a wired technology, or the like. The terminal may access a network by using an air interface technology represented by wireless fidelity (Wi-Fi). The access network device may be an access point (AP).

FIG. 3a to FIG. 3d show network architectures applied to the embodiments of this application. The following separately describes functions of each part or network element in the network architecture in the 5G network by using an example.

(1) Backhaul node: The backhaul node in this embodiment of this application may also be referred to as a wireless backhaul node, a wireless backhaul device, a relay node (RN), or an IAB node. For ease of description, the IAB node is used as an example for description in this embodiment of this application. The IAB node may provide a wireless access service for a terminal, where uplink data (including, for example, uplink user plane data and uplink control plane signaling) of the terminal is transmitted to the IAB node through a wireless access link. Then, the IAB node transmits the uplink data of the terminal or uplink data of a child node to the donor node 40 through a wireless backhaul link. Downlink data (including downlink user plane data and downlink control plane signaling) of the terminal is sent by the donor node 40 to the IAB node through the wireless backhaul link, and then is transmitted by the IAB node 10 to the terminal through the wireless access link.

(2) Donor node 40: The donor node 40 is also referred to as an IAB donor (IAB donor), a donor backhaul node, or a donor base station. The donor node is used as an example for description in the following embodiment. In a 4G network, the donor node may be a donor evolved NodeB (Donor eNodeB, DeNB). In a 5G network, the donor node may be a donor next generation NodeB (Donor gNodeB, DgNB).

(3) Terminal (terminal): The terminal may include various handheld devices, in-vehicle devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem (modem), a handheld device, a laptop computer, a cordless phone, a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, in this application, the devices mentioned above are collectively referred to as the terminal.

It should be understood that the terminal in the embodiments of this application may be a terminal in a plurality of vertical industry application fields such as a port, an intelligent factory, railway transportation, logistics, an aerial vehicle without a crew, and a driverless vehicle, for example, a mobile robot (Mobile Robot), an automated guided vehicle (AGV), a driverless vehicle, a control device and a sensor on a train, or a control device and a sensor deployed in a factory shown in FIG. 1-1A and FIG. 1-1B or FIG. 2.

For example, in the embodiments of this application, the terminal may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not only a hardware device, but also implements a powerful function through software support, data exchange, and cloud interaction. In a broad sense, the wearable intelligent device includes full-featured and large-sized devices that can implement all or some of functions without depending on smartphones, for example, smart watches or smart glasses, and devices that focus on only one type of application function and need to be used with other devices such as smartphones, for example, various smart bands or smart jewelry for monitoring physical signs. As shown in FIG. 1-1A and FIG. 1-1B or FIG. 2, the terminal may alternatively be a sensor device applied to the factory.

(4) Access device: The access device is configured to provide a network access function for an authorized terminal in a specific area, and can use transmission tunnels with different quality based on a terminal level, a service requirement, and the like. The access device can manage a radio resource and provide an access service for the terminal device, to forward a control signal and terminal device data between the terminal device and a core network. The access device may also be understood as a base station in a conventional network. For example, the access device may be responsible for functions such as radio resource management, quality of service (QoS) management, and data compression and encryption on an air interface side.

The access device may be a device in a wireless network. The access device may also be referred to as a wireless access device or a network device. For example, the terminal is connected to a radio access network (RAN) node in a wireless network. Currently, examples of some access devices are: a next generation NodeB (gNB) in a 5th generation (5G) system, a transmission reception point (TRP), an evolved NodeB (eNB) in an LTE system, a radio network controller (RNC), a NodeB (NB), a base station controller (BSC), a base transceiver station (BTS), a home base station (for example, a home evolved NodeB or a home NodeB (HNB)), a baseband unit (BBU), or a wireless fidelity (Wi-Fi) access point (AP), and the like. In a network structure, the network device may include a centralized unit (CU) node, a distributed unit (DU) node, or a RAN device including a CU node and a DU node. The access device may alternatively be a wireless backhaul device, a vehicle-mounted device, a wearable device, a network device in a future 5G network, a network device in a future evolved PLMN, or the like. In a 3rd (3G) system, the device is referred to as a NodeB, or the like.

(5) Mobility management network element: The mobility management network element is a core network element, and is mainly responsible for signaling processing, for example, functions such as access control, mobility management, attachment and detachment, and gateway selection. When providing a service for a session in a terminal, the AMF network element provides a control plane storage resource for the session, to store a session identifier, an SMF network element identifier associated with the session identifier, and the like.

In a 5G communications system, the mobility management network element may be an AMF network element. In a future communications system, the mobility management network element may still be an AMF network element, or may have another name. This is not limited in this application.

(6) Untrusted non-3GPP access network device: The network element allows interconnection and interworking between a terminal and a 3GPP core network by using a non-3GPP technology. For example, the non-3GPP technology includes wireless fidelity Wi-Fi), worldwide interoperability for microwave access WiMAX), and a code division multiple access CDMA) network. Different from a trusted non-3GPP access network device that may directly access the 3GPP core network, the network element needs to be interconnected and interworked with the 3GPP core network through a security tunnel established by a security gateway. For example, the security gateway is an evolved packet data gateway (ePDG) or a non-3GPP interworking function (N3IWF) network element.

(7) Session management network element: The session management network element is responsible for user plane network element selection, user plane network element redirection, internet protocol (IP) address assignment, bearer establishment, modification, and release, and QoS control. The session management network element is configured to: manage a session, assign and manage an internet protocol (IP) address of a terminal, select a termination point that can manage a user plane function and a policy control and charging function interface, notify downlink data, and the like.

In a 5G communications system, the session management network element may be an SMF network element. In a future communications system, the session management network element may still be an SMF network element, or may have another name. This is not limited in this application.

(8) Data plane module: The data plane module is responsible for forwarding and receiving user data in a terminal. The data plane module may receive the user data from a data network, and transmit the user data to the terminal device by using an access network device. Alternatively, the data plane module may receive the user data from the terminal by using an access network device, and forward the user data to a data network. A transmission resource and a scheduling function in the data plane module that provide a service for the terminal are managed and controlled by a session management network element.

In a 5G communications system, the data plane module may be a UPF network element or a UPF module. In a future communications system, the data plane module may still be a UPF network element or a UPF module, or may have another name. This is not limited in this application.

(9) Authentication server function network element: The authentication server function network element mainly provides an authentication function, and supports authentication of 3GPP access and non-3GPP access. For details, refer to 3GPP TS 33.501.

In a future communications system, the authentication server function network element may still be the AUSF network element, or may have another name. This is not limited in this application.

(10) NEF network element: The NEF network element mainly supports secure interaction between a 3GPP network and a third-party application. The NEF network element can securely expose a network capability and an event to a third party, to enhance or improve application quality of service. The 3GPP network can also securely obtain related data from the third party, to enhance intelligent decision-making of the network. In addition, the network element supports restoring structured data from a unified data repository or storing structured data in a unified data repository.

(11) UDR network element: The UDR network element is mainly responsible for storing structured data. The stored content includes subscription data and policy data, externally exposed structured data, and application-related data.

(12) AF network element: The AF network element mainly supports interacting with a 3GPP core network to provide a service, for example, affect a data routing decision, provide a policy control function, or provide some third-party services for a network side.

(13) Network storage network element: The network storage network element is configured to maintain real-time information of all network function services in a network. The NRF stores information about a deployed network function (Network function, NF) component, for example, an identifier and a network address of the NF component, an identifier of a supported network slice, or information about a data plane instance. The NRF provides services such as registration and discovery of the NF component for another NF component.

In a future communications system, the network storage network element may still be an NRF network element, or may have another name. This is not limited in this application.

It may be understood that the network elements or the functions may be network elements in a hardware device, software functions running on dedicated hardware, or virtualized functions instantiated on a platform (for example, a cloud platform).

Figure 5:
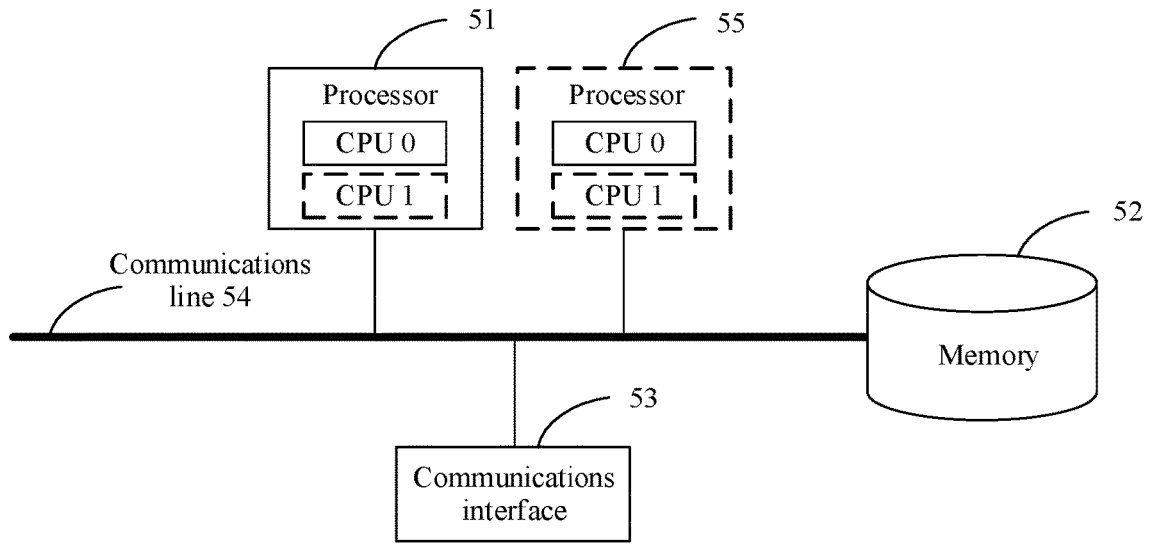
FIG. 5 is a schematic diagram of a structure of a communications device according to an embodiment of this application.

FIG. 5 is a schematic diagram of a hardware structure of a communications device according to an embodiment of this application. For structures of the session management network element 20, the IAB node 10, and the mobility management network element 40, refer to the structure shown in FIG. 5. The communications device includes a processor 51, a communications line 54, and at least one communications interface (descriptions are provided merely by using an example in which the communications device includes a communications interface 53 in FIG. 5).

Optionally, the communications device may further include a memory 52.

The processor 51 may be a general-purpose central processing unit (CPU), a microprocessor, an application-specific integrated circuit (ASIC), or one or more integrated circuits configured to control program execution of the solutions of this application.

The communications line 54 may include a path for transmitting information between the foregoing components.

The communications interface 53 is any apparatus such as a transceiver, and is configured to communicate with another device or a communications network such as the Ethernet, a radio access network (RAN), or a wireless local area network (WLAN).

The memory 52 may be a read-only memory (read-only memory, ROM) or another type of static storage device that can store static information and instructions, or a random access memory (RAM) or another type of dynamic storage device that can store information and instructions. The memory 52 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 52 is not limited thereto. The memory may exist independently, and is connected to the processor through the communications line 54. The memory may alternatively be integrated into the processor.

The memory 52 is configured to store computer executable instructions for executing the solutions of this application, and the processor 51 controls the execution. The processor 51 is configured to execute the computer executable instructions stored in the memory 52, to implement a communications method provided in the following embodiments of this application.

Optionally, the computer executable instructions in this embodiment of this application may also be referred to as application program code. This is not specifically limited in this embodiment of this application.

In a specific implementation, in an embodiment, the processor 51 may include one or more CPUs, for example, a CPU 0 and a CPU 1 in FIG. 5.

In a specific implementation, in an embodiment, the communications device may include a plurality of processors, for example, the processor 51 and a processor 55 in FIG. 5. Each of the processors may be a single-core processor (single-CPU) or a multi-core processor (multi-CPU). The processor herein may be one or more devices, circuits, and/or processing cores configured to process data (for example, computer program instructions).

In the embodiments of this application, a specific structure of a body for performing a communications method is not specially limited in the embodiments of this application, provided that the body can run a program recording code of the communications method in the embodiments of this application to perform communication according to the communications method in the embodiments of this application. For example, the communications method provided in the embodiments of this application may be performed by a functional module that is in a session management network element and that can invoke and execute a program, or may be performed by a communications apparatus, for example, a chip, applied to the session management network element. The communications method provided in the embodiments of this application may be performed by a functional module that is in an IAB node and that can invoke and execute a program, or may be a communications apparatus, for example, a chip, applied to the IAB node. This is not limited in this application. The communications method provided in the embodiments of this application may be performed by a functional module that is in a mobility management network element and that can invoke and execute a program, or may be a communications apparatus, for example, a chip, applied to the mobility management network element. An example in which the communications method is performed by an IAB node, a mobility management network element, or a session management network element is used for description in the following embodiments.

It should be noted that mutual reference may be made between the embodiments of this application. For example, for same or similar steps, mutual reference may be made between the method embodiment and the apparatus embodiment. This is not limited.

Figure 6:
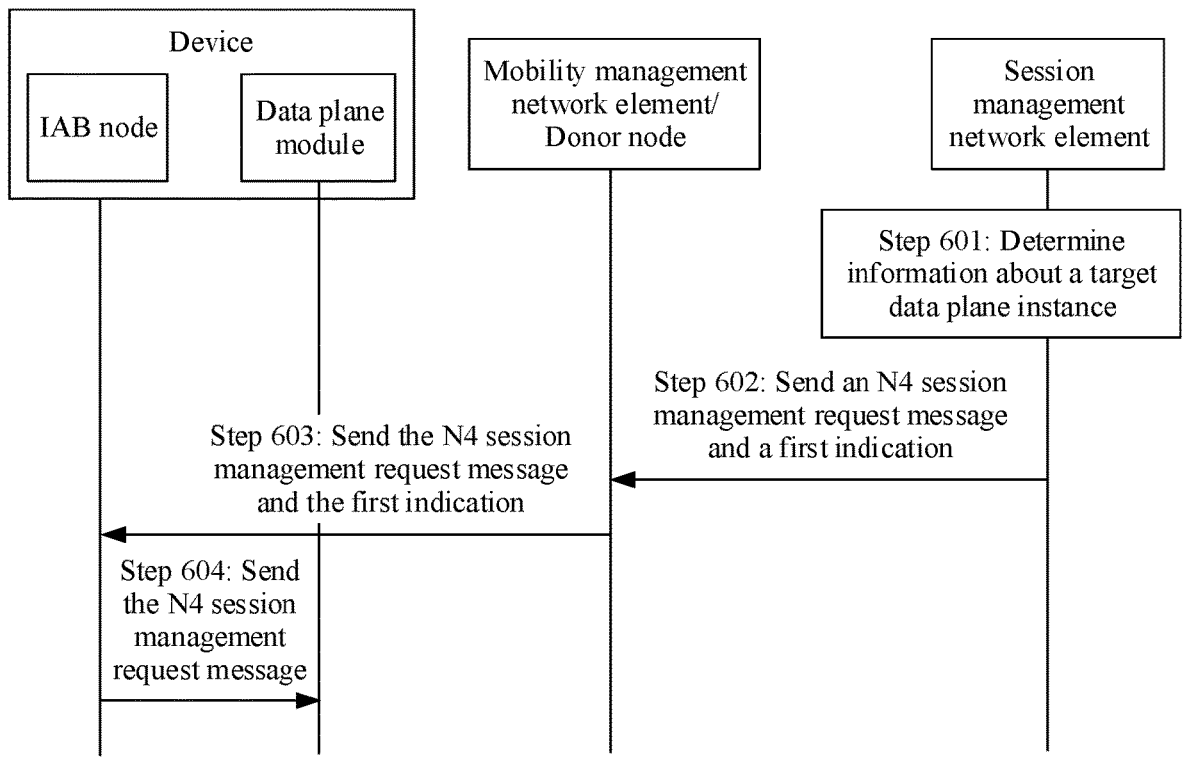

With reference to FIG. 3a to FIG. 3d, as shown in FIG. 6, a communications method provided in an embodiment of this application includes the following steps.

Step 601: A session management network element 20 determines information about a target data plane instance, where the information about the target data plane instance includes a routing indicator (for example, an N4 routing indicator), the routing indicator is used by the session management network element 20 to determine an address of the target data plane instance, and the target data plane instance is associated with an IAB node 10.

In this embodiment of this application, the session management network element 20 has a data plane instance set. The data plane instance set includes at least information about one or more data plane instances corresponding to a data plane module 30. Certainly, the data plane instance set may further include information about an instance of a module other than the data plane module.

The information about the one or more data plane instances may be registered by the IAB node 10 with the session management network element 20 by using a donor node 50, an OAM network element 60, or an AMF network element. For a specific process, refer to a process in which the donor node 50, the OAM network element 60, or the AMF network element registers the information about the one or more data plane instances with the session management network element 20 in step 605 and step 606. In addition, in this embodiment of this application, the session management network element 20 may obtain the information about the one or more data plane instances from an NRF network element. For a specific process, refer to step 600.

Correspondingly, step 601 in this embodiment of this application may be implemented in the following manner: The session management network element 20 determines the information about the target data plane instance from the information about the one or more data plane instances based on a preset condition. For example, the preset condition is information such as a DNN, S-NSSAI, an area identifier (Area ID) of the session management network element 20, and load. The area ID of the session management network element 20 represents an identifier of an area managed by the session management network element.

It should be understood that each time the data plane instance processes user plane data of a terminal, various resources (computing, storage, and network resources) of a UPF instance are consumed, and load is correspondingly increased. The DNN can reflect a type of a service transmitted on a user plane of the terminal, and can also reflect an entry location of a DN to some extent. Another condition also reflects s service or reflects location information. The session management network element 20 comprehensively selects, based on these factors, a data plane instance that can support these services and has an optimal location (a short latency) as the target data plane instance.

For example, the address of the target data plane instance may be an address of the IAB node 10 or an identifier (for example, a subscriber permanent identifier (SUPI)) of the IAB node 10. That the target data plane instance is associated with the IAB node 10 may mean that the data plane module 30 corresponding to the target data plane instance is located inside the IAB node 10, or the data plane module 30 corresponding to the target data plane instance and the IAB node 10 are located in a same device. The data plane module 30 in this embodiment of this application has routing and forwarding functions. When the data plane module 30 and the IAB node 10 are located in the same device, the session management network element 20 may first determine the address or the identifier of the IAB node 10 when addressing the target data plane instance, and then perform step 602.

Step 602: The session management network element 20 sends an N4 session management request message and a first indication to a mobility management network element 40 or the donor node 50 that provides a service for the IAB node 10, so that the mobility management network element 40 or the donor node 50 receives the N4 session management request message and the first indication from the session management network element 20, where the first indication is used to indicate the IAB node 10 to send the N4 session management request message to the target data plane instance.

It should be understood that, in addition to providing a service for the IAB node 10, the mobility management network element 40 or the donor node 50 may further provide a service for another device. Alternatively, the mobility management network element 40 or the donor node 50 provides a service only for the IAB node 10. This is not limited in this embodiment of this application.

For example, the first indication may be further used to indicate an identifier of a data plane instance. Alternatively, the session management network element 20 may send an identifier of the target data plane instance to the IAB node. In this way, the IAB node 10 determines to send the N4 session management request message to the target data plane instance associated with the identifier of the target data plane instance. The N4 session management request message in this embodiment of this application may be an N4 session establishment request message, and the N4 session establishment request message is used to request to establish a session. Alternatively, the N4 session management request message in this embodiment of this application may be an N4 session deletion request message. Alternatively, the N4 session management request message in this embodiment of this application may be an N4 session modification (or update) request message.

It should be understood that the session management network element 20 establishes a connection to the target data plane instance by using the N4 session establishment request, and subsequently, the session management network element 20 delivers a user plane execution instruction and a policy rule through an N4 interface. The session management network element 20 modifies, by using the N4 session modification request message, the policy rule and the user plane execution instruction that are delivered to the target data plane instance. The session management network element 20 may delete, by using the N4 session deletion request message, the connection established between the session management network element 20 and the target data plane instance.

The N4 session management request message in this embodiment of this application is mainly a session management request message for the target data plane instance, and the N4 session management request message may alternatively have another name, for example, an Nx session management request message. Nx represents an interface between the session management network element 20 and the data plane module 30.

Step 603: The mobility management network element 40 or the donor node 50 sends the N4 session management request message and the first indication to the IAB node 10, so that the IAB node 10 receives the N4 session management request message and the first indication from the mobility management network element 40 or the donor node 50.

Step 604: The IAB node 10 sends the N4 session management request message to the target data plane instance according to the first indication, where the N4 session management request message is used to indicate to manage a session context of the data plane instance.

As shown in FIG. 3a or FIG. 3c, the data plane module 30 corresponding to the target data plane instance in this embodiment of this application may be integrated into the IAB node 10, that is, the IAB node 10 includes the data plane module 30 corresponding to the target data plane instance. Certainly, as shown in FIG. 3b or FIG. 3d, the IAB node 10 may alternatively belong to a same device as the data plane module 30 corresponding to the target data plane instance. Subsequently, in FIG. 6 to FIG. 8A and FIG. 8B, an example in which the IAB node 10 and the data plane module 30 corresponding to the target data plane instance are located in a same device is used.

As shown in FIG. 3c, when the IAB node 10 includes the data plane module 30 corresponding to the target data plane instance, step 604 in this embodiment of this application may be implemented in the following manner: A unit (an MT/a DU/a CU-UP) in the IAB node 10 may send the N4 session management request message to the data plane module 30 through an internal interface.

For example, if NAS transmission is performed, the MT may send the N4 session management request message to the data plane module 30 through an internal interface. If F1 transmission is performed, the MT may send the N4 session management request message to the DU through an internal interface, and then the DU sends the N4 session management request message to the data plane module 30. If transmission is performed through an E1 interface, the MT may send the N4 session management request message to the CU-UP through an internal interface, and the CU-UP sends the N4 session management request message to the data plane module 30.

As shown in FIG. 3*d*, when the IAB node 10 may alternatively belong to a same device as the data plane module 30 corresponding to the target data plane instance, step 604 in this embodiment of this application may be implemented in the following manner: The IAB node 10 may send the N4 session management request message to the data plane module 30 through an Ny interface.

An embodiment of this application provides a communications method. In the method, after a session management network element determines information about a target data plane instance, because the information about the target data plane instance includes a routing indicator, the session management network element may determine an address of the target data plane instance based on the routing indicator, so that the session management network element can correctly address the target data plane instance. Because the target data plane instance is associated with an IAB node, the session management network element may send an N4 session management request message to the IAB node, to manage the target data plane instance. In this solution, the target data plane instance can be registered and managed after an N4 interface is wireless.

Figure 7:
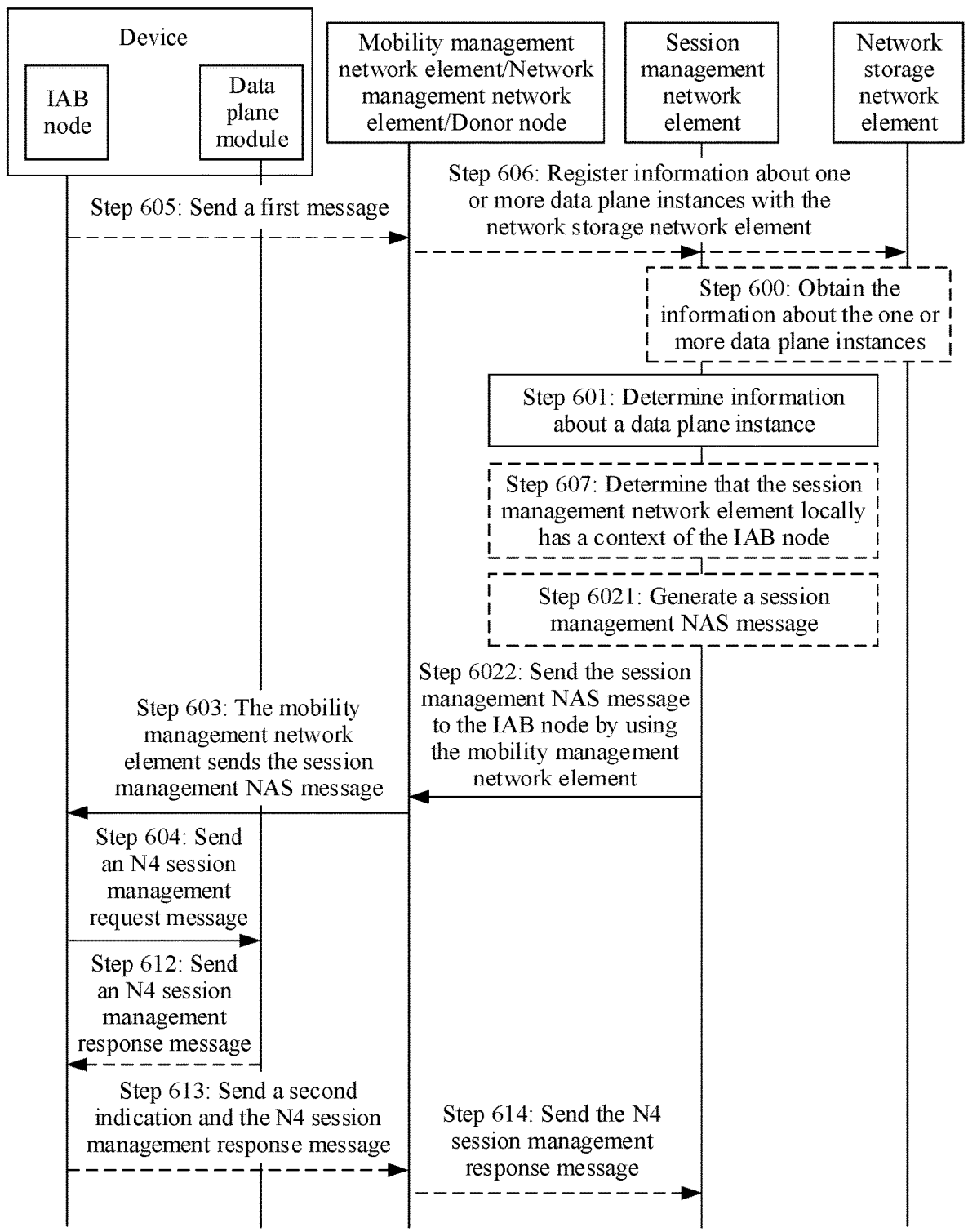

In a possible embodiment, as shown in FIG. 7, before step 601, the method provided in this embodiment of this application may further include the following steps.

Step 605: The IAB node 10 sends a first message to the OAM network element/the donor node 50/the mobility management network element 40, so that the network management network element 70/the donor node 50/the mobility management network element 40 receives the first message, where the first message includes information about one or more data plane instances of the data plane module 30, and the first message is used to indicate the network management network element 70/the donor node 50/the mobility management network element 40 to register the information about the one or more data plane instances with a network storage network element 80 or the session management network element 20.

Information about any one of the one or more data plane instances includes a routing indicator, the routing indicator is used by the session management network element 20 to determine an address of the any data plane instance, and the any data plane instance is associated with the IAB node.

In an embodiment, the information about the any data plane instance may further include any one or more of the following information: type information used to indicate a data plane instance or provisioning information of a data plane instance.

For example, the type information used to indicate the data plane instance may be a data plane type (for example, a UPF type). For example, the provisioning information of the data plane instance may include any one or more of the following information: a DNN, S-NSSAI, an SMF area ID, and the like.

It should be understood that, if the first message has a meaning or a function used to indicate the network management network element 70/the donor node 50/the mobility management network element 40 to register the information about the one or more first data plane instances with the network storage network element 80, the first message may not carry a registration indication. Certainly, the first message may alternatively carry a registration indication. If the first message does not have a meaning or a function used to indicate the network management network element 70/the donor node 50/the mobility management network element 40 to register the information about the one or more data plane instances with the network storage network element 80, the first message carries a registration indication. The registration indication is used to indicate the network management network element 70/the donor node 50/the mobility management network element 40 to register the information about the one or more data plane instances with the network storage network element 80.

In this embodiment of this application, the IAB node 10 may explicitly or implicitly indicate the network management network element 70/the donor node 50/the mobility management network element 40 to register the information about the one or more data plane instances with the network storage network element 80 or the session management network element 20.

Example 1-1: New IE Type (Explicit Indication)

In a first possible implementation, the first message includes a payload container, which may also be referred to as an instance register container. The payload container includes the information about the one or more data plane instances, and a type of the payload container is used to indicate a first device to register the information about the one or more data plane instances with the session management network element 20 or the NRF network element. To be specific, if the information about the one or more data plane instances needs to be transmitted in the payload container, the type of the payload container needs to be defined to indicate the first device to register the information about the one or more data plane instances with the session management network element 20 or the NRF network element. Alternatively, the first message includes a payload container and a field used to indicate a type of the payload container.

In this embodiment of this application, the first message has a function of carrying the payload container. Alternatively, the first message is a NAS message.

Example 1-2: New IE Field (Explicit Indication)

In a second possible implementation, the first message includes the registration indication and the information about the one or more data plane instances, and the registration indication is used to indicate the first device to register the information about the one or more data plane instances with the session management network element 20 or the network storage network element 80.

Example 1-3: Implicit Indication

If a dedicated operation interface (such as a service-based interface) is defined, the indication may be interpreted as the interface. Because the operation interface is defined, logic of an operation is also defined actually. In this way, no explicit indication is required. For example, there is a predefined operation interface between the IAB node 10 and the first device, and the predefined operation interface is used to indicate the first device to register the information about the one or more data plane instances with the session management network element 20 or the network storage network element 80. Therefore, step 605 in this embodiment of this application may be implemented in the following manner: The IAB node 10 sends the first message to the first device through the predefined operation interface, so that the first device receives the first message through the predefined operation interface.

It should be noted that Example 1-1 to Example 1-3 may be separately indicated, or may be combined.

Step 606: The network management network element 70/the donor node 50/the mobility management network element 40 registers the information about the one or more data plane instances with the network storage network 80 or the session management network element 20 based on the first message, so that the network storage network 80 or the session management network element 20 receives the information about the one or more data plane instances of the data plane module, where the one or more data plane instances include the target data plane instance.

It should be understood that FIG. 7 shows only an example of a process in which the IAB node sends the first message to the mobility management network element 40, and the mobility management network element 40 registers the information about the one or more data plane instances with the network storage network 80.

Example 2-1

A process in which the IAB node 10 registers the information about the one or more data plane instances with the network storage network 80 by using the network management network element 70.

Specifically, there is a user plane connection between the IAB node 10 and the network management network element 70, and the IAB node 10 sends the information about the one or more data plane instances to the network management network element 70 through the user plane connection between the IAB node 10 and the network management network element 70.

For example, the IAB node 10 uses Example 1-1 to indicate the network management network element 70 to register the information about the one or more data plane instances with the network storage network 80, and the information about the one or more data plane instances is transparently transmitted on the network management network element 70, that is, the network management network element 70 does not parse content of the payload container. In this case, in an embodiment, step 606 in this embodiment of this application may be implemented in the following manner: The network management network element 70 may directly send the payload container to the network storage network 80.

The IAB node 10 uses Example 1-2 or Example 1-3 to indicate the network management network element 70 to register the information about the one or more data plane instances with the network storage network 80, or the network management network element 70 may parse the payload container to obtain the information about the one or more data plane instances. In this case, in another possible implementation, step 606 in this embodiment of this application may be implemented in the following manner: The network management network element 70 constructs instance registration information based on an interface defined between the network management network element 70 and the network storage network 80, where the instance registration information includes the information about the one or more data plane instances. The network management network element 70 sends the instance registration information to the network storage network 80. To be specific, the one or more data plane instances are processed by the mobility management network element and then sent to the session management network element 20 or the network storage network element 80.

Example 2-2

A process in which the IAB node 10 registers the information about the one or more data plane instances with the session management network element 50 or the network storage network 80 by using the mobility management network element 40.

In this case, the first message may be an N1 NAS message.

In an embodiment, the IAB node 10 uses Example 1-1 to indicate the mobility management network element 40 to register the information about the one or more data plane instances with the network storage network 80 or the session management network element 20, and the information about the one or more data plane instances is transparently transmitted on the mobility management network element 40, that is, the mobility management network element 40 does not parse content of the payload container. In this case, step 606 in this embodiment of this application may be implemented in the following manner: The mobility management network element 40 sends the payload container to the network storage network 80 through an interface defined between the mobility management network element 40 and the network storage network 80. Alternatively, the mobility management network element 40 sends a fourth message to the network storage network 80 through an interface defined between the mobility management network element 40 and the network storage network 80, where the fourth message carries the payload container. Alternatively, the mobility management network element 40 sends the payload container to the session management network element 20, or sends a third message to the session management network element 20 through an interface defined between the mobility management network element 40 and the session management network element 20, where the third message includes the payload container.

In an embodiment, the IAB node 10 uses Example 1-1 to Example 1-3 to indicate the mobility management network element 40 to register the information about the one or more data plane instances with the network storage network 80 or the session management network element 20, and the mobility management network element 40 may sense content of the payload container. In this case, and step 606 in this embodiment of this application may be implemented in the following manner: The mobility management network element 40 sends a fourth message to the network storage network 80 through an interface defined between the mobility management network element 40 and the network storage network 80. In this case, the fourth message carries the information about the one or more data plane instances. Alternatively, the mobility management network element 40 sends a third message to the session management network element 20 through an interface defined between the mobility management network element 40 and the session management network element 20, where the third message carries the information about the one or more data plane instances.

Example 2-3

A process in which the IAB node 10 registers the information about the one or more data plane instances with the session management network element 50 or the network storage network 80 by using the donor node 50. In this case, the first message may be an F1 message or an E1 message.

Correspondingly, for example, the information about the one or more data plane instances is located in the payload container. In this case, step 605 provided in this embodiment of this application may be implemented in the following manner: The IAB node 10 sends the F1 message or the E1 message to the donor node 50, so that the donor node 50 receives the F1 message or the E1 message, where the F1 message or the E1 message carries the registration indication and the payload container, or the F1 message or the E1 message carries the payload container. The donor node 50 sends a second message to the mobility management network element 40 according to the registration indication or based on the payload container, so that the mobility management network element 40 receives the second message from the donor node 50, where the second message carries the payload container and a third indication, and the third indication is used to indicate the mobility management network element 40 to register the information about the one or more data plane instances with the session management network element 20 or the network storage network 80. The mobility management network element 40 sends the payload container to the session management network element 20 or the network storage network 80 based on the second message.

For a process in which the mobility management network element 40 registers the information about the one or more data plane instances with the session management network element 20 or the network storage network 80 after receiving the payload container in Example 2-3, refer to descriptions in Example 2-2. Details are not described herein again.

It should be noted that, if the information about the one or more data plane instances is registered by the IAB node 10 with the network storage network element in Example 2-1 to Example 2-3, as shown in FIG. 7, before step 601, the method provided in this embodiment of this application may further include the following step:

Step 600: The session management network element 10 obtains the information about the one or more data plane instances from the network storage network element 80, where the one or more data plane instances include the target data plane instance.

For a specific implementation of step 600 in this embodiment of this application, refer to a specific implementation of step 1201. Details are not described herein.

Because the session management network element 20 locally has or does not locally have a context of the IAB node, specific implementations of step 602 are different. Therefore, descriptions are provided below.

Example 3-1

The session management network element 20 locally has the context of the IAB node.

In a possible embodiment, as shown in FIG. 7, before step 602, the method provided in this embodiment of this application may further include the following steps.

Step 607: The session management network element 20 determines that the session management network element 20 locally has the context of the IAB node.

Correspondingly, as shown in FIG. 7, in an embodiment, step 602 provided in this embodiment of this application may be specifically implemented in the following manners:

Step 6021: The session management network element 20 generates a session management non-access stratum (Non-access stratum, NAS) message based on the context of the IAB node, where the session management NAS message includes the N4 session management request message and the first indication.

Step 6022: The session management network element 20 sends the session management NAS message to the IAB node by using the mobility management network element 40, so that the mobility management network element 40 receives the session management NAS message from the session management network element 20.

Correspondingly, step 603 may be specifically implemented in the following manner: The mobility management network element 40 sends a session management NAS message to the IAB node 10, so that the IAB node 10 receives the session management NAS message.

It may be understood that the solution shown in FIG. 7 may be applied to a scenario of a single mobility management network element and a single session management network element, that is, a mobility management network element and a session management network element that are selected by the terminal are the same as a mobility management network element and a session management network element that are selected by the IAB node 10.

The terminal interacts with the session management network element 20 by using a session management (SM) NAS message. Specifically, after receiving a session management NAS message, the mobility management network element 40 forwards the NAS message to the session management network element 20. Subsequently, the session management network element 20 sends a corresponding response message to the mobility management network element 40, and the mobility management network element 40 forwards the response message to the terminal by using the NAS message.

The terminal interacts with the mobility management network element 40 by using a mobility management (MM) NAS message. Specifically, after receiving the MM NAS message, the mobility management network element 40 directly processes the MM NAS message, and also directly forwards a corresponding response message to the terminal by using the NAS message.

Example 3-2

The session management network element 20 does not locally have the context of the IAB node.

Step 608: The session management network element 20 determines that the session management network element 20 does not locally have the context of the IAB node.

Figure 8A:
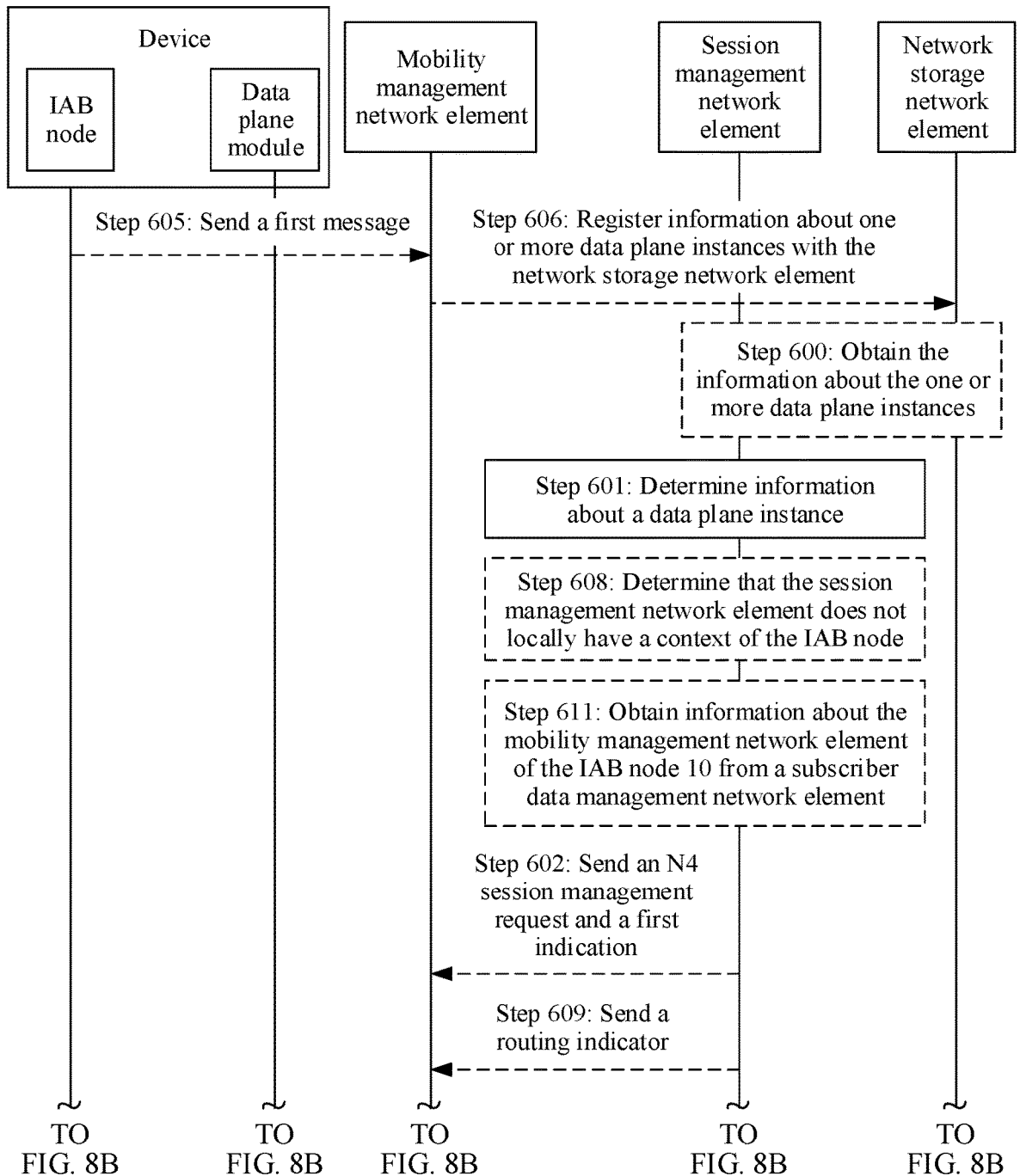
Figure 8B:
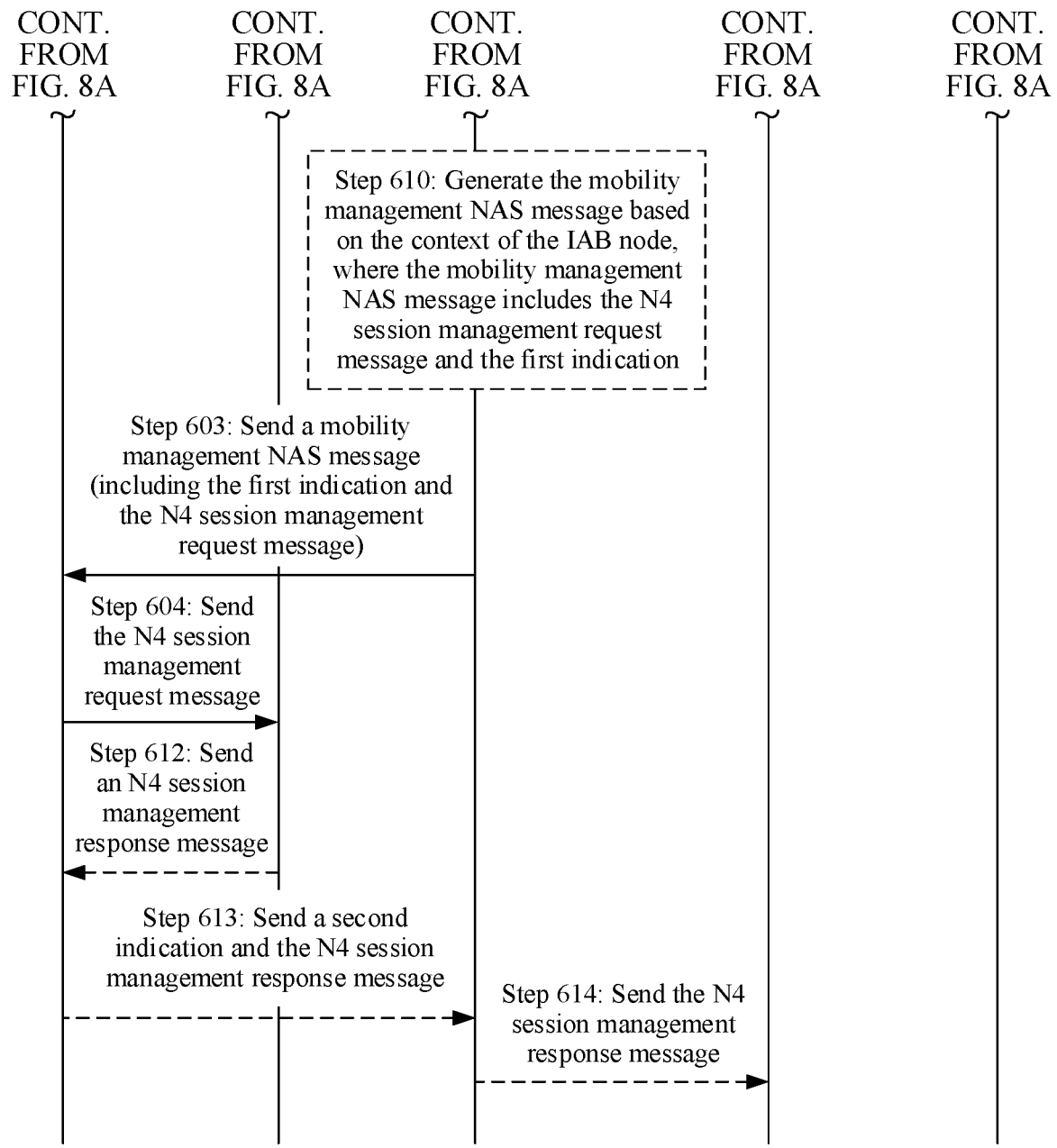

Correspondingly, as shown in FIG. 8A and FIG. 8B, in an embodiment, before step 603, the method provided in this embodiment of this application may further include the following steps.

Step 609: The session management network element 20 sends a routing indicator to the mobility management network element 40, so that the mobility management network element 40 receives the routing indicator from the session management network element 20.

In an optional implementation, the routing indicator, the N4 session management request message, and the first indication may be carried in a same message and sent to the mobility management network element 40.

Step 610: After the mobility management network element 40 determines, based on the routing indicator, that the mobility management network element locally has a context of the IAB node, the mobility management network element 40 generates a mobility management NAS message based on the context of the IAB node, where the mobility management NAS message includes the N4 session management request message and the first indication.

In an optional implementation, after determining, based on the routing indicator, that the mobility management network element 40 locally has the context of the IAB node, the mobility management network element 40 may further send acknowledgment information to the session management network element 20, where the acknowledgment information is used to indicate that the mobility management network element locally has the context of the IAB node. Alternatively, step 610 provided in this embodiment of this application may be implemented in the following manner: The mobility management network element 40 directly generates the mobility management NAS message based on the routing indicator, that is, the mobility management network element 40 does not need to determine whether the mobility management network element 40 has the context of the IAB node. After receiving the acknowledgment information, the session management network element 20 may determine, based on the acknowledgment information, that the mobility management network element 40 can provide a service for the IAB node.

Correspondingly, in an embodiment, step 603 in this embodiment of this application may be specifically implemented in the following manner: The mobility management network element 40 sends the mobility management NAS message to the IAB node 10.

It should be noted that, in a scenario that is of a plurality of mobility management network elements and a plurality of session management network elements and in which a session management network element selected by the terminal is different from a session management network element selected by the IAB node 10, and a mobility management network element selected by the terminal is also different from a mobility management network element selected by the IAB node 10, in a possible embodiment, as shown in FIG. 8A and FIG. 8B, before step 609, the method provided in this embodiment of this application may further include the following step:

Step 611: The session management network element 20 obtains information about the mobility management network element of the IAB node 10 from a subscriber data management network element. For example, the subscriber data management network element may be a UDM network element or a UDR network element.

For example, the information about the mobility management network element 40 may be an address, an identifier, or a location of the mobility management network element 40.

It should be understood that, before step 611, the method provided in this embodiment of this application may further include: The session management network element 20 sends, to a first mobility management network element (for example, the first mobility management network element is a mobility management network element that provides a service for the terminal), indication information used to check whether the first mobility management network element locally has the context of the IAB node. If the first mobility management network element does not locally have the context of the IAB node, the first mobility management network element sends, to the session management network element, an indication used to indicate that the first mobility management network element does not locally have the context of the IAB node. In this way, the session management network element may perform step 611, to determine the information about the mobility management network element accessed by the IAB node.

Specifically, step 611 may be implemented in the following manners:

(1) If an actual value of the routing indicator is an identifier (for example, an SUPI) of the IAB node 10, the session management network element 20 may query the information (for example, an identifier or a location) of the mobility management network element 40 through an existing UDM query interface. (2) If the routing indicator is another identifier of the IAB node 10 (the another identifier may be, for example, an identifier that can uniquely identify the IAB node), the session management network element 20 may enhance an existing UDM query method, and directly query the information about the mobility management network element from the subscriber data management network element by using the routing indicator. (3) If the routing indicator is another identifier of the IAB node 10, the session management network element 20 may first determine an SUPI of the IAB node 10 based on the another identifier of the IAB node 10, and then obtain the information about the mobility management network element 40 from the subscriber data management network element by using the SUPI.

The session management network element 20 has a mapping relationship between the another identifier and the SUPI of the IAB node 10, and the session management network element 20 may determine the SUPI of the IAB node 10 based on the mapping relationship. Alternatively, the subscriber data management network element has the mapping relationship, and the session management network element 20 sends the another identifier of the IAB node 10 to the subscriber data management network element, to obtain the SUPI of the IAB node 10 from the subscriber data management network element.

It may be understood that, step 611 may be omitted in a scenario that is of a single mobility management network element and a plurality of session management network elements and in which a session management network element selected by the terminal is different from a session management network element selected by the IAB node 10.

In a possible embodiment, if the session management network element 20 sends the N4 session management request message and the first indication to the IAB node 10 by using the donor node 50, the method provided in this embodiment of this application further includes: The session management network element 20 sends the routing indicator to the donor node 50, so that the donor node 50 receives the routing indicator from the session management network element 20. Correspondingly, the donor node 50 sends the N4 session management request message and the first indication to the IAB node 20 based on the routing indicator. For example, the donor node 50 sends an F1/E1 message to the IAB node 20 based on the routing indicator, where the F1/E1 message includes the N4 session management request message and the first indication.

Specifically, the session management network element 20 sends the routing indicator to the donor node 50 by using the mobility management network element 40. It should be understood that the routing indicator, the N4 session management request message, and the first indication may be carried in a same message and sent by the session management network element 20 to the donor node 50 by using the mobility management network element 40.

In a possible embodiment, with reference to FIG. 7 or FIG. 8A and FIG. 8B, after step 604, the method provided in this embodiment of this application may further include the following steps.

Step 612: The target data plane instance sends an N4 session management response message to the IAB node 10, so that the IAB node 10 receives the N4 session management response message sent by the target data plane instance. For example, the N4 session management response message may include acknowledgment information (for example, an ACK), which indicates an operation result. An establishment request is used as an example to notify the session management network element of which policies and execution instructions are successfully deployed and which policies and execution instructions cannot be deployed.

Step 613: The IAB node 10 sends a second indication and the N4 session management response message to the donor node 50 or the mobility management network element 40, so that the donor node 50 or the mobility management network element 40 receives the second indication and the N4 session management response message, where the second indication is used to indicate to send the N4 session management response message to the session management network element 20.

Step 614: The donor node 50 or the mobility management network element 40 sends the N4 session management response message to the session management network element 20 according to the second indication, so that the session management network element 20 receives the N4 session management response message from the data plane instance by using the IAB node 10.

For example, if the donor node 50 sends the N4 session management response message of the data plane instance to the session management network element 20, step 614 may be implemented in the following manners: The donor node 50 sends an F1 message or an E1 message to the mobility management network element 40 according to the second indication, so that the mobility management network element 40 receives the F1 message or the E1 message, where the F1 message or the E1 message includes a third indication and the N4 session management response message. The mobility management network element 40 sends the N4 session management response message to the session management network element 20 according to the third indication.

The third indication is used to indicate the session management network element 20 to send the N4 session management response message. Content of the third indication may be the same as content of the second indication. Certainly, content of the third indication may alternatively be different from content of the second indication. For example, the second indication is used to indicate the donor node 50 to send the N4 session management response message of the data plane instance to the session management network element 20, and the third indication is used to indicate the mobility management network element 40 to send the N4 session management response message of the data plane instance to the session management network element 20.

Figure 9:
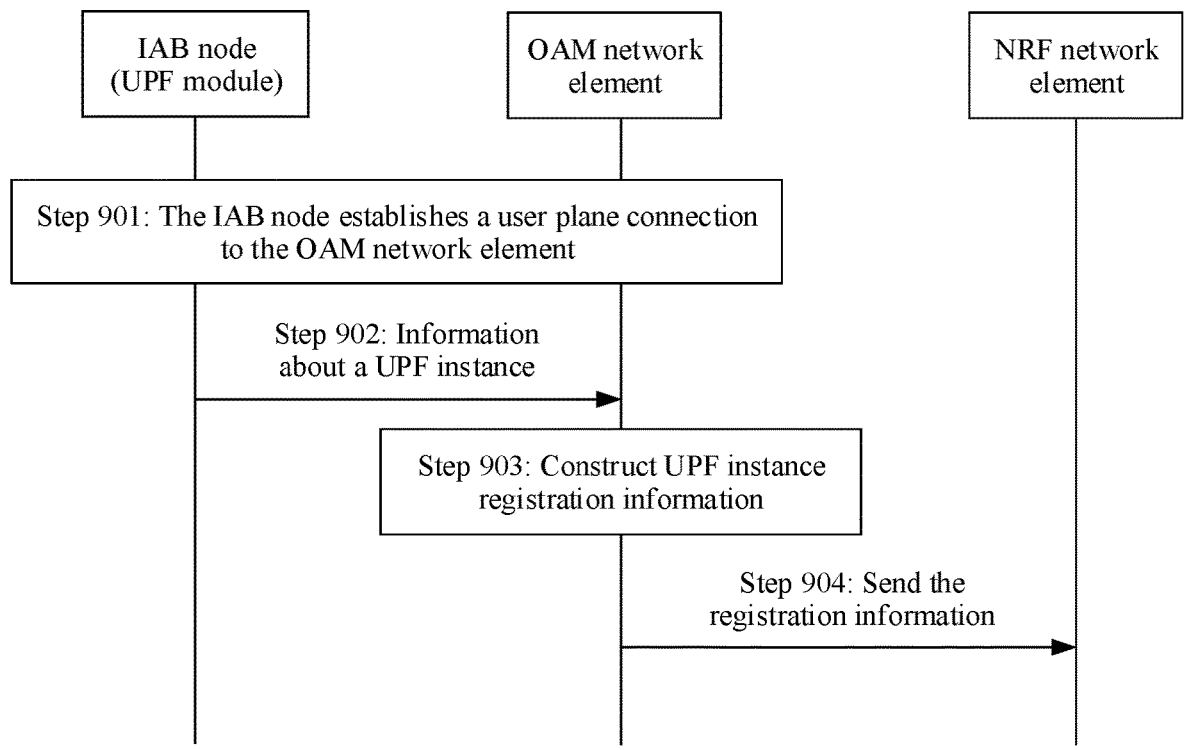

As shown in FIG. 9, for example, the data plane module 30 is a UPF module, the data plane instance is a UPF instance, the session management network element 20 is an SMF network element, the network management network element 70 is an OAM network element, and the network storage network element 80 is an NRF network element. A process in which the IAB node 10 registers a data plane instance with the NRF network element by using the OAM network element in a communications method in this application is described in detail. As shown in FIG. 9, the method includes the following steps.

Step 901: The IAB node establishes a user plane connection to the OAM network element.

For example, the IAB node serves as a terminal to establish the user plane connection to the OAM network element by using a session establishment request.

After the user plane connection is established, the IAB node may obtain provisioning information related to various IAB nodes from the OAM network element through the user plane connection. In addition, the user plane connection is always maintained for the IAB node to upload status information or the like. For example, the status information may be a running status, such as load.

Step 902: The IAB node sends information about the UPF instance to the OAM network element through the user plane connection, so that the OAM network element receives the information about the UPF instance from the IAB node through the user plane connection.

For example, the IAB node sends user plane data (User plane data) to the OAM network element through the user plane connection.

The information about the UPF instance specifically includes an indication (that is, the foregoing first indication), which indicates the OAM network element to receive the information about the UPF instance, and actively register the information about the UPF instance with the NRF network element. The information about the UPF instance includes a network function type (NF type), which is used to determine that a type of the UPF instance is a UPF, an N4 routing indicator (Routing Indicator) (that is, the foregoing routing indicator), which is used by the SMF network element to correctly address the UPF instance, and UPF provisioning information, that is, other provisioning information of the UPF instance, such as a DNN, S-NSSAI, and an SMF area ID.

For a specific indication manner of the indication, refer to specific content of the first indication. Details are not described herein again.

Step 903: The OAM network element constructs UPF instance registration information based on an interface defined between the OAM network element and the NRF network element.

The registration information includes the NF type, the N4 routing indicator, and the UPF provisioning information.

Step 904: The OAM network element sends the registration information to the NRF network element, so that the NRF network element receives the registration information from the OAM network element. In step 904, the information about the UPF instance can be registered with the NRF network element.

It may be understood that the NRF network element in FIG. 9 may alternatively be replaced with the SMF network element. After the NRF network element is replaced with the SMF network element, the IAB node registers the data plane instance with the SMF network element by using the OAM network element.

Figure 10:
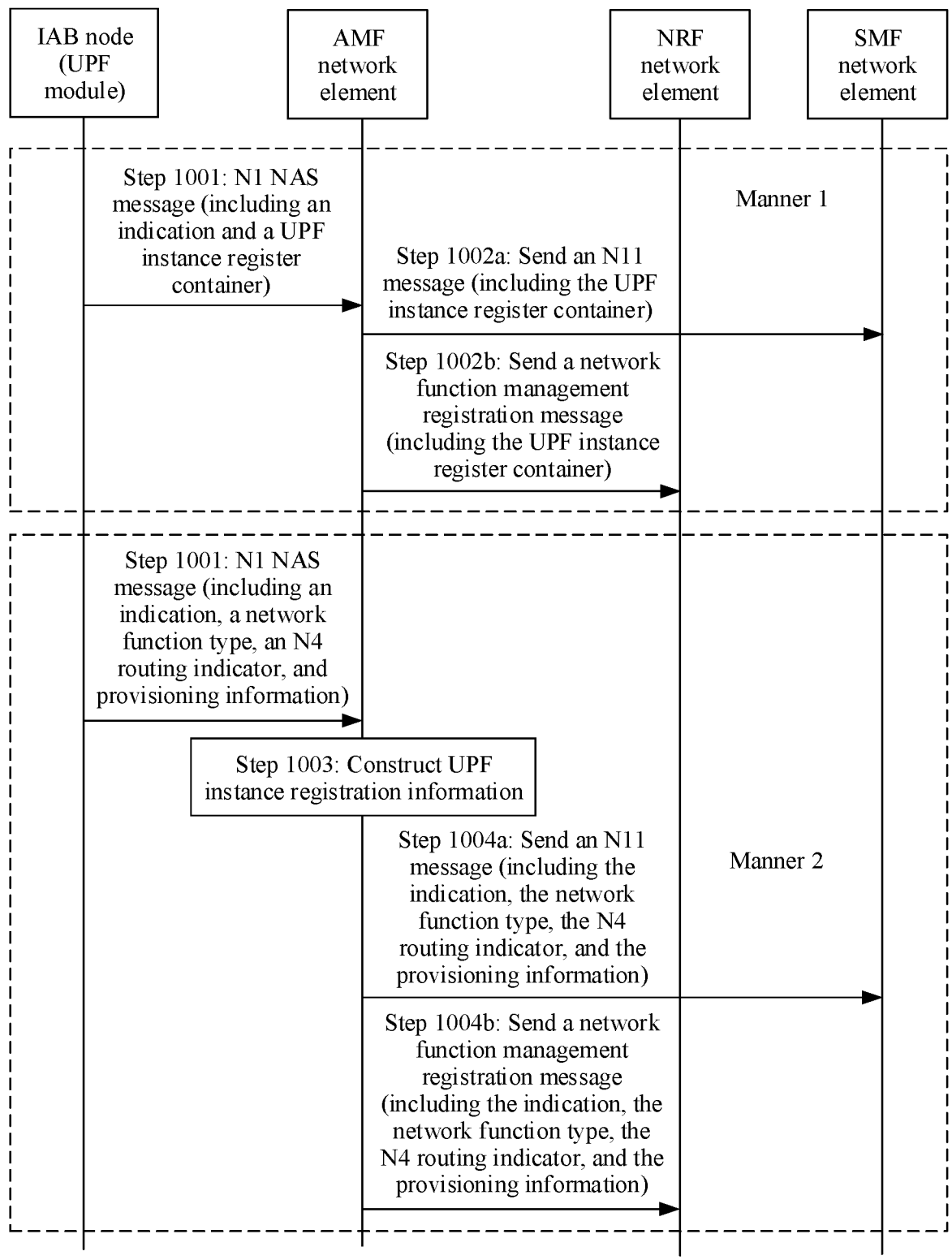

As shown in FIG. 10, for example, the data plane module is a UPF module, the data plane instance is a UPF instance, and the session management network element is an SMF network element. In FIG. 10, a data plane instance registration process in a communications method in this application is described in detail by using an example in which the IAB node registers a data plane instance with an NRF network element or the SMF network element by using an AMF network element. As shown in FIG. 10, the method includes the following steps.

Step 1001: The IAB node sends an N1 NAS message to the AMF network element, so that the AMF network element receives the N1 NAS message from the IAB node, where the N1 NAS message includes an indication and information about a UPF instance, and the indication is used to indicate the AMF network element to send the information about the UPF instance to the NRF network element or the SMF network element through a corresponding service-based interface.

If the information about the UPF instance is located in a UPF instance register container, content of the UPF instance register container is transparently transmitted on the AMF network element, that is, the AMF network element does not parse specific content of the UPF instance register container. To be specific, the N1 NAS message includes the indication and the UPF instance register container (UPF Register Container).

Alternatively, if the AMF network element can sense content of the UPF instance, the N1 NAS message includes the indication and the information about the UPF instance.

If the AMF network element does not parse the UPF instance, the AMF network element sends the information about the UPF instance to the NRF network element or the SMF network element in Option (Option) 1 (including step 1002*a* or step 1002*b*). If the AMF network element parses the UPF instance, the AMF network element sends the information about the UPF instance to the NRF network element or the SMF network element in Option 2 (including step 1003 and step 1004*a*, or step 1003 and step 1004*b*).

Option 1:

Step 1002*a*: The AMF network element sends an N11 message (Message, Msg) to the SMF network element according to the indication, so that the SMF network element receives the N11 message from the AMF network element, where the N11 message carries the UPF instance register container.

It should be understood that when the AMF network element registers the information about the UPF instance with the SMF network element, currently, the SMF network element does not have a service-based interface for providing this function. Therefore, a service-based interface (that is, an N11 interface, N11 for short) for providing this function needs to be added between the AMF network element and the SMF network element.

Step 1002*b*: The AMF network element sends a network function management registration message (NF Management NF register) to the NRF network element according to the indication, so that the SMF network element receives the network function management registration message from the AMF network element, where the network function management registration message carries the UPF instance register container.

When the AMF network element registers the information about the UPF instance with the NRF network element, currently, the NRF network element does not have a service-based interface for providing this function. Therefore, a service-based interface for providing this function needs to be added between the AMF network element and the NRF network element.

Option 2:

Step 1003: The AMF network element constructs UPF instance registration information according to the indication. If the AMF network element registers the information about the UPF instance with the SMF network element, the UPF instance registration information is an N11 message. If the AMF network element registers the information about the UPF instance with the NRF network element, the UPF instance registration information is NF Management NF register.

Step 1004*a*: The AMF network element sends the N11 message to the SMF network element, so that the SMF network element receives the N11 message from the AMF network element, where the N11 message includes an NF type, an N4 routing indicator, and UPF provisioning information.

Step 1004*b*: The AMF network element sends NF Management NF register to the NRF network element, so that the SMF network element receives NF Management NF register from the AMF network element, where NF Management NF register includes the NF type, the N4 routing indicator, and the UPF provisioning information.

A key difference between Option 2 and Option 1 is: The AMF network element can sense specific information about the UPF instance and support a proxy registration function. If the AMF network element registers the information about the UPF instance with the SMF network element, the AMF network element needs to register the information about the UPF instance through a newly added interface. If the AMF network element registers the information about the UPF instance with the NRF network element, the AMF network element directly invokes a service-based interface to register the information about the UPF instance.

It should be understood that a solution in which the AMF network element or the OAM network element directly registers the information about the UPF instance with the SMF network element is applicable to a scenario of a single AMF network element/a single SMF network element. In a scenario of a plurality of AMF network elements or a plurality of SMF network elements, the information about the UPF instance needs to be registered with the NRF network element.

Figure 11A:
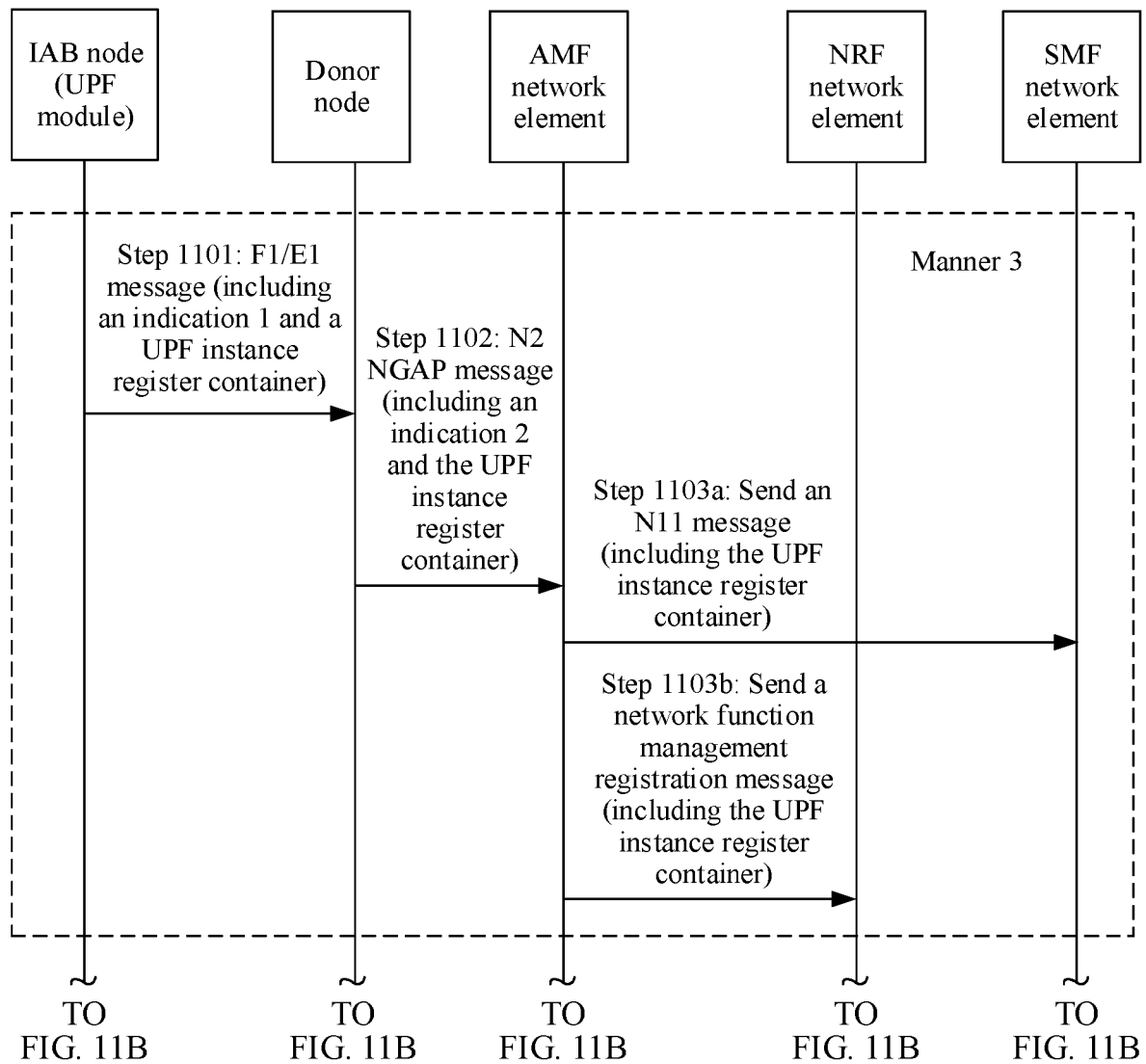
Figure 11B:
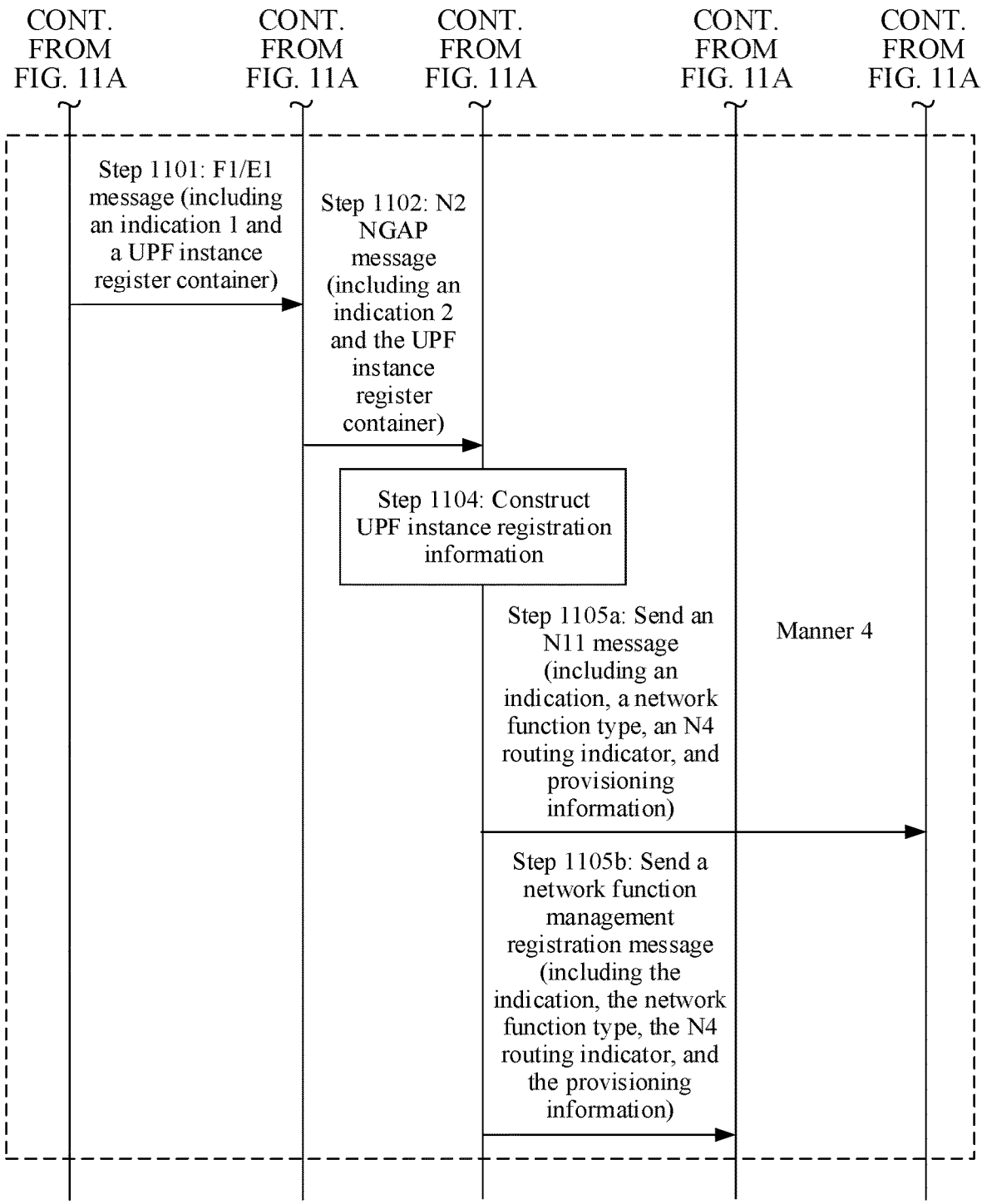

As shown in FIG. 11A and FIG. 11B, for example, the data plane module is a UPF module, the data plane instance is a UPF instance, and the session management network element is an SMF network element. In FIG. 11A and FIG. 11B, a data plane instance registration process in a communications method in this application is described in detail by using an example in which the IAB node registers a data plane instance with an NRF network element or the SMF network element by using a donor node. As shown in FIG. 11A and FIG. 11B, the method includes the following steps.

Step 1101: The IAB node sends UPF instance registration information to the donor node by using an F1 message or an E1 message, so that the donor node receives the F1 message or the E1 message from the IAB node, where the F1 message or the E1 message mainly includes an indication 1 and a UPF register container. The indication 1 indicates the donor node to receive information about a UPF instance, and forward the information about the UPF instance to the AMF network element. For content of the UPF register container, refer to descriptions in FIG. 10. Details are not described herein again. Herein, the donor node does not parse specific content of the UPF register container.

It should be understood that if the information about the UPF instance is not carried in the UPF register container, the donor node may parse the information about the UPF instance.

Step 1102: The donor node sends an N2 NGAP message to the AMF network element according to the indication 1, so that the AMF network element receives the N2 NGAP message from the donor node, where the N2 NGAP message carries the UPF register container and an indication 2, and the indication 2 is used to indicate the AMF network element to send the UPF register container to the SMF network element or the NRF network element.

The indication 2 may be the same as the indication 1. In this case, after receiving the indication, different network elements process the indication based on respective processing logic.

If the AMF network element does not parse the information about the UPF instance, the AMF network element sends the information about the UPF instance to the NRF network element or the SMF network element in Option 3 (including step 1103*a* or step 1103*b*). If the AMF network element parses the UPF instance, the AMF network element sends the information about the UPF instance to the NRF network element or the SMF network element in Option 4 (including step 1104 and step 1105*a*, or step 1104 and step 1105*b*).

Option 3:

Step 1103*a*: Same as step 1002*a*. Step 1103*b*: Same as step 1002*b*.

Option 4:

Step 1104: The AMF network element constructs UPF instance registration information according to the indication 2. Descriptions of step 1104 are the same as those of step 1003. Details are not described herein again.

Step 1105*a*: Same as step 1004*a*. Step 1105*b*: Same as step 1004*b*.

Figure 12A:
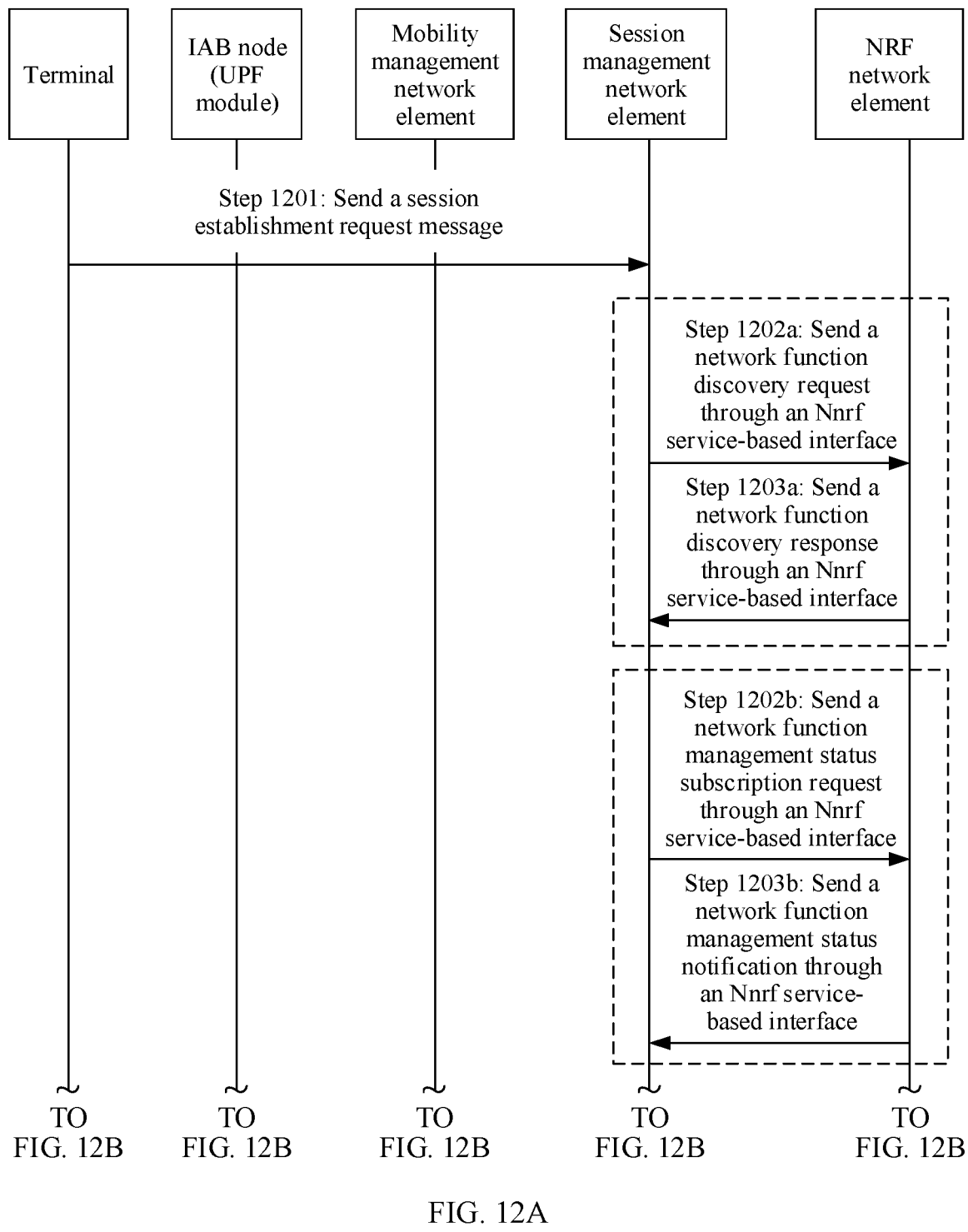
Figure 12B:
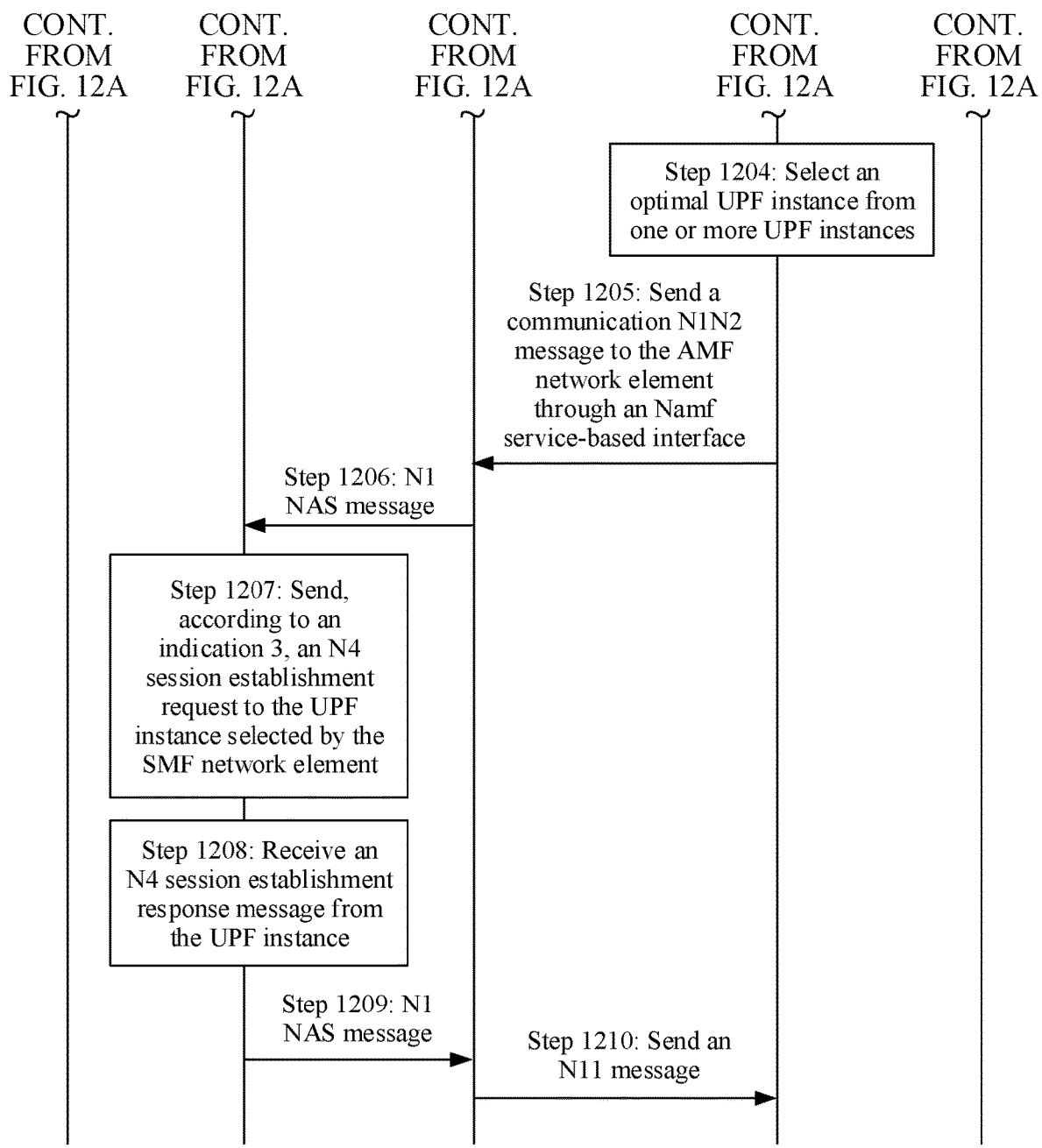

As shown in FIG. 12A and FIG. 12B, for example, the data plane module is a UPF module and the data plane instance is a UPF instance. A process in which an SMF network element addresses a UPF instance is described. The method includes the following steps.

Step 1201: A terminal sends a session establishment request (session establishment request) message to the SMF network element, so that the SMF network element receives the session establishment request message from the terminal, where the session establishment request message is used to request the SMF network element to establish a session for the terminal.

Optionally, the session establishment request message carries at least one of single network slice selection assistance information (S-NSSAI), a data network name (DNN), a session identifier, or a request type. This is not specifically limited in this embodiment of this application. In addition, the session establishment request message may further carry an original session identifier.

It may be understood that a session establishment procedure is used as an example in FIG. 12A and FIG. 12B. In a session modification procedure, the session establishment request message may be replaced with a session modification request message.

For a specific implementation of step 1201, refer to descriptions in the conventional technology. Details are not described herein.

Step 1202*a*: The SMF network element sends a network function discovery request (Nnrf_NFDiscovery_Request) to the NRF network element by using an Nnrf service-based interface, so that the NRF network element receives Nnrf_NFDiscovery_Request from the SMF network element, where Nnrf_NFDiscovery_Request carries a constraint condition. For example, the constraint condition is information such as a dedicated DNN or a location. For example, the location herein may be a location of the terminal or a location of a DN access point.

Step 1203*a*: The NRF network element sends a network function discovery response (Nnrf_NFDiscovery_Response) to the SMF network element through an Nnrf service-based interface, so that the SMF network element receives Nnrf_NFDiscovery_Response from the NRF network element, where Nnrf_NFDiscovery_Response carries information about one or more first UPF instances, and information about any UPF entity includes an N4 routing indicator.

Step 1202*a* may be replaced with step 1202*b*, and step 1203*a* may be replaced with step 1203*b*.

Step 1202*b*: The SMF network element sends a network function management status subscription request (Nnrf_NFManagement_NFStatusSubscribe) to the NRF network element through an Nnrf service-based interface, so that the NRF network element receives Nnrf_NFManagement_NFStatusSubscribe from the SMF network element.

Nnrf_NFManagement_NFStatusSubscribe carries a constraint condition.

Step 1203*b*: The NRF network element sends a network function management status notification (Nnrf_NFManagement_NFStatus Notify) to the SMF network element through an Nnrf service-based interface, so that the SMF network element receives Nnrf_NFManagement_NFStatus Notify, where Nnrf_NFManagement_NFStatus Notify carries information about one or more first UPF instances, and information about any UPF entity includes an N4 routing indicator.

A difference between a combination of step 1202*b* and step 1203*b* and a combination of step 1202*a* and step 1203*a* lies in: In step 1202*b* and step 1203*b*, the SMF network element needs to first subscribe to the NRF network element. When a new UPF instance goes online, the NRF network element actively notifies the SMF network element. In step 1202*a* and step 1203*a*, the NRF network element directly responds to a query request of the SMF network element.

Step 1204: The SMF network element selects an optimal UPF instance from the one or more UPF instances.

For example, the SMF network element selects an optimal UPF instance based on the constraint condition such as a DNN, load, or a location and a selection policy/algorithm. If the selected UPF instance includes an N4 routing indicator and the SMF network element checks, based on the information, that the SMF network element locally has a context of the IAB node, the SMF network element sends an N4 session establishment message by using a NAS message.

Step 1205: The SMF network element transmits a communication N1N2 message (Namf_Communication_N1N2MessageTransfer) to the AMF network element through an Namf service-based interface, so that the AMF network element receives Namf_Communication_N1N2MessageTransfer.

Namf_Communication_N1N2MessageTransfer carries an indication 3 and an N4 session establishment request, and the indication 3 is used to indicate the IAB node to submit the N4 session establishment request to the UPF instance selected by the SMF network element.

It should be understood that the IAB node first submits the N4 session establishment request to the UPF module. If the UPF module has a plurality of UPF instances, the UPF module sends the N4 session establishment request to the UPF instance selected by the SMF network element.

Step 1206: The AMF network element sends an N1 NAS message (that is, a session management NAS message) to the IAB node, so that the IAB node receives the N1 NAS message from the AMF network element, where the N1 NAS message includes the indication 3 and the N4 session establishment request.

Step 1207: The IAB node sends, according to the indication 3, the N4 session establishment request to the UPF instance selected by the SMF network element.

Step 1208: The IAB node receives an N4 session establishment response message from the UPF instance.

Step 1209: The IAB node sends an N1 NAS message to the AMF network element, so that the AMF network element receives the N1 NAS message, where the N1 NAS message includes the N4 session establishment response message and an indication 4, and the indication 4 is used to indicate to send the N4 session establishment response message to the SMF network element.

Step 1210: The AMF network element sends an N11 message to the SMF network element according to the indication 4, so that the SMF network element receives the N11 message, where the N11 message includes the N4 session establishment response message.

For a process of establishing a session by the terminal after step 1210, refer to descriptions in the conventional technology.

FIG. 12A and FIG. 12B are mainly for a scenario of a single AMF network element and a single SMF network element. A procedure reflects a procedure of establishing an N4 session through N1. However, the N4 session establishment request in FIG. 12A and FIG. 12B may be replaced with an N4 session modification request or an N4 session deletion request. Correspondingly, the N4 session establishment response message may be replaced with an N4 session modification response message or an N4 session deletion response message.

Figure 13A:
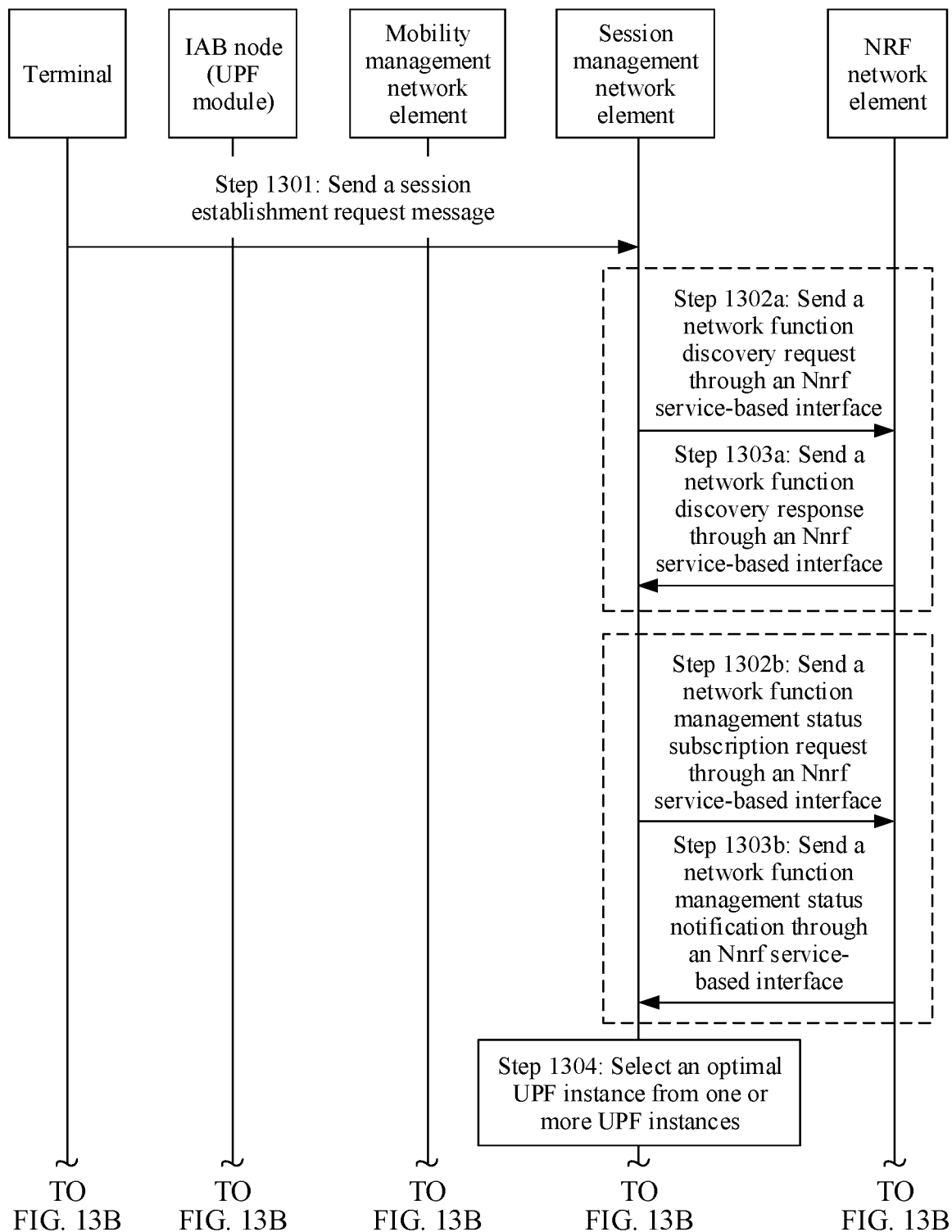
Figure 13B:
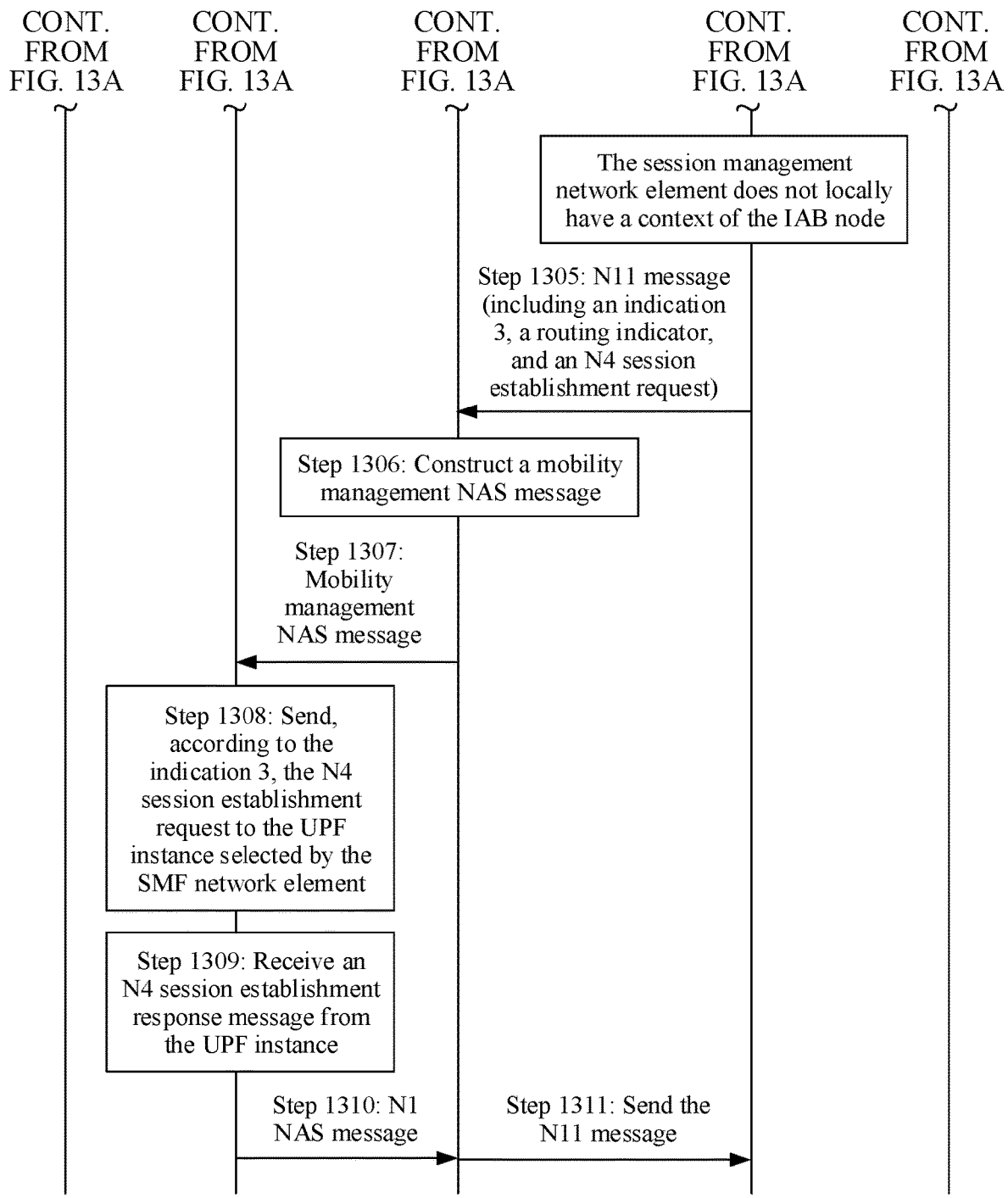

FIG. 13A and FIG. 13B show a process in which the SMF network element addresses a UPF instance in a scenario that is of a single AMF network element and a plurality of SMF network elements and in which SMF network elements selected by the terminal and the IAB node are different. A difference between this method and the method in FIG. 12A and FIG. 12B lies in that the SMF network element does not locally have a context of the IAB node. The method includes the following steps.

Step 1301 to step 1304: Same as step 1201 to step 1204. Details are not described herein again.

The SMF network element selects an optimal UPF instance based on the constraint condition such as a DNN, load, or a location and a selection policy/algorithm. If the selected UPF instance includes an N4 routing indicator and the SMF network element checks, based on the information, that the SMF network element does not locally have a context of the IAB node, the SMF network element performs step 1305.

Step 1305: The SMF network element sends an N11 message to the AMF network element, so that the AMF network element receives the N11 message from the SMF network element, where the N11 message includes an indication 3, an N4 routing indicator, and an N4 session establishment request.

Step 1306: The AMF network element constructs a mobility management NAS message after checking, according to the indication 3, that the AMF network element locally has the context of the IAB node, where the mobility management NAS message carries the indication 3 and the N4 session establishment request.

Step 1307: The AMF network element sends the mobility management NAS message to the IAB node, so that the AMF network element receives the mobility management NAS message.

Step 1308 to step 1311: Same as step 1207 to step 1210. Details are not described herein again.

Figure 14A:
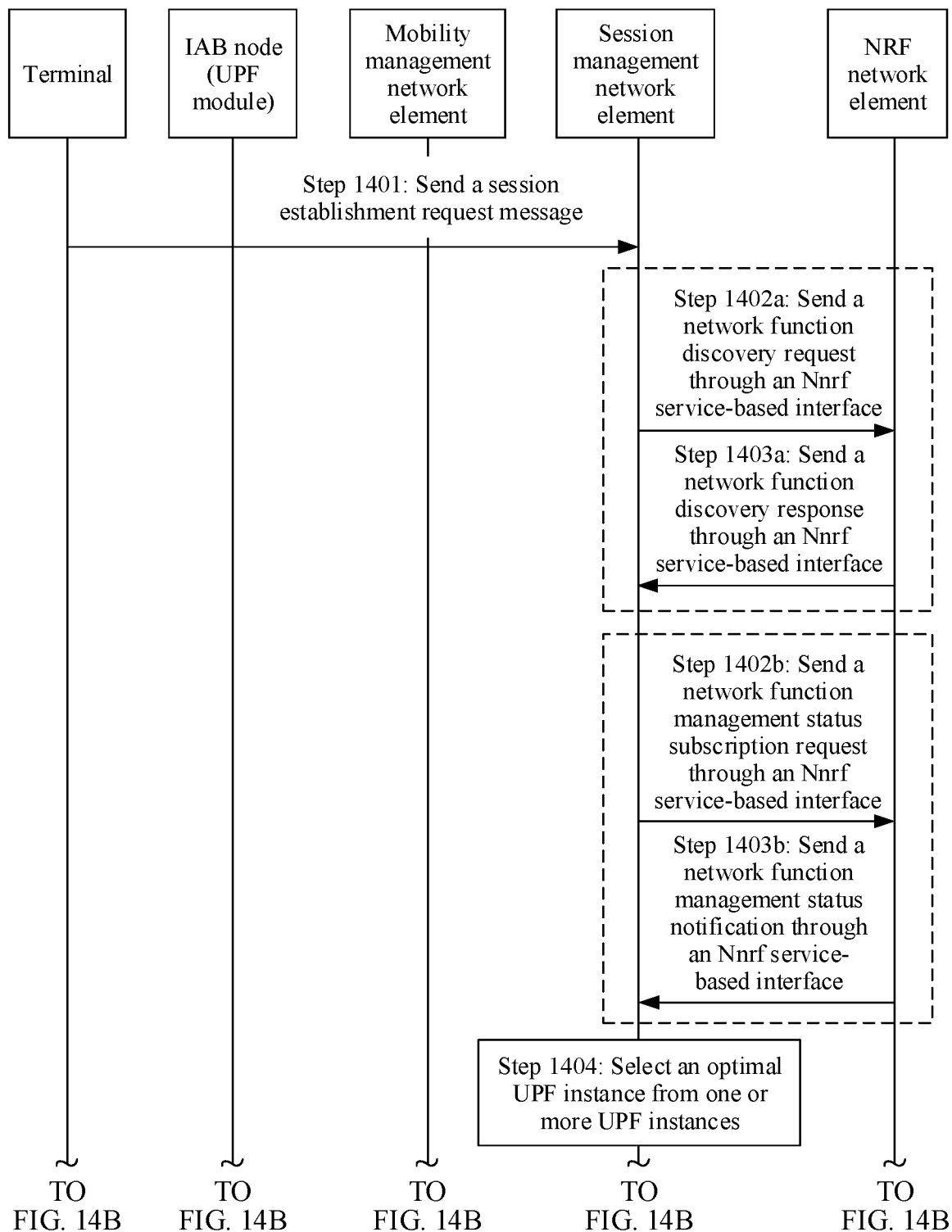
Figure 14B:
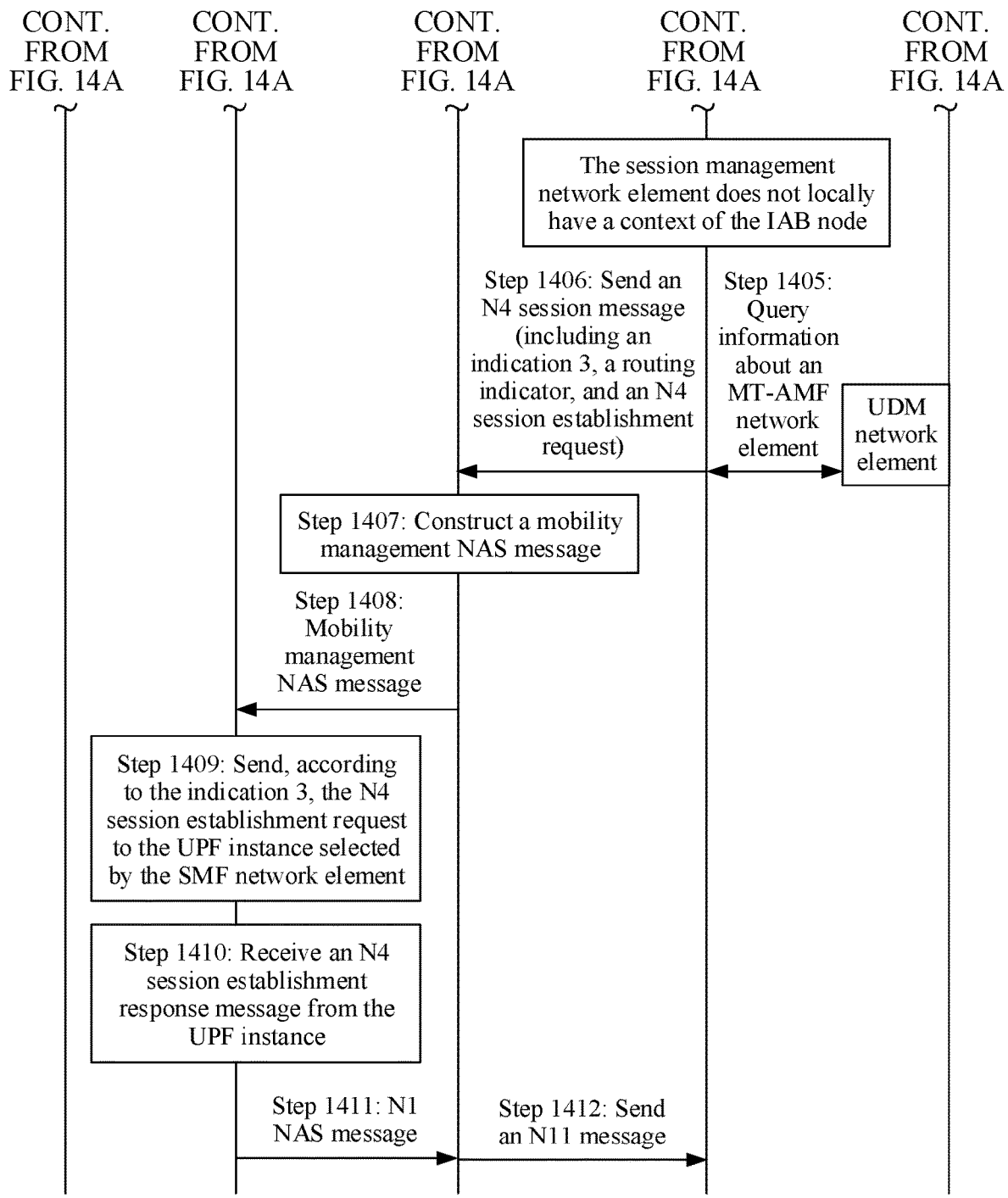

FIG. 14A and FIG. 14B mainly show a process in which the SMF network element addresses a UPF instance in a scenario that is of a plurality of AMF network elements and a plurality of SMF network elements and in which the terminal and the IAB node select different AMF network elements and different SMF network elements. A difference between this method and the method in the embodiment shown in FIG. 13A and FIG. 13B lies in:

Step 1401 to step 1404: Same as step 1301 to step 1304. Details are not described herein again.

The SMF network element selects an optimal UPF instance based on the constraint condition such as a DNN, load, or a location and a selection policy/algorithm. If the selected UPF instance includes an N4 routing indicator and the SMF network element checks, based on the information, that the SMF network element does not locally have a context of the IAB node, the SMF network element performs step 1405.

Step 1405: The SMF network element queries information about an MT-AMF network element (an AMF network element serving the IAB node) from a UDM network element. For example, the SMF network element provides an N4 routing indicator for the UDM network element.

Step 1406: After obtaining the information about the MT-AMF network element serving the IAB node, the SMF network element sends an N4 session message to the AMF network element through a service-based interface, to indicate the MT-AMF network element to construct a NAS message.

Currently, because there is no service-based interface between the AMF and the SMF for transmitting other terminal session information, a new service-based interface needs to be added. Then, after receiving the N4 routing indicator (for example, an SUPI), and checking that the MT-AMF network element locally has the context of the IAB node, the MT-AMF network element constructs a mobility management NAS message, and transmits the mobility management NAS message to the IAB node.

Step 1407 to step 1412: Same as step 1306 to step 1311. Details are not described herein again.

Figure 15A:
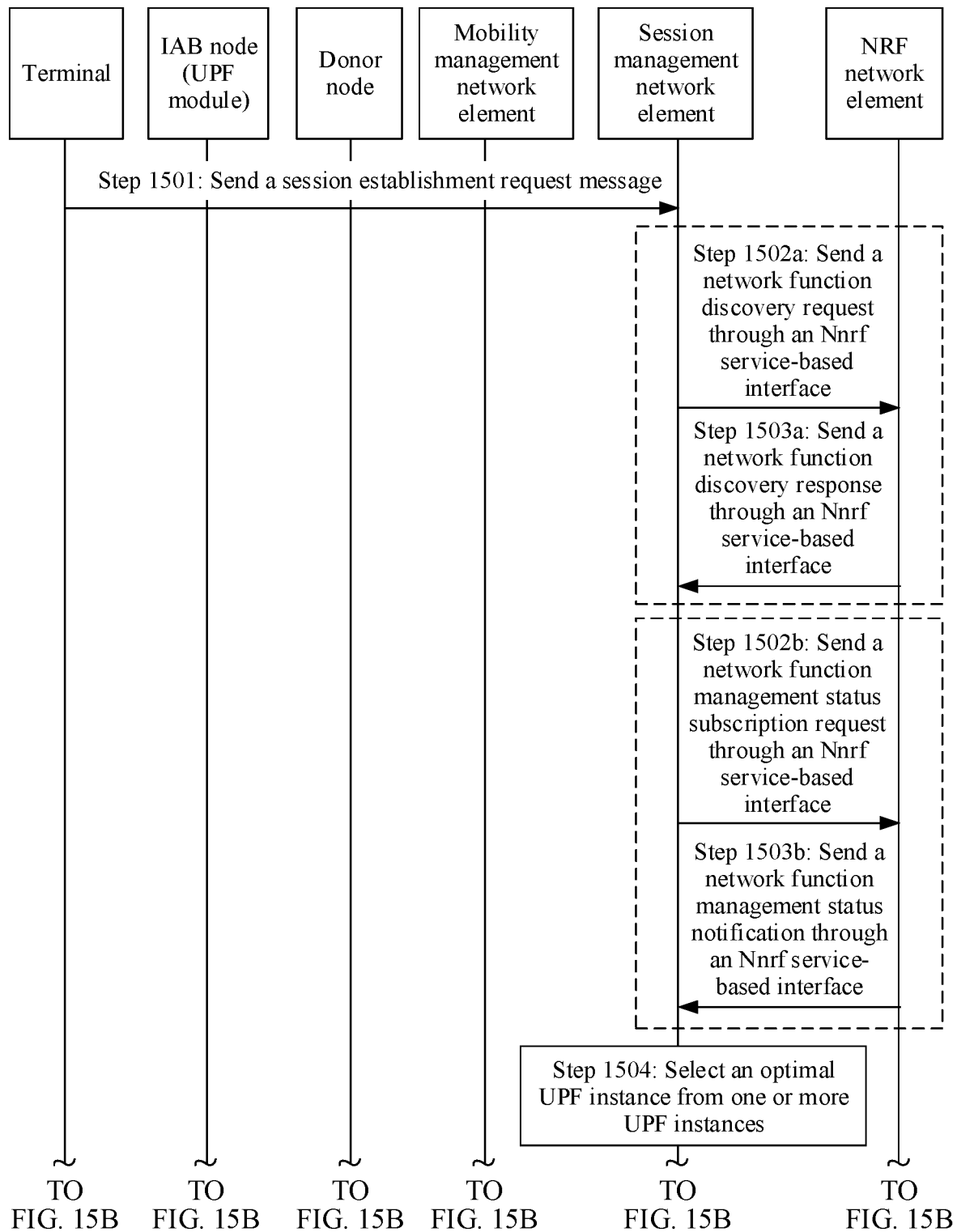
Figure 15B:
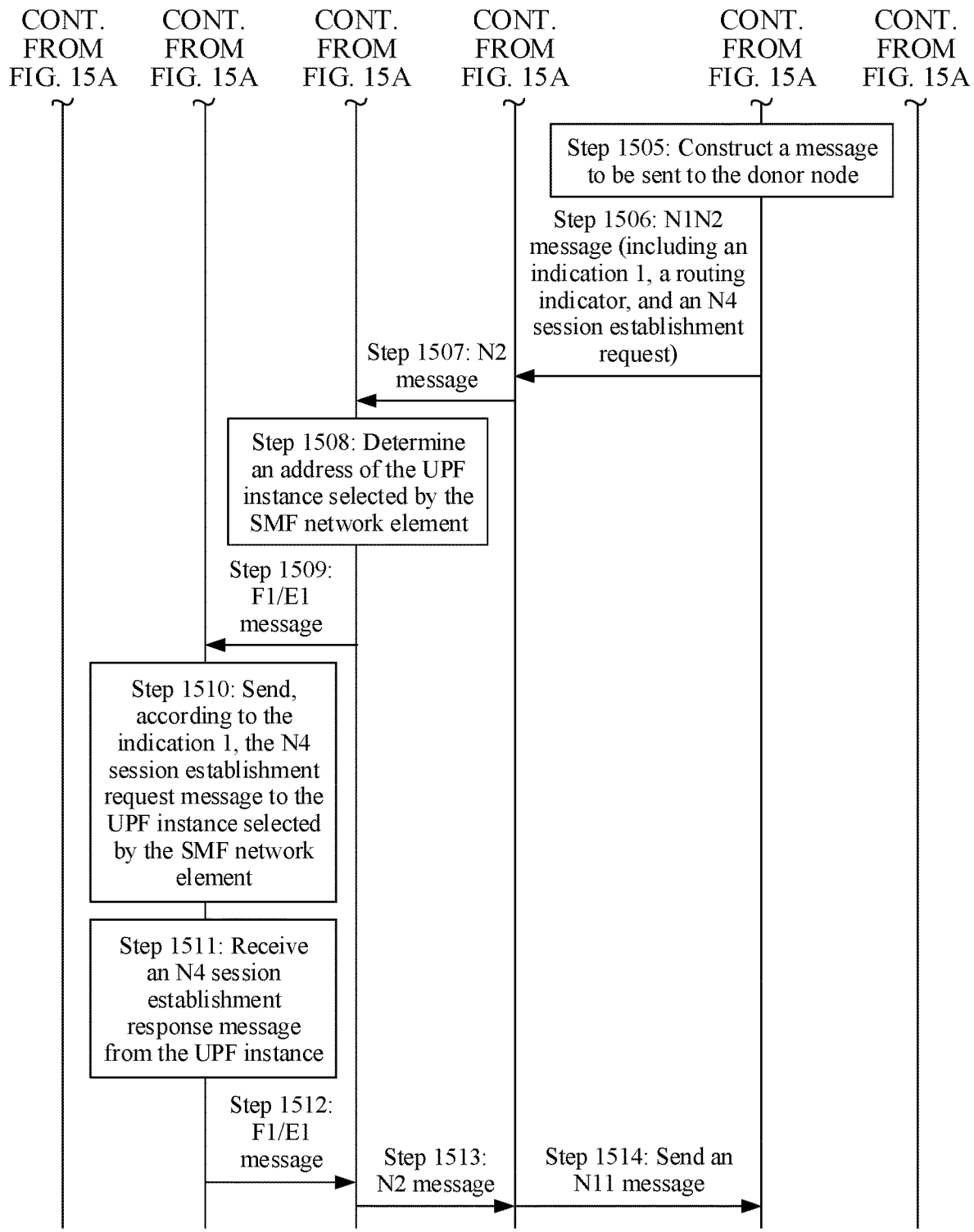

As shown in FIG. 15A and FIG. 15B, an N4 session is mainly established through F1/E1+N2. However, a process of transmitting an N4 session message is also applicable to an N4 session modification and deletion procedure. A key difference between this embodiment and Embodiment 12 is as follows:

Step 1501 to step 1504: Same as step 1201 to step 1204. Details are not described herein again.

Specifically, if the UPF instance selected by the SMF network element in step 1504 includes an N4 routing indicator, the SMF network element constructs a message to be sent to the donor node, and the donor node forwards the message to the IAB node.

Step 1505: The SMF network element constructs the message to be sent to the donor node. For example, the message to be sent to the donor node includes an indication 1, an N4 session establishment request message, and an N4 routing indicator.

Step 1506: The SMF network element transmits a communication N1N2 message (Namf_Communication_N1N2MessageTransfer) to the AMF network element through an Namf service-based interface, so that the AMF network element receives Namf_Communication_N1N2MessageTransfer, where the communication N1N2 message carries the message that is constructed by the SMF network element and that is to be sent to the donor node.

Step 1507: The AMF network element sends an N2 message to the donor node, so that the donor node receives the N2 message from the AMF network element, where the N2 message carries the message that is constructed by the SMF network element and that is to be sent to the donor node, or the N2 message directly carries the indication 1, the N4 session establishment request message, and the N4 routing indicator.

Step 1508: The donor node determines, based on the N4 routing indicator, an address of the UPF instance selected by the SMF network element.

Step 1509: The donor node sends an F1/E1 message to the IAB node, so that the IAB node receives the F1/E1 message, where the F1/E1 message carries the indication 1 and the N4 session establishment request message.

Step 1510: The IAB node sends, according to the indication 1, the N4 session establishment request message to the UPF instance selected by the SMF network element, so that the UPF instance selected by the SMF network element receives the N4 session establishment request message.

Step 1511: The IAB node receives an N4 session establishment response message from the UPF instance.

Step 1512: The IAB node sends an F1/E1 message to the donor node, so that the donor node receives the F1/E1 message, where the F1/E1 message carries an indication 4 and the N4 session establishment response message, and the indication 4 (that is, the foregoing second indication) is used to indicate to send the N4 session establishment response message to the SMF network element.

Step 1513: The donor node sends the N2 message to the AMF network element according to the indication 4, so that the AMF network element receives the N2 message, where the N2 message carries the indication 4 and the N4 session establishment response message, or the N2 message carries an indication 5 and the N4 session establishment response message, and the indication 5 is used to indicate the AMF network element to send the N4 session establishment response message to the SMF network element.

Step 1514: The AMF network element sends an N11 message to the SMF network element according to the indication 4 or the indication 5, so that the SMF network element receives the N11 message, where the N11 message carries the N4 session establishment response message.

For a process of establishing a session by the terminal after step 1514, refer to descriptions in the conventional technology.

The foregoing mainly describes the solutions in the embodiments of this application from a perspective of interaction between the network elements. It may be understood that to implement the foregoing functions, each network element such as the session management network element, the mobility management network element, or the IAB node includes corresponding hardware structures and/or software modules for performing the functions. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the session management network element, the mobility management network element, or the IAB node may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, division into the units is an example and is merely logical function division, and may be other division in an actual implementation.

The foregoing describes the methods in the embodiments of this application with reference to FIG. 6 to FIG. 15A and FIG. 15B. The following describes communications apparatuses that are provided in embodiments of this application and that perform the foregoing methods. A person skilled in the art may understand that the method and the apparatus may be mutually combined and referenced. The communications apparatus provided in this embodiment of this application may perform the steps performed by the session management network element, the mobility management network element, or the IAB node in the foregoing communications method.

Figure 16:
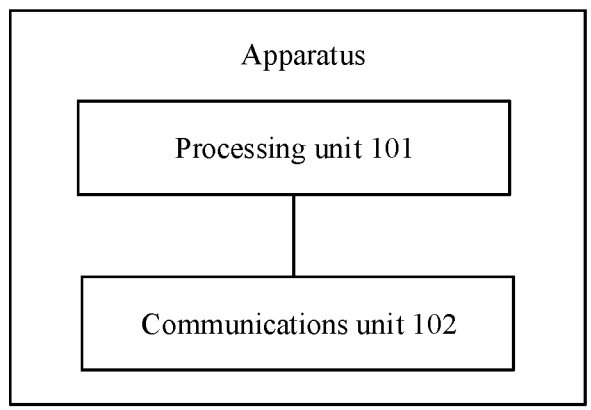
FIG. 16 is a schematic diagram of a structure of a communications apparatus according to an embodiment of this application.

When an integrated unit is used, FIG. 16 shows a communications apparatus in the foregoing embodiments. The communications apparatus may include a communications unit 102 and a processing unit 101.

In an example, the communications apparatus is a session management network element, or a chip applied to the session management network element. In this case, the communications unit 102 is configured to support the communications apparatus in performing step 601 performed by the session management network element in FIG. 6 in the foregoing embodiment. The communications unit 102 is configured to support the communications apparatus in performing the sending action performed by the session management network element in step 602 in the foregoing embodiment.

In a possible embodiment, the communications unit 102 is further configured to support the communications apparatus in performing the receiving actions performed by the session management network element in step 606 and step 614, or step 600 and step 611 in the foregoing embodiment.

In a possible embodiment, the processing unit 101 is further configured to support the communications apparatus in performing step 607 and step 6021 in the foregoing embodiment. In a possible embodiment, the communications unit 102 is further configured to support the communications apparatus in performing the sending actions performed by the session management network element in step 6022 and step 609 in the foregoing embodiment.

In another example, the communications apparatus is a mobility management network element, or a chip applied to the mobility management network element. In this case, the communications unit 102 is configured to support the communications apparatus in performing the receiving action performed by the mobility management network element in step 602 in the foregoing embodiment. The communications unit 102 is configured to support the communications apparatus in performing the sending action performed by the mobility management network element in step 603 in the foregoing embodiment.

In a possible embodiment, the communications unit 102 is further configured to support the communications apparatus in performing the receiving actions performed by the mobility management network element in step 605, step 6022, and step 609 in the foregoing embodiment.

In a possible embodiment, the communications unit 102 is further configured to support the communications apparatus in performing the sending actions performed by the mobility management network element in step 606 and step 614 in the foregoing embodiment.

In a possible embodiment, the processing unit 101 is further configured to support the communications apparatus in performing step 610 in the foregoing embodiment.

In a possible embodiment, the communications unit 102 is further configured to support the communications apparatus in performing the receiving action performed by the mobility management network element in step 613 in the foregoing embodiment.

In still another example, the communications apparatus is a donor node 50, or a chip applied to the donor node 50. The communications unit 102 is configured to support the communications apparatus in performing the sending action performed by the donor node 50 in step 603 in the foregoing embodiment. The communications unit 102 is configured to support the communications apparatus in performing the receiving action performed by the donor node 50 in step 602 in the foregoing embodiment.

In a possible embodiment, the communications unit 102 is further configured to support the communications apparatus in performing the receiving action performed by the donor node 50 in step 605 in the foregoing embodiment.

In a possible embodiment, the communications unit 102 is further configured to support the communications apparatus in performing the sending actions performed by the donor node 50 in step 606 and step 614 in the foregoing embodiment.

In a possible embodiment, the communications unit 102 is further configured to support the communications apparatus in performing the receiving action performed by the donor node 50 in step 613 in the foregoing embodiment.

In yet another example, the communications apparatus is an IAB node 10, or a chip applied to the IAB node 10. The communications unit 102 is configured to support the communications apparatus in performing the receiving action performed by the IAB node 10 in step 603 in the foregoing embodiment. The communications unit 102 is further configured to support the communications apparatus in performing the sending action performed by the IAB node 10 in step 604 in the foregoing embodiment.

In a possible embodiment, the communications unit 102 is further configured to support the communications apparatus in performing the sending actions performed by the IAB node 10 in step 605 and step 613 in the foregoing embodiment. In a possible embodiment, the communications unit 102 is further configured to support the communications apparatus in performing the receiving action performed by the IAB node 10 in step 612 in the foregoing embodiment.

In still yet another example, the communications apparatus is a network management network element, or a chip applied to the network management network element. The communications unit 102 is configured to support the communications apparatus in performing the receiving action performed by the network management network element in step 605 in the foregoing embodiment. The communications unit 102 is further configured to support the communications apparatus in performing the sending action performed by the network management network element in step 606 in the foregoing embodiment.

Figure 17:
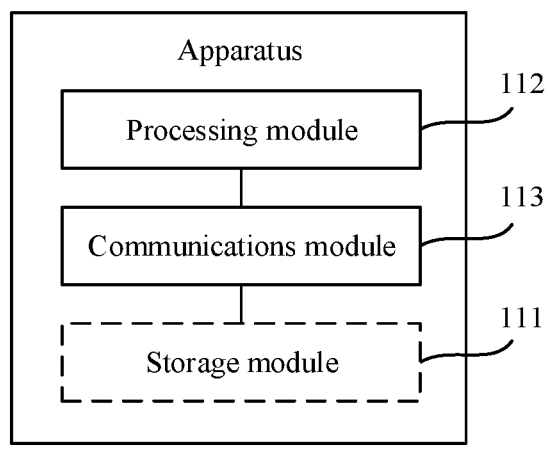
FIG. 17 is a schematic diagram of a structure of another communications apparatus according to an embodiment of this application.

When an integrated unit is used, FIG. 17 is a possible schematic diagram of a logical structure of the communication apparatus in the foregoing embodiments. The communications apparatus includes a processing module 112 and a communications module 113. The processing module 112 is configured to: control and manage actions of the communication apparatus. For example, the processing module 112 is configured to perform an information/data processing step performed by the communications apparatus. The communications module 113 is configured to support the communications apparatus in performing an information/data sending or receiving step.

In a possible embodiment, the communications apparatus may further include a storage module 111, configured to store program code and data that are of the communications apparatus.

In an example, the communications apparatus is a session management network element, or a chip applied to the session management network element. In this case, the communications module 113 is configured to support the communications apparatus in performing step 601 performed by the session management network element in FIG. 6 in the foregoing embodiment. The communications module 113 is configured to support the communications apparatus in performing the sending action performed by the session management network element in step 602 in the foregoing embodiment.

In a possible embodiment, the communications module 113 is further configured to support the communications apparatus in performing the receiving actions performed by the session management network element in step 606 and step 614, or step 600 and step 611 in the foregoing embodiment.

In a possible embodiment, the processing module 112 is further configured to support the communications apparatus in performing step 607 and step 6021 in the foregoing embodiment. In a possible embodiment, the communications module 113 is further configured to support the communications apparatus in performing the sending actions performed by the session management network element in step 6022 and step 609 in the foregoing embodiment.

In another example, the communications apparatus is a mobility management network element, or a chip applied to the mobility management network element. In this case, the communications module 113 is configured to support the communications apparatus in performing the receiving action performed by the mobility management network element in step 602 in the foregoing embodiment. The communications module 113 is configured to support the communications apparatus in performing the sending action performed by the mobility management network element in step 603 in the foregoing embodiment.

In a possible embodiment, the communications module 113 is further configured to support the communications apparatus in performing the receiving actions performed by the mobility management network element in step 605, step 6022, and step 609 in the foregoing embodiment.

In a possible embodiment, the communications module 113 is further configured to support the communications apparatus in performing the sending actions performed by the mobility management network element in step 606 and step 614 in the foregoing embodiment.

In a possible embodiment, the processing module 112 is further configured to support the communications apparatus in performing step 610 in the foregoing embodiment.

In a possible embodiment, the communications module 113 is further configured to support the communications apparatus in performing the receiving action performed by the mobility management network element in step 613 in the foregoing embodiment.

In still another example, the communications apparatus is a donor node 50, or a chip applied to the donor node 50. The communications module 113 is configured to support the communications apparatus in performing the sending action performed by the donor node 50 in step 603 in the foregoing embodiment. The communications module 113 is configured to support the communications apparatus in performing the receiving action performed by the donor node 50 in step 602 in the foregoing embodiment.

In a possible embodiment, the communications module 113 is further configured to support the communications apparatus in performing the receiving action performed by the donor node 50 in step 605 in the foregoing embodiment.

In a possible embodiment, the communications module 113 is further configured to support the communications apparatus in performing the sending actions performed by the donor node 50 in step 606 and step 614 in the foregoing embodiment.

In a possible embodiment, the communications module 113 is further configured to support the communications apparatus in performing the receiving action performed by the donor node 50 in step 613 in the foregoing embodiment.

In yet another example, the communications apparatus is an IAB node 10, or a chip applied to the IAB node 10. The communications module 113 is configured to support the communications apparatus in performing the receiving action performed by the IAB node 10 in step 603 in the foregoing embodiment. The communications module 113 is further configured to support the communications apparatus in performing the sending action performed by the IAB node 10 in step 604 in the foregoing embodiment.

In a possible embodiment, the communications module 113 is further configured to support the communications apparatus in performing the sending actions performed by the IAB node 10 in step 605 and step 613 in the foregoing embodiment. In a possible embodiment, the communications module 113 is further configured to support the communications apparatus in performing the receiving action performed by the IAB node 10 in step 612 in the foregoing embodiment.

In still yet another example, the communications apparatus is a network management network element, or a chip applied to the network management network element. The communications module 113 is configured to support the communications apparatus in performing the receiving action performed by the network management network element in step 605 in the foregoing embodiment. The communications module 113 is further configured to support the communications apparatus in performing the sending action performed by the network management network element in step 606 in the foregoing embodiment.

The processing module 112 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

When the processing module 112 is the processor 51 or the processor 55, the communications module 113 is the communications interface 53, and the storage module 111 is the memory 42, the communications apparatus in this application may be the communications device shown in FIG. 5.

Figure 18:
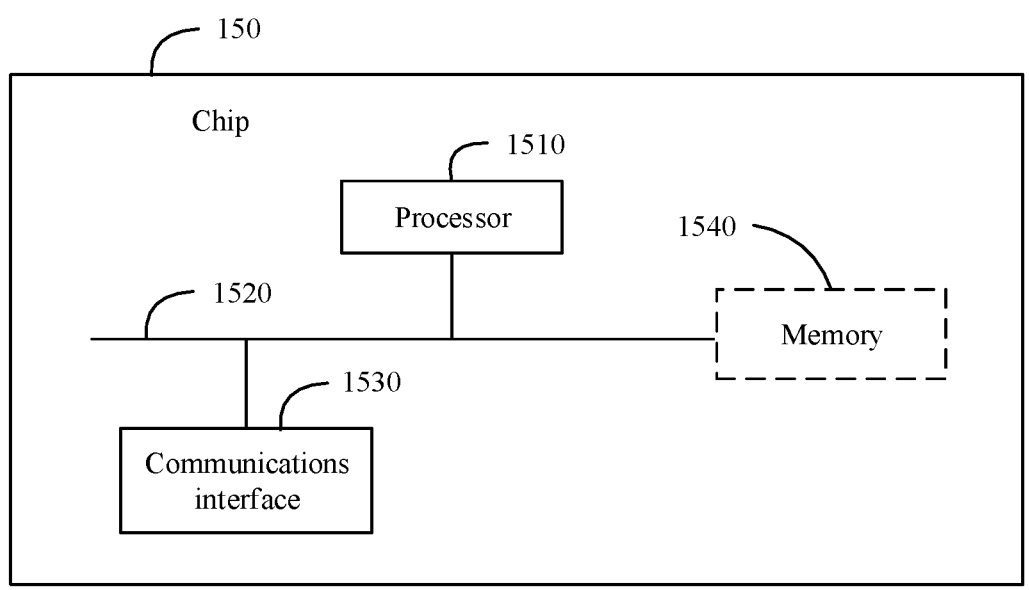
FIG. 18 is a schematic diagram of a structure of a chip according to an embodiment of this application.

FIG. 18 is a schematic diagram of a structure of a chip 150 according to an embodiment of this application. The chip 150 includes one or more processors 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following element: an executable module or a data structure, a subset thereof, or an extended set thereof.

In this embodiment of this application, a corresponding operation is performed by invoking the operation instructions (the operation instructions may be stored in an operating system) stored in the memory 1540.

In an embodiment, an IAB node, a donor node, a mobility management network element, a session management network element, and a network management network element use a similar chip structure, and different apparatuses may use different chips to implement respective functions.

The processor 1510 controls a processing operation of any one of the IAB node, the donor node, the mobility management network element, the session management network element, and the network management network element. The processor 1510 may also be referred to as a central processing unit (CPU).

The memory 1540 may include a read-only memory and a random access memory, and provide instructions and data for the processor 1510. A part of the memory 1540 may further include an NVRAM. For example, in application, the memory 1540, the communications interface 1530, and the memory 1540 are coupled together through a bus system 1520. The bus system 1520 may further include a power bus, a control bus, a status signal bus, and the like in addition to a data bus. However, for clear description, various buses in FIG. 18 are marked as the bus system 1520.

The methods disclosed in the foregoing embodiments of this application may be applied to the processor 1510, or may be implemented by the processor 1510. The processor 1510 may be an integrated circuit chip and has a signal processing capability. In an implementation process, the steps in the foregoing method may be implemented by using a hardware integrated logical circuit in the processor 1510, or by using an instruction in a form of software. The processor 1510 may be a general-purpose processor, a digital signal processor (digital signal processor, DSP), an ASIC, a field-programmable gate array (field-programmable gate array, FPGA) or another programmable logic device, a discrete gate or a transistor logic device, or a discrete hardware component. The processor 1510 may implement or perform the methods, steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In an embodiment, the communications interface 1530 is configured to perform the receiving and sending steps performed by the IAB node, the donor node, the mobility management network element, the session management network element, and the network management network element in the embodiments shown in FIG. 6 to FIG. 15A and FIG. 15B. The processor 1510 is configured to perform the processing steps performed by the IAB node, the donor node, the mobility management network element, the session management network element, and the network management network element in the embodiments shown in FIG. 6 to FIG. 15A and FIG. 15B.

The communications unit may be a communications interface of the apparatus, and is configured to receive a signal from another apparatus. For example, when the apparatus is implemented as a chip, the communications unit is a communications interface used by the chip to receive a signal from another chip or apparatus or send a signal to another chip or apparatus.

According to one aspect, a computer-readable storage medium is provided. The computer-readable storage medium stores instructions, and the instructions are run, to implement functions of the mobility management network element in FIG. 6 to FIG. 15A and FIG. 15B.

According to another aspect, a computer-readable storage medium is provided. The computer-readable storage medium stores instructions, and the instructions are run, to implement functions of the session management network element in FIG. 6 to FIG. 15A and FIG. 15B.

According to one aspect, a computer-readable storage medium is provided. The computer-readable storage medium stores instructions, and the instructions are run, to implement functions of the IAB node in FIG. 6 to FIG. 15A and FIG. 15B.

According to another aspect, a computer-readable storage medium is provided. The computer-readable storage medium stores instructions, and the instructions are run, to implement functions of the network management network element in FIG. 6 to FIG. 15A and FIG. 15B.

According to one aspect, a computer program product including instructions is provided. The computer program product includes the instructions, and the instructions are run, to implement functions of the network management network element in FIG. 6 to FIG. 15A and FIG. 15B.

According to another aspect, a computer program product including instructions is provided. The computer program product includes the instructions, and the instructions are run, to implement functions of the IAB node in FIG. 6 to FIG. 15A and FIG. 15B.

According to another aspect, a computer program product including instructions is provided. The computer program product includes the instructions, and the instructions are run, to implement functions of the donor node in FIG. 6 to FIG. 15A and FIG. 15B.

According to one aspect, a computer program product including instructions is provided. The computer program product includes the instructions, and the instructions are run, to implement functions of the session management network element in FIG. 6 to FIG. 15A and FIG. 15B.

According to another aspect, a computer program product including instructions is provided. The computer program product includes the instructions, and the instructions are run, to implement functions of the mobility management network element in FIG. 6 to FIG. 15A and FIG. 15B.

According to one aspect, a chip is provided. The chip is applied to a network management network element. The chip includes at least one processor and a communications interface, the communications interface is coupled to the at least one processor, and the processor is configured to run instructions, to implement functions of the network management network element in FIG. 6 to FIG. 15A and FIG. 15B.

According to another aspect, a chip is provided. The chip is applied to a donor node. The chip includes at least one processor and a communications interface, the communications interface is coupled to the at least one processor, and the processor is configured to run instructions, to implement functions of the donor node in FIG. 6 to FIG. 15A and FIG. 15B.

According to another aspect, a chip is provided. The chip is applied to an IAB node. The chip includes at least one processor and a communications interface, the communications interface is coupled to the at least one processor, and the processor is configured to run instructions, to implement functions of the IAB node in FIG. 6 to FIG. 15A and FIG. 15B.

According to another aspect, a chip is provided. The chip is applied to a mobility management network element. The chip includes at least one processor and a communications interface, the communications interface is coupled to the at least one processor, and the processor is configured to run instructions, to implement functions of the mobility management network element in FIG. 6 to FIG. 15A and FIG. 15B.

According to another aspect, a chip is provided. The chip is applied to a session management network element. The chip includes at least one processor and a communications interface, the communications interface is coupled to the at least one processor, and the processor is configured to run instructions, to implement functions of the session management network element in FIG. 6 to FIG. 15A and FIG. 15B.

An embodiment of this application provides a communications system. The communications system includes a session management network element and an IAB node. The session management network element is configured to perform the step performed by the session management network element in any one of FIG. 6 to FIG. 8A and FIG. 8B, and the IAB node is configured to perform the step performed by the IAB node in any one of FIG. 6 to FIG. 8A and FIG. 8B.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A communications method, the method comprising:
   determining, by a session management network element, information about a target data plane instance, wherein the information about the target data plane instance comprises a routing indicator, wherein the routing indicator is used to determine an address of the target data plane instance, and wherein the target data plane instance is associated with a wireless integrated access and backhaul (IAB) node; and
   sending, by the session management network element, an N4 session management request message and a first indication to the IAB node by using a mobility management network element or a donor node that provides a service for the IAB node, wherein the first indication is used to indicate the IAB node to send the N4 session management request message to the target data plane instance.

2. The method according to claim 1, wherein before the sending, by the session management network element, the N4 session management request message and the first indication to the IAB node by using the mobility management network element, the method further comprises:
   obtaining, by the session management network element, a local context of the IAB node; and
   wherein the sending, by the session management network element, the N4 session management request message and the first indication to the IAB node by using the mobility management network element comprises:
      generating, by the session management network element, a session management non-access stratum (NAS) message based on the context of the IAB node, wherein the session management NAS message comprises the N4 session management request message and the first indication; and
      sending, by the session management network element, the session management NAS message to the IAB node by using the mobility management network element.

3. The method according to claim 1, wherein the session management network element does not locally have the context of the IAB node, and the method further comprises:
   sending, by the session management network element, the routing indicator to the mobility management network element, wherein after the mobility management network element is configured to determine, based on the routing indicator, that the mobility management network element locally has the context of the IAB node, the mobility management network element generates a mobility management NAS message based on the context of the IAB node, and sends the mobility management NAS message to the IAB node, and wherein the mobility management NAS message comprises the N4 session management request message and the first indication.

4. The method according to claim 3, wherein before the sending, by the session management network element, the routing indicator to the mobility management network element, the method further comprises:
   obtaining, by the session management network element, information about the mobility management network element of the IAB node from a subscriber data management network element.

5. The method according to claim 1, wherein the sending, by the session management network element, the N4 session management request message and the first indication to the IAB node by using the donor node, the method further comprises:
   sending, by the session management network element, the routing indicator to the donor node, wherein the donor node is configured to send a first message to the IAB node based on the routing indicator, and wherein the first message comprises the N4 session management request message and the first indication.

6. A communications apparatus, comprising:
   a processor, configured to determine information about a target data plane instance, wherein the information about the target data plane instance comprises a routing indicator, wherein the routing indicator is used to determine an address of the target data plane instance, and wherein the target data plane instance is associated with a wireless integrated access and backhaul (IAB) node; and a transceiver configured to send an N4 session management request message and a first indication to the IAB node by using a mobility management network element or a donor node that provides a service for the IAB node, wherein the first indication is used to indicate the IAB node to send the N4 session management request message to the target data plane instance.

7. The apparatus according to claim 6, wherein before the transceiver is configured to send the N4 session management request message and the first indication to the IAB node by using the mobility management network element;

the processor is further configured to obtain a context that is of the IAB node and that is in the apparatus;

the processor is further configured to generate a session management non-access stratum NAS message based on the context of the IAB node, wherein the session management NAS message comprises the N4 session management request message and the first indication; and the transceiver is further configured to send the session management NAS message to the IAB node by using the mobility management network element.

8. The apparatus according to claim 6, wherein:

the transceiver is further configured to send the routing indicator to the mobility management network element, wherein after the mobility management network element is configured to determine, based on the routing indicator, that the mobility management network element locally has the context of the IAB node, the mobility management network element generates a mobility management NAS message based on the context of the IAB node, and sends the mobility management NAS message to the IAB node, and wherein the mobility management NAS message comprises the N4 session management request message and the first indication.

9. The apparatus according to claim 8, wherein before the transceiver is configured to send the routing indicator to the mobility management network element;

the transceiver is further configured to obtain information about the mobility management network element of the IAB node from a subscriber data management network element.

10. The apparatus according to claim 6, wherein that the transceiver is configured to send the N4 session management request message and the first indication to the IAB node by using the donor node further comprises:

sending the routing indicator to the donor node, wherein the donor node is configured to send a first message to the IAB node based on the routing indicator, and the first message comprises the N4 session management request message and the first indication.

11. A communications apparatus, comprising:

a processor configured to process information; and a transceiver configured to:

receive an N4 session management request message and a first indication from a session management network element, wherein the first indication is used to indicate the transceiver to send the N4 session management request message to a target data plane instance; and send the N4 session management request message to the target data plane instance according to the first indication, wherein the N4 session management request message is used to indicate to manage a session context of the target data plane instance.

12. The apparatus according to claim 11, wherein:

the transceiver is further configured to receive the N4 session management response message sent by from the target data plane instance; and the transceiver is further configured to send a second indication and the N4 session management response message to a donor node or a mobility management network element, wherein the second indication is used to indicate to send the N4 session management response message to the session management network element.

13. The apparatus according to claim 11, wherein:

the transceiver is further configured to send a first message to a first device, wherein the first message comprises information about one or more data plane instances corresponding to a data plane module, the information about the one or more data plane instances comprises information about the target data plane instance, information about any data plane instance comprises a routing indicator, and wherein the first message is used to indicate the first device to register the information about the one or more data plane instances with the session management network element or a network storage network element, and wherein the routing indicator is used by the session management network element to determine an address of the any data plane instance, the any data plane instance is associated with the apparatus, and the first device comprises any one of the following: a network management network element, the donor node, or the mobility management network element.

14. The apparatus according to claim 13, wherein the first message comprises a payload container, the payload container comprises the information about the one or more data plane instances, and a type of the payload container is used to indicate the first device to register the information about the one or more data plane instances with the session management network element or the network storage network element.

15. The apparatus according to claim 13, wherein the first message further comprises a registration indication, and the registration indication is used to indicate the first device to register the information about the one or more data plane instances with the session management network element or the network storage network element.

16. The apparatus according to claim 13, wherein there is a predefined operation interface between the apparatus and the first device, and the predefined operation interface is used to indicate to the first device to register the information about the one or more data plane instances with the session management network element or the network storage network element; and wherein the transceiver is configured to send the first message to the first device through the predefined operation interface.

17. The apparatus according to claim 11, wherein:

the information about the one or more data plane instances is transparently transmitted on the donor node or the mobility management network element; or the information about the one or more data plane instances is processed by the donor node or the mobility management network element and then sent to the session management network element or the network storage network element.

18. A communications apparatus, comprising:
a processor configured to process information; and
a transceiver configured to;
- receive an N4 session management request message and a first indication from a session management network element, wherein the first indication is used to indicate an integrated access and backhaul (IAB) node to send the N4 session management request message to a target data plane instance; and
- send the N4 session management request message and the first indication to the IAB node.

19. The apparatus according to claim 18,
wherein before the transceiver is further configured to send the N4 session management request message and the first indication to the IAB node, the transceiver is further configured to receive a routing indicator from the session management network element, wherein the routing indicator is used to determine an address of the target data plane instance, and the target data plane instance is associated with the AB node;
wherein the processor is further configured to: after determining, based on the routing indicator, that the apparatus locally has a context of the IAB node, generate a mobility management non-access stratum (NAS) message based on the context of the IAB node; and
wherein the transceiver is further configured to send the mobility management NAS message to the IAB node, wherein the mobility management NAS message comprises the N4 session management request message and the first indication.

20. The apparatus according to claim 18, wherein:
the transceiver is further configured to receive a first message, wherein the first message comprises information about one or more data plane instances of a data plane module, the first message is used to indicate the apparatus to register the information about the one or more data plane instances with the session management network element or a Network Function Repository (NRF) network element, information about any data plane instance comprises the routing indicator, and the information about the one or more data plane instances comprises information about the target data plane instance; and
the processor is further configured to register the information about the one or more data plane instances with the session management network element or the network storage network element based on the first message by using the transceiver.

\* \* \* \* \*

UNITED STATES PATENT AND TRADEMARK OFFICE
CERTIFICATE OF CORRECTION

PATENT NO. : 12,101,838 B2
APPLICATION NO. : 17/709247
DATED : September 24, 2024
INVENTOR(S) : Zhu et al.

Page 1 of 1

It is certified that error appears in the above-identified patent and that said Letters Patent is hereby corrected as shown below:

In the Claims

Claim 6: Column 56, Line 63: "a processor, configured to determine information about a" should read as -- a processor configured to determine information about a --.

Claim 7: Column 57, Line 14: "using the mobility management network element;" should read as -- using the mobility management network element: --.

Claim 9: Column 57, Line 42: "mobility management network element;" should read as -- mobility management network element: --.

Claim 12: Column 58, Line 5: "session management response message sent by from" should read as -- session management response message from --.

Claim 14: Column 58, Line 38: "plane instances, and a type of the payload container is used" should read as -- plane instances and a type of the payload container is used --.

Claim 18: Column 59, Line 3: "a transceiver configured to;" should read as -- a transceiver configured to: --.

Signed and Sealed this
Twentieth Day of May, 2025

Coke Morgan Stewart
*Acting Director of the United States Patent and Trademark Office*